US007933226B2

(12) United States Patent
Woodruff et al.

(10) Patent No.: US 7,933,226 B2
(45) Date of Patent: Apr. 26, 2011

(54) SYSTEM AND METHOD FOR PROVIDING COMMUNICATION CHANNELS THAT EACH COMPRISE AT LEAST ONE PROPERTY DYNAMICALLY CHANGEABLE DURING SOCIAL INTERACTIONS

(75) Inventors: Allison G. Woodruff, Foster City, CA (US); Paul M. Aoki, Foster City, CA (US); Margaret H. Szymanski, Santa Clara, CA (US); James D. Thornton, Redwood City, CA (US); Daniel H. Wilson, Pittsburgh, PA (US); Chen Yu, Rochester, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 2147 days.

(21) Appl. No.: 10/809,018

(22) Filed: Mar. 24, 2004

(65) Prior Publication Data
US 2005/0088981 A1   Apr. 28, 2005

Related U.S. Application Data

(60) Provisional application No. 60/513,825, filed on Oct. 22, 2003.

(51) Int. Cl.
*H04L 12/16* (2006.01)
(52) U.S. Cl. ........ 370/260; 370/261; 370/263; 370/264; 370/329; 370/341; 379/93.2; 379/158; 379/202.01; 379/205.01; 704/231; 704/270; 704/275
(58) Field of Classification Search .......... 370/260–263, 370/266, 329, 341, 431, 464, 264; 379/93.2, 379/158, 202.01, 205.01; 704/231, 270, 704/275
See application file for complete search history.

(56) References Cited

U.S. PATENT DOCUMENTS
3,508,007 A   4/1970   Goodall et al.
(Continued)

FOREIGN PATENT DOCUMENTS
EP   0982920   3/2000
(Continued)

OTHER PUBLICATIONS

Escobar M. A. et al., "Convivo Communicator: An Interface-Adaptive VoIP System for Poor Quality Networks,"J. of Info, Comm & Ethics in Society, Jul. 2003, vol. 1, pp. 167-180, Troubador Publishing Ltd., Cambridge, MA, U.S.A.

(Continued)

*Primary Examiner* — Curtis Kuntz
*Assistant Examiner* — Yosef K Laekemariam
(74) *Attorney, Agent, or Firm* — Patrick J. S. Inouye; Krista A. Wittman

(57) ABSTRACT

One embodiment of the invention is a computer controlled method for use with a communication system. The method includes a step of receiving a plurality of communications, where each one of the plurality of communications is from one of a plurality of communication sources; includes a step of mixing (that is responsive to a plurality of floor controls) the plurality of communications for a plurality of outputs associated with plurality of communication sources; and includes a step of analyzing, for a plurality of users associated with the plurality of communication sources, one or more conversational characteristics of two or more of the plurality of users. The method also includes a step of automatically adjusting the plurality of floor controls responsive to the step of analyzing. Other embodiments include systems and devices that use the method as well as program products that cause a computer to execute the method.

57 Claims, 29 Drawing Sheets

U.S. PATENT DOCUMENTS

| | | | |
|---|---|---|---|
| 3,699,264 A | | 10/1972 | Pitroda et al. |
| 4,475,190 A | * | 10/1984 | Marouf et al. ............... 370/260 |
| 5,034,947 A | | 7/1991 | Epps |
| 5,113,431 A | | 5/1992 | Horn |
| 5,410,739 A | * | 4/1995 | Hart ........................... 455/66.1 |
| 5,533,112 A | | 7/1996 | Danneels |
| 5,631,967 A | | 5/1997 | Wagner et al. |
| 5,768,263 A | | 6/1998 | Tischler et al. |
| 5,966,531 A | * | 10/1999 | Skeen et al. ................. 719/315 |
| 6,178,237 B1 | | 1/2001 | Horn |
| 6,236,854 B1 | | 5/2001 | Bradshaw, Jr. |
| 6,327,567 B1 | | 12/2001 | Willehadson et al. |
| 6,556,670 B1 | * | 4/2003 | Horn ........................ 379/202.01 |
| 6,574,321 B1 | * | 6/2003 | Cox et al. ..................... 379/189 |

FOREIGN PATENT DOCUMENTS

| | | |
|---|---|---|
| JP | 10173726 | 6/1998 |
| JP | 2003152793 | 5/2003 |
| JP | 2005300235 | 10/2005 |

OTHER PUBLICATIONS

Addeo E.J. et al., "An Experimental Multi-Media Bridging System," Proc. ACM Conf. on Office Info. Systems, 1988, pp. 236-242, ACM Press, Seattle, WA, U.S.A.

Benford S. et al., "User Embodiment in Collaborative Virtual Environments," Proc. Special Interest Group on Computer-Human Interaction (SIGCHI), Papers, 1995, pp. 242-249, ACM Press, New York, NY, U.S.A.

Berc L. et al., "Pssst: Side Conversations in the Argo Telecollaboration System," Proc. ACM User Interface Software Technology (UIST) Symp., Nov. 14-17, 1995, pp. 155-156, ACM Press, Pittsburgh, PA, USA.

Smith I. et al., "Low Disturbance Audio for Awareness and Privacy in Media Space Applications," Proc. ACM Multimedia Conf.-Electronic Proc., Nov. 5-9, 1995, pp. 91-97, ACM Press, San Francisco, CA, U.S.A.

Horovitz E. et al., "Attention Sensitive Alerting," Proc. of the 15th Annual Conf. on Uncertainty and Artificial Intelligence (UAI-99), Jul. 1999, pp. 305-313, Morgan Kaufman, San Francisco, U.S.A.

Cutler R. et al., "Look Who's Talking: Speaker Detection Using Video and Audio Correlation," Proc. IEEE Conf. on Multimedia & Expo (ICME), 2000, pp. 1589-1592, IEEE CS Press.

Selker T. et. al., "Eye-R, a Glasses-Mounted Eye Motion Detection Interface," Computer-Human Interaction (CHI), Interactive Posters, Mar. 31-Apr. 5, 2001, pp. 179-180, MIT Media Lab, Cambridge, MA, U.S.A.

Dietz P.H. et al., "Real-Time Audio Buffering for Telephone Applications," Proc. ACM Symposium on User Interface Software Technology (UIST), Nov. 11-14, 2001, pp. 193-194, Orlando, FL, U.S.A.

Hinckley K. et. al., "Toward More Sensitive Mobile Phones," ACM Symposium on User Interface Software Technology (UIST), Nov. 11-14, 2001, pp. 191-192, ACM Press, Orlando, FL, U.S.A.

Schmandt C. et al., "Mediated Voice Communication via Mobile IP," Proc. ACM UIST Symp., Oct. 27-30, 2002, pp. 141-150, vol. 4, Issue 2, ACM Press, Paris, France, Europe.

Ericsson "R520m User's Guide" (3rd Ed.), http://www.mobiles.co.uk/er520sf.html, Pub. EN/LZT-108-4268-R3A, Ericsson Mobile Communication AB, 2001.

Nelson L. et. al., "Quiet Calls: Talking Silently on Mobile Phone," Proc. SIGCHI, Papers, Mar. 31-Apr. 5, 2001, pp. 174-181, vol. No. 3, Issue No. 1, ACM Press, Seattle, WA, U.S.A.

Vertegaal R. et al., "Designing Attentive Cell Phones Using Wearable EyeContact Sensors," Interactive Poster: HCL for Mobility, CHI 2002: changing the world, changing ourselves, ACM SIGCHI Conf., Apr. 20-25, 2002, pp. 646-647, ACM Press, Minneapolis, MN, U.S.A.

Vertegaal R. et. al., "GAZE-2: An Attentive Video Conferencing System," Short Talk: GAZE, CHI 2002: Changing the world, changing ourselves, ACM SIGCHI Conf., Apr. 20-25, 2002, pp. 736-737, ACM Press, Minneapolis, MN, U.S.A.

Vertegaal R. et al., "GAZE-2: Conveying Eye Contact in Group Video Conferencing Using Eye-Controlled Camera Direction," New Directions In Video Conferencing, Proc. CHI Apr. 5-10, 2003, pp. 521-528, vol. 5, Issue No. 1, ACM Press, Ft. Lauderdale, FL, U.S.A.

Shell J. et al., "Interacting with Groups of Computers," Special Issue on Attentive User Interfaces, Communications of ACM, Mar. 2003, pp. 40-46, vol. 46, No. 3, ACM Press, New York, NY, U.S.A.

N. Matsuura et al., "Development And Evaluation Of Net Forum, A Multi-point A/V Conference System", Information Processing Society of Japan, Nov. 15, 2000, vol. 41, pp. 3142-3151.

\* cited by examiner

SYSTEM AND METHOD FOR PROVIDING COMMUNICATION CHANNELS THAT EACH COMPRISE AT LEAST ONE PROPERTY DYNAMICALLY CHANGEABLE DURING SOCIAL INTERACTIONS

CROSS-REFERENCE TO RELATED APPLICATION

This non-provisional patent application claims priority under 35 USC §119(e) to U.S. provisional patent application, Ser. No. 60/513,825, filed Oct. 22, 2003, the disclosure of which is incorporated by reference.

BACKGROUND OF THE INVENTION

1. Field of the Invention

This invention relates to the field of computer-mediated group communication systems.

2. Background

Groups of people have communicated together for eons. This communication includes styles where a group of people listen to a presenter as well as styles where people collaborate in a social interaction such as a meeting (among other styles). In the following description, the term meeting is intended to include all social interactions. Meetings often have subgroups of people who carry on separate conversations within the context of the meeting. Each of these subgroups maintains a conversational floor for that subgroup while the members of the subgroup maintain awareness of the primary group conversation. The primary group conversation generally continues even though separate conversational floors are established. While this conversational style works well when the number of participants is small and all of the participants are co-located (such as in a conference room), it is completely disruptive using existing technology that enables remote parties to communicate with each other (for example, teleconference technology, two-way shared radio channels, etc.).

An example of this problem is that of a "party line" telephone or teleconference call in which there is no capability to schism the conversation into separate conversational floors. This is also true of shared-channel radio systems such as police and fire-fighter radio communications. Communications between the participants are mixed together on the communication channel making it difficult for arbitrary users to communicate and often requiring complex protocols among the users to provide some order to the communications. Although some high-end teleconference systems support multiple conversational floors (for example, by "sub-conferencing" or by channel switching) the establishment and modification of these conversational floors is difficult. This difficulty lessens the spontaneity of establishing a conversational floor in a remote meeting.

Instant messaging and chat systems allow for schisming as a number of users can participate in a textual "chat room" where each user's typed message is displayed to all the members of the room (subject to per-member controls). Each user can also explicitly create and maintain a side-channel textual conversation with a subgroup of members. This schisming is not automatic but requires that explicit user commands be made to the system.

U.S. Pat. No. 6,327,567 B1 to Willehadson et al., entitled Method and System for Providing Spatialized Audio in Conference Calls, and filed Feb. 10, 1999 teaches a mechanism that allows sub-conferences (conversational floors). However, each user needs to manually enter a dialog with a command unit (by DTMF, by a user interface with a control unit or by a recognized voice command) to initiate or participate in a sub-conference or to switch between sub-conferences. In addition, Willehadson uses a complicated spatialization technique to indicate what sub-conferences are available. Willehadson does not teach automatic detection of conversational floors or automatic switching between conversational floors responsive to the conversational characteristics related to the conversations.

In addition, during the course of a social interaction, the suitability of the communication means currently being used by the participants may change due to one or more factors. For instance, the environment of one or more of the participants may change due to, for example, ambient noise or interference. Similarly, the communication channel itself could be effected by noise or interference, as well as physical limitations of capacity or media. Explicit inputs by the participants could also effect the suitability of the communication channel, such as when a participant turns down the gain control on the communication device. In addition, the content of the social interaction, and the inferences that can be drawn based on the content, can signal a possible need to modify the communication channel in some fashion.

Various psychological, sociological and related factors can affect the ability of a participant to effect a change to the communication channel, even if the participant is cognizant that such a change is required. For example, a pair of participants conversing using two-way radios equipped with a push-to-talk transmission mode may become highly engaged conversationally, such that the limits of the communications devices will be exceeded if they wish to continue their discussion. Preferably, the participants would agree to a "media switch," that is, the substitution of a communication channel exhibiting properties more suited to the current needs of the social interaction; in this case, the participants would switch to conventional telephony and resume the exchange on a new communication channel. However, agreement to a media switch also requires investing in transacting a new communication channel and implies a social commitment to continue the conversation but at a higher level of engagement and perhaps significantly more lengthy interaction. Conversely, participants in a social interaction could be unaware of the need to make a media switch and could inefficiently muddle through their social interaction.

A communication channel has an associated set of channel properties, which substantially determine the structure of the information or content being delivered through the channel. Qualitative channel properties consist of binary or categorical parameter settings, whereas parametric properties consist of substantially continuous parameter settings. Channel properties are distinguishable from other aspects of the communication channel that might be changed, but which do not have the same kind of effect. For example, a communication system can incorporate indicators that augment the communication channel without substantially altering the structure of the information delivered in the channel.

Systems that support speech-triggered automatic actions with respect to parametric properties are known. For example, automatic gain controls are widely used in audio teleconference systems. These controls typically adjust the microphone gain dynamically to normalize gain across the participants based on an assumption of low gain variability over time. As another example, so-called speaker-select mechanisms are widely used in teleconference systems. These systems implement automatic speaker-select algorithms, which attempt to track which participant or participants in a teleconference are speaking at a given moment and enable only a limited number of people to speak concurrently.

Various techniques for automatic speaker-select for audio conferences are described in U.S. Pat. No. 3,508,007 to Goodall (first-to-speak); U.S. Pat. No. 3,699,264 to Pitroda (loudest speaker); and U.S. Pat. Nos. 4,475,190 and 5,631,967 to Marouf and Wagner, respectively (simple statistics from the most recent talkburst), the disclosures of which are incorporated by reference. For audio, automatic speaker-select addresses the following problems: (1) reducing costs—compressed digital audio must be decoded before mixing and recoding prior to being put back on the network; (2) preventing numeric overflow—may occur where multiple signals with high amplitude are mixed; (3) reducing bandwidth consumed—savings result from sending only n streams instead of nxn streams; and (4) reducing echo—caused by speaker-to-microphone feedback when speakerphones are used. However, these systems fail to primarily facilitate social patterns of human communication and fail to automatically change qualitative channel properties. Similarly, automatic speaker-select for video conferences is described in E. J. Addeo et al., "An Experimental Multi-Media Bridging System," *Proc. ACM Conf. on Office Info. Systems*, ACM Press, 1988, 236-242; and U.S. Pat. No. 5,768,263 to Tischler, the disclosures of which are incorporated by reference. For video, automatic speaker-select addresses the following problems: (1) reducing costs—enabling "multi-party" video without needing to have either n video displays or m (<n) displays with video multiplexing hardware; and (2) reducing bandwidth consumed. Automatic speaker-select techniques can also be used to add indicators to a conferencing system, such as described in R. Cutler et al., "Look Who's Talking: Speaker Detection Using Video and Audio Correlation," *Proc. IEEE Conf. on Multimedia & Expo (ICME)*, IEEE CS Press, 2000, 1589-1592, the disclosures of which are incorporated by reference. In the Cutler device, rectangular outlines are drawn around the current speaker's video image. It is suggested that this will help in understanding which participant is currently talking. However, these systems fail to automatically change qualitative channel properties.

Systems that include manual user interfaces for controlling media streams with respect to parametric properties are also known. Manual interfaces can control various parametric properties, which include audio source select. Audio conferencing systems that allow participants to manually specify which audio streams they will hear, through a form of a simple mixing function, which constitutes a simple parametric property, such as, selecting specific participants to hear, are described in E. J. Addeo et al., "An Experimental Multi-Media Bridging System," *Proc. ACM Conf. on Office Info. Systems*, ACM Press, 1988, 236-242; U.S. Pat. No. 5,034,947 to Epps; U.S. Pat. No. 6,236,854 to Bradshaw; U.S. Pat. No. 5,113,431 to Horn (full manual mixing of all n participants' audio); and U.S. Pat. Nos. 5,533,112 and 6,178,237 to Danneels and Horn, respectively, the disclosures of which are incorporated by reference. In addition, conferencing systems that enable participants to use alternative manual means to indicate the audio streams they will hear, such as through explicit selection of one of several groups in a video conference by directing eye-gaze toward the image of a member of that group, are described in R. Vertegaal et al., "GAZE-2: Conveying Eye Contact in Group Video Conferencing Using Eye-Controlled Camera Direction," *Proc. ACM SIGCHI Conf.*, ACM Press, 2003, 521-528), the disclosure of which is incorporated by reference. The end-result is still a mixing function, which constitutes a simple parametric property. Systems that provide audio speed select to allow control using manual means of additional parametric properties, such as time-scale compression or "speeded-up audio," are described in P. H. Dietz et al., "Real-Time Audio Buffering for Telephone Applications," *Proc. ACM UIST Symp.*, ACM Press, 2001, 193-194), the disclosure of which is incorporated by reference. Systems that incorporate manual interfaces to control qualitative properties are known. A system for providing speech intelligibility, such as by partially-prosody-preserving speech scrambling, is described in I. E. Smith et al., "Low Disturbance Audio for Awareness and Privacy in Media Space Applications," *Proc. ACM Multimedia Conf.*, ACM Press, 1995, 91-97; and C. Schmandt et al., "Mediated Voice Communication via Mobile IP," *Proc. ACM UIST Symp.*, ACM Press, 2002, 141-150), the disclosures of which are incorporated by reference. In these systems, a particular end-user can choose whether to make the audio transmitted from their microphone intelligible or unintelligible. The algorithm used to make speech unintelligible is designed to preserve the overall tone of the speech, such as urgency, emotion, and so forth, and a listener's ability to identify the speaker, albeit imperfectly. Initiating the channel property change requires either unilateral or sequentially-negotiated end-user actions. A unilateral property change results from a unilateral action, such as when one participant pushes a button and the change occurs. A sequentially-negotiated property change follows a sequence of steps involving more than one participant, such as setting up a telephone call. A system that requires an initiating step by a first participant followed by an accepting step by a second participant, such as initiating and accepting a side conference session, is described in L. Berc et al., "Pssst: Side Conversations in the Argo Telecollaboration System," *Proc. ACM UIST Symp.*, ACM Press, 1995, 155-156, the disclosure of which is incorporated by reference. Such steps constitute a specific request/reply negotiation, which implies both a strong causal dependence as well as temporal ordering. However, these telecommunication systems fail to change channel properties in response to independent user interface gestures made by multiple participants.

Finally, known telecommunication systems allow alterations to the system's user interface. For example, most current software communication applications have menus and modes. Similarly, most current cellular telephone handsets with LCD displays have programmable "soft keys" whose assigned functions change depending on context, such as whether a call is in progress. Methods by which users can establish new communication channels, such as by establishing a new telephone call by directing eye gaze toward a telephone augmented with an gaze detector, are described in J. Shell et al., "Interacting with Groups of Computers," *Comm. ACM* 46 (3), 2003, 40-46), the disclosure of which is incorporated by reference. By definition, establishment of a new communication channel is not alteration of an existing communication channel. Methods by which information is passed between users that is not direct communication, such as by notifying potential callers that a potential callee is likely in face-to-face conversation based on sensor input captured by the callee's handset, is described in R. Vertegaal et al., "Designing Attentive Cell Phones Using Wearable Eyecontact Sensors," *Extended Abstracts, ACM SIGCHI Conf.*, ACM Press, 2002, 646-647), the disclosure of which is incorporated by reference. Information is passed through indicators, rather than in a channel and so necessarily does not relate to the properties of a channel. These systems effect user interface changes that do not alter the structure of the information that passes through the channel. Systems that change the physical output device of a channel, such as by selecting from which of two speakers audio will be played, for instance, changing a telephone handset's audio from a speakerphone to an earphone depending on the proximity of the handset to the user's head, are described in *Ericsson R520m User's Guide* (3rd Ed.), Pub. EN/LZT-108-4268-R3A, Ericsson Mobile Communication AB, 2001, the disclosure of which is incorporated by reference. The channel contents and the user's interaction with other users, that is, full-duplex audio, remain unchanged. However, these telecommunication systems fail to allow alteration of the user interface relating to the properties of the communication channel.

It would be advantageous to provide a capability that addresses the above-mentioned problems.

SUMMARY OF THE INVENTION

One embodiment of the invention is a computer controlled method for use with a communication system. The method includes a step of receiving a plurality of communications, where each one of plurality of communications is from one of a plurality of communication sources. In addition, the method includes a step of mixing (that is responsive to a plurality of floor controls) plurality of communication for a plurality of outputs associated with plurality of communication sources. Furthermore, the method also includes a step of analyzing, for a plurality of users associated with plurality of communication sources, one or more conversational characteristics of two or more of the plurality of users. The method also includes a step of automatically adjusting the plurality of floor controls responsive to the step of analyzing. Other embodiments include systems and devices that use the method as well as program products that cause a computer to execute the method.

Another embodiment of the invention is a computer controlled method for use with an audio communication system. The method includes a step of receiving a plurality of audio streams, where each one of the plurality of audio streams is from one of a plurality of audio sources. In addition, the method includes a step of mixing (that is responsive to a plurality of floor controls) the plurality of audio streams for a plurality of outputs associated with the plurality of audio sources. Furthermore, the method also includes a step of analyzing, for a plurality of users associated with the plurality of audio sources, one or more conversational characteristics of each of the plurality of users. The method also includes a step of automatically adjusting the plurality of floor controls responsive to the step of analyzing.

Thus, the method allows a computer to analyze the conversational characteristics (these characteristics include (but without limitation) information derived from sources such as the users' vocalizations and the users physiological reactions to other users' vocalizations).

Yet another embodiment of the invention is a computer controlled method for computer mediated communication that includes a step of receiving a plurality of communication streams, where each one of the plurality of communication streams is from one of a plurality of communication sources. Another step is that of mixing, responsive to a plurality of floor controls, the plurality of communication streams for a plurality of outputs associated with the plurality of communication sources. Another step is that of analyzing an action by a first user to determine whether the action is responsive to an action by a second user; wherein the first user and the second user are associated with different of the plurality of communication sources and automatically adjusting the plurality of floor controls responsive to the step of analyzing.

Yet another embodiment of the invention is a computer controlled method for computer mediated communication that includes a step of receiving a plurality of communication streams, where each one of the plurality of communication streams is from one of a plurality of communication sources. Another step is that of mixing, responsive to a plurality of floor controls, the plurality of communication streams for a plurality of outputs associated with the plurality of communication sources. Another step is that of analyzing an action by a first user to determine whether the action refers to a second user and automatically adjusting the plurality of floor controls responsive to the step of analyzing.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Figure 1:
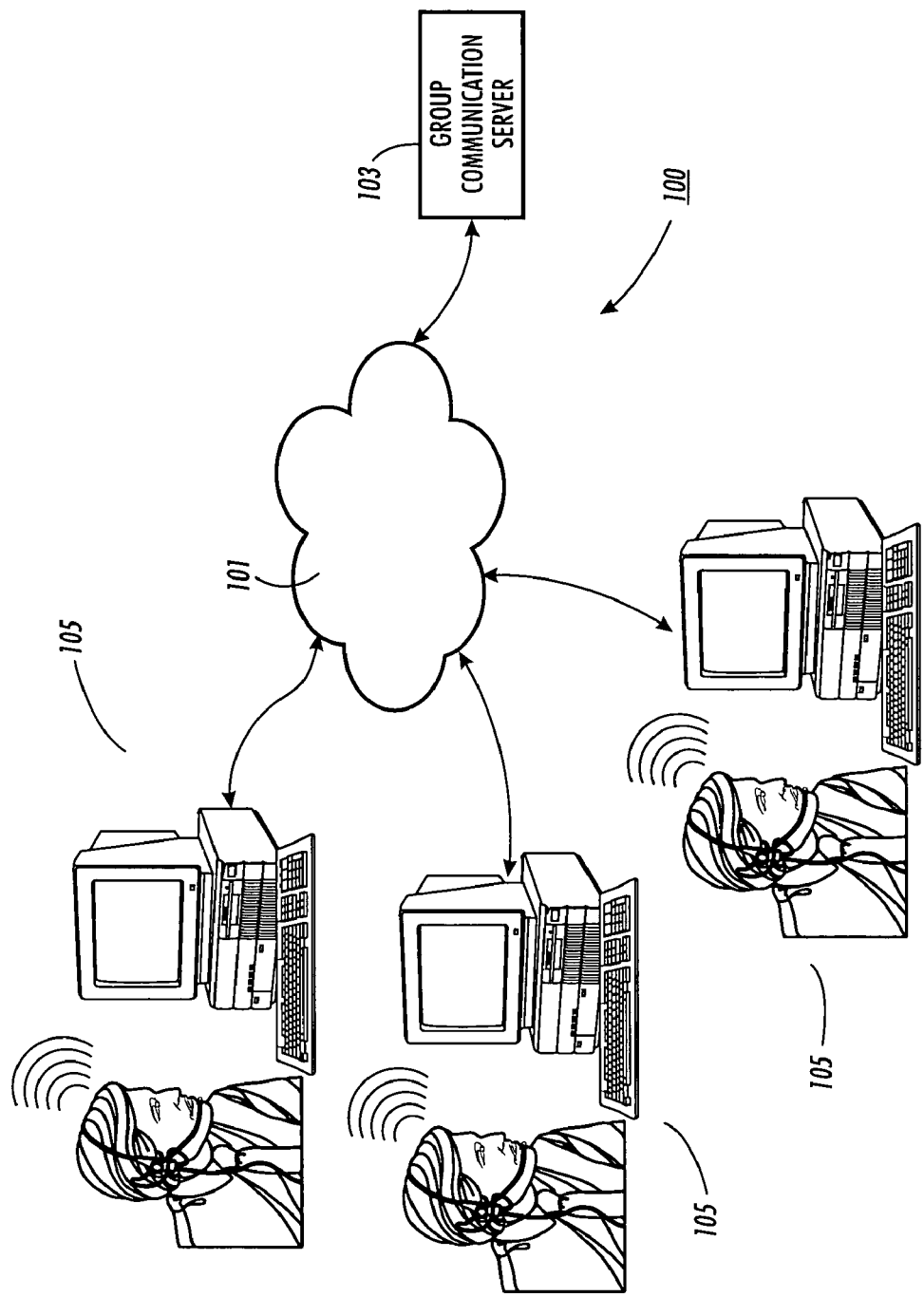
FIG. 1 illustrates an architecture in accordance with an embodiment.

One aspect of the invention is a media communication system employing automatic detection of human conversational behavior. In one embodiment, the system makes probabilistic inferences of conversational group membership based on conversational characteristics such as quantitative temporal relationships between specific audible cues and actions during conversation ("temporal features"). One embodiment of the system need not require an understanding of human speech as it uses the ability to detect the presence or absence of a given user's vocalizations and/or to detect specific vocalizations within the speech with a reasonable degree of reliability.

The conversational characteristics can include both audio characteristics and physiological characteristics (such as can be determined by a biometric device). Although much of the following explicitly describes the analysis of audio characteristics, one skilled in the art can, after reading the disclosure herein, apply equivalent techniques to any available physiological characteristics that can be received by the group communication server 103.

The detection of the presence/absence of a user's vocalizations can be done by capturing audio with a throat microphone or a "bone-conduction" microphone and then using a simple signal detection algorithm, for example, one using energy thresholds and/or signal zero-crossing rates, to segment the audio into speech/silence. (A conventional microphone may be used to capture the user's speech for human listening purposes—the use of special microphones for speech detection is beneficial but not necessary because it decreases the amount of external noise for which the signal detection algorithm must allow.)

The temporal features can be classified using known pattern recognition techniques. One way to do this is to compare quantitative feature values to known distributions, for example, the audio from a multiparty conversation can be segmented, hand-labeled and used to train a Naïve Bayes classifier. If a given relationship is known to be universal across users (or nearly so), a static distribution can be used. If a given relationship is subject to variation across users, an initial distribution can be incrementally modified. Some temporal features generally indicate membership in the same conversational floor. Speakers in the same conversational floor place the beginning of their vocalizations at transition relevance places (TRPs), temporally aligning them with pauses in other speakers' turns. This general principal can be used to develop a quantitative feature.

One example feature computes the time difference between the current start endpoint of speaker X's turn, t, and the previous final endpoint of speaker Y's most recent turn prior to t. This difference can be compared to a decreasing distribution, for example, the comb-shaped distribution of Wilson & Zimmerman (Wilson, T. P. and Zimmerman, D. H., *The Structure of Silence Between Turns in Two-Party Conversation*, Discourse Processes 9 (1986), 375-390) or an empirical distribution, to produce an estimated probability that the speaker X and speaker Y are communicating.

Another example feature uses the characteristic that speakers do not simply wait for and react to the completion of other speakers' turns; rather, they project, that is, anticipate, a turn's completion based on cues such as content and prosody. Since speaker X may misjudge when the previous speaker Y will finish a vocalization, the starting endpoint of X's turn sometimes starts before the final endpoint of Y's turn. This feature computes the time difference between the current start endpoint of speaker X's turn, t, and the final endpoint of speaker Y's turn that is closest to t (which may therefore be before or after t). This distribution can also be modeled empirically; again, longer differences are less likely to represent a deliberate alignment and thus, it is less likely that the speakers are in the same conversational floor.

Yet another example feature can look for evidence that the speakers are not in the same conversational floor. For example, while speakers do often overlap their speech (as when speakers start at the same time, or when speakers complete a sentence together), it is very unusual to see sustained periods of speech that overlaps with other speakers' speech if the speakers in question are in the same conversational floor. This general principal can be used to develop a quantitative feature.

One example algorithm is to determine a sliding time window T, and within T compute a vector corresponding to periods of simultaneous speech given some time quantization (for example, 1 millisecond). Then compute the scalar product of this vector with a weighting vector. The resulting value can be compared to an empirical distribution to determine a quantitative measurement for the feature.

Once the features are determined, they can then be used to compute likelihoods, posterior probabilities, and conversational floor configurations as is subsequently described.

Additional evidence of membership in a conversational floor can be obtained by recognizing particular vocalizations (for example, user or group names, or backchannel acknowledgement vocalizations). Details about these techniques are also subsequently described.

Physiological characteristics can also be compared with the user's audio to determine a feature.

One skilled in the art after reading the following will understand that a user can have a microphone or other audio pickup, and a speaker. The user's audio pickup generates signals that result in digitized packets that are identified as to their source (the source being, for example, the user). Digitized audio packets for output to the user are similarly identified, and these packets are generally sent back to the user for reproduction through the user's speakers or headphone. One aspect of the invention acquires audio from multiple sources, mixes the source's audio responsive to which user/source the mixed audio will be delivered, and automatically adjusts the mix responsive to an analysis of the conversational characteristics such as the vocalizations of the users. Such a one will also understand that streams of feature data can be extracted from the conversational communication between people. The conversational communication can be comprised of textual information, audible information, visual information, tactile information or some combination thereof The conversational communication can be manually or automatically transcribed.

FIG. 1 illustrates an architecture 100 that includes a network 101, a group communication server 103 and a plurality of audible sources 105. The network 101 can be a LAN, WAN, the Internet, or any other network suitable for transporting audio information whether in digital or analog form. The plurality of audible sources 105 can include microphones that receive a person's vocalizations or vocalizations (and can also include a mechanism for detecting the occurrence of a person's vocalization to better separate vocalization from background noise—for example, a throat microphone). In addition, any of the plurality of audible sources 105 can be connected to the network 101 using wire or wireless technologies. Further, at least some of the plurality of audible sources 105 have some mechanism for recording or presenting audio information (for example, by providing signals capable of driving an audio reproduction mechanism such as an earphone, a hearing aid, a bone conduction transducer, a direct tympanic stimulator, a headphone set, a speaker, etc.). One skilled in the art would be able to create a similar architecture directed to textual processing or other group communication processing without undue experimentation after having read the disclosure herein.

Any of the plurality of audible sources 105 can include signal processing capability for converting analog audio information into digital audio information and for sending the audio information to the group communication server 103. These capabilities can be included as part of a microphone, a headset, provided by a portable audio processor, or provided by a server processor in wire or wireless communication with the microphone.

The group communication server 103 can be a component of a radio system, a wired, wireless and/or cellular telephone system, a component in an emergency control center, a server for an internet audio-based chat room, or a component in any individually addressable group audio system.

Figure 2:
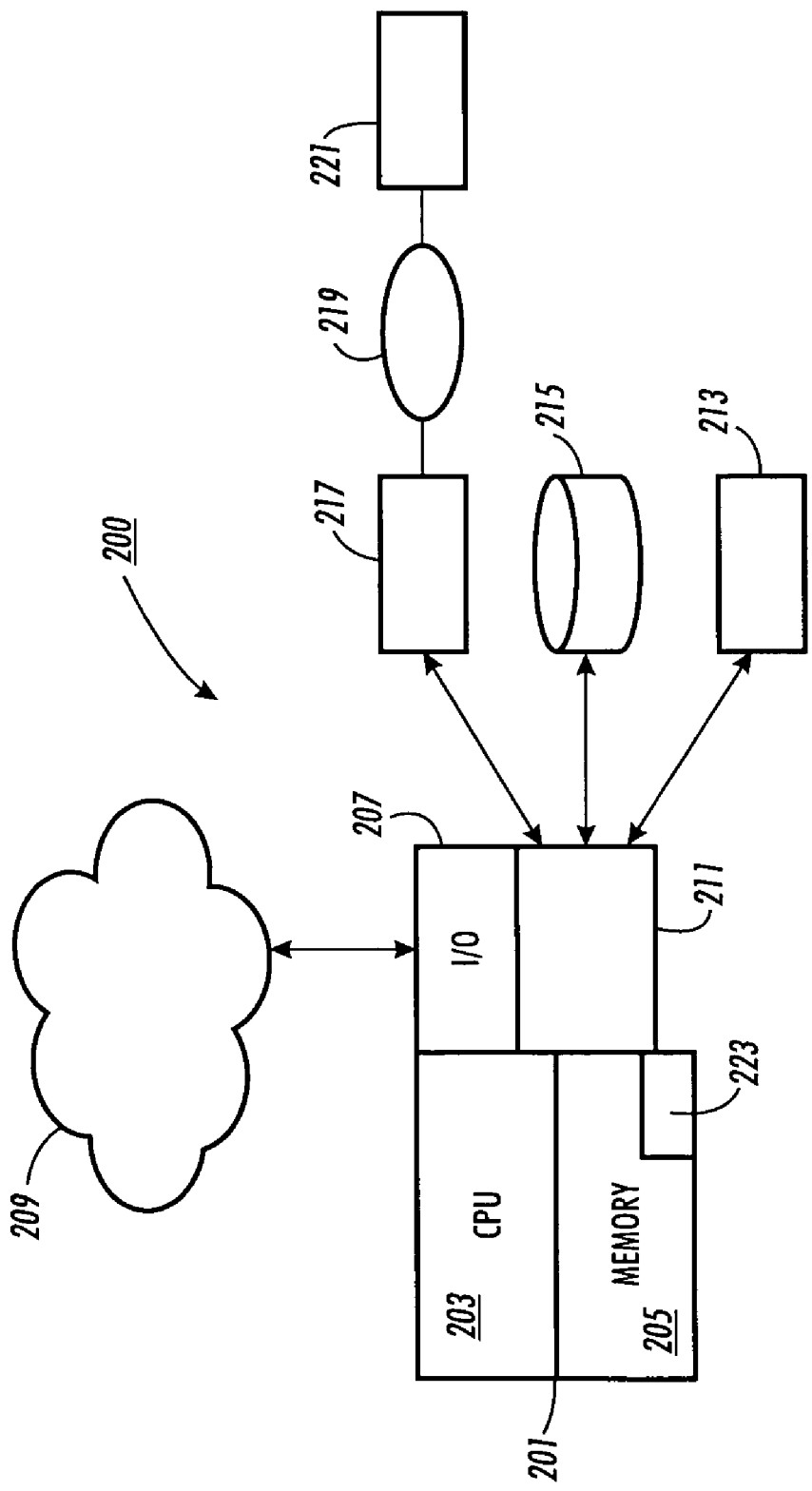
FIG. 2 illustrates a group communication server in accordance with an embodiment.

FIG. 2 illustrates a group communication server 200 that incorporates the invention. The group communication server 200 includes a computer 201 that incorporates a CPU 203, a memory 205, and a network interface 207. The network interface 207 provides the computer 201 with access to a network 209. The computer 201 also includes an I/O interface 211 that can be connected to a user interface device(s) 213, a storage system 215, and a removable data device 217. The removable data device 217 can read a computer readable media 219 that typically contains a program product 221. The storage system 215 (along with the removable data device 217) and the computer readable media 219 comprise a file storage mechanism. The program product 221 on the computer readable media 219 is generally read into the memory 205 as a program 223. In addition, the program product 221 can be provided from the network (generally encoded within an electromagnetic carrier wave—including light, radio, and electronic signaling) through the network interface 207.

One skilled in the art will understand that not all of the displayed features of the computer 201 need to be present for the invention. One skilled in the art will understand that the network transmits information (such as data that defines audible information as well as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer usable data carrier.

Figure 3:
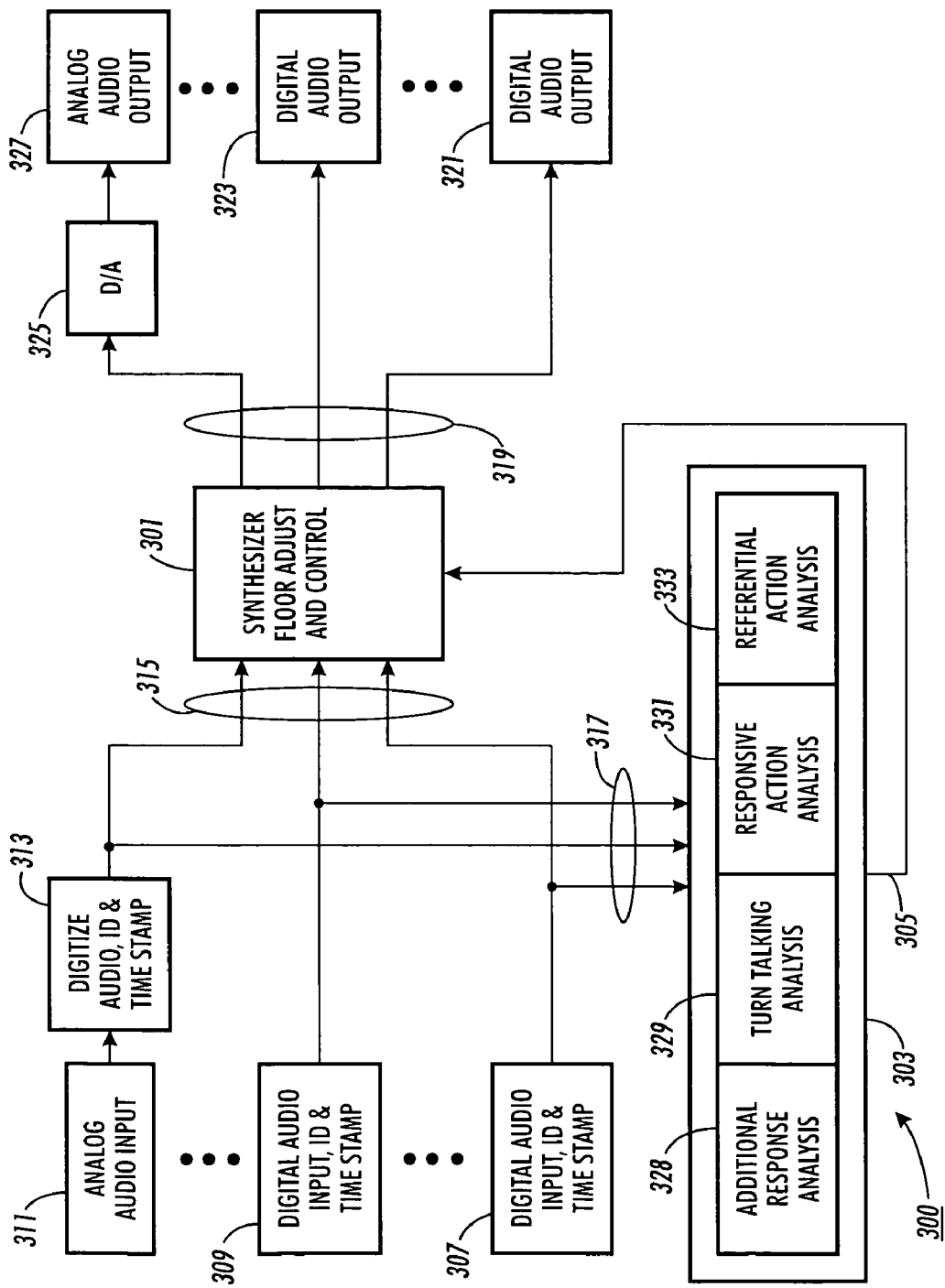
FIG. 3 illustrates a group communication server architecture in accordance with an embodiment.

FIG. 3 illustrates a group communication system architecture 300 that illustrates one embodiment of the invention. This architecture can be implemented in circuitry, in a suitably programmed computer, or using a combination of programmed computer and circuitry. A user is associated with a source and an output. A user's vocalizations are provided to an audio source and the vocalizations of every 'other user' (possibly modified) are mixed and presented to an output associated with the user for presentation to the user. Both the sources and the outputs can be "virtual" in that the result is a digitized audio packet that includes an identification (for example, the identification can be that of a user, a virtual bi-directional channel, or include separate identifiers for the source and output virtual channels) and a timestamp.

The timestamp and the source/output identification can be added to the packet by a tagger.

The group communication system architecture 300 includes an audio mixer 301 that can be conditioned to mix digital audio from N sources to N or more outputs where the audio from each source can be individually controlled when mixed for each of the outputs. The audio mixer 301 can thus mix the various sources specifically for each output. This mixing can be controlled by a set of mixing parameters or floor controls.

Generally, there is an audio source and an output dedicated to each user (although outputs that are not associated with a source are contemplated by the inventors for monitoring purposes). In addition, additional inputs can be included that do not have a corresponding output (for example, computer generated system status messages, or override communications).

The group communication system architecture 300 also includes a floor analysis module 303 that is used to analyze data for conversational characteristics. The results of the floor analysis module 303 can be used to automatically determine establishment of conversational group membership. The floor analysis module 303 then effectuates the conversational floors by specifying the set of mixing parameters for the audio mixer 301. The set of mixing parameters are communicated from the floor analysis module 303 to the audio mixer 301 over a floor control path 305.

The group communication system architecture 300 includes a first digital audio source and tagger 307 through an $n^{th}$ digital audio source and tagger 309 and may include an analog source 311 that feeds an audio digitizer and tagger 313. The tagger portion of these elements inserts source identification and can insert time-stamp information into the digitized audio packets. These audio sources can be receivers that receive the audio streams.

The digitized and tagged audio data is provided to the inputs of the audio mixer 301 over one or more mixer audio data paths 315. The digital audio data is also provided, via one or more analysis audio data paths 317 to the floor analysis module 303. The floor analysis module 303 analyzes the available conversational characteristics (for example, of the audio data received over the one or more analysis audio data paths 317) to determine the values of the set of mixing parameters.

The audio mixer 301 communicates the mixed output audio over one or more output audio data paths 319 to a first digital audio output 321 through an $n^{th}$ digital audio output 323 and optionally over an audio digital to analog converter (D/A) 325 connected to an analog audio output 327.

One skilled in the art will understand that, although multiple sources and output are indicated in FIG. 3, once the audio packets are digitized and contain a source identifier, a single physical input/output communication mechanism (for example, a network interface) is sufficient to transmit or receive the packets. The relevant requirement is that the audio from each source is identified. That identification can be accomplished by a digitizing input mechanism, by electronics that is in communication with the digitizing input mechanism, or by electronics that is associated with a particular physical source input or other mechanisms well understood in the art. Furthermore, the digitized audio from a given source can be associated with a virtual device that provides an interface to the audio stream from that source. The separate paths indicated in FIG. 3 for the one or more mixer audio data paths 315, the one or more analysis audio data paths 317, and the one or more output audio data paths 319 can be a single path carrying digitized audio packets that are identified according to source. Such a one will also understand that there are a multitude of techniques for handling audio data and for temporally aligning the audio data each of which are contemplated for use by the inventors. Furthermore, the techniques related to temporally aligning the audio data can be performed by each of the plurality of audible sources 105, can be done at the group communication server 103 or in some combination.

An 'additional response analysis' module 328 can be included that receives non-audio data such as video information, biometric information, eye-tracking information etc. The 'additional response analysis' module 328 can analyze this data to determine conversational characteristics that can be correlated with the audio information provided by the one or more analysis audio data paths 317 as well as information developed by other modules in the floor analysis module 303. The analysis results of the 'additional response analysis' module 328 are incorporated with the other analysis performed by the floor analysis module 303 to control the audio mixer 301.

The floor analysis module 303 also analyzes conversational characteristics and can also contain one or more analysis modules such as a 'turn-taking analysis' module 329, a 'responsive action analysis' module 331, and/or a 'referential action analysis' module 333 as well as a conversational floor configuration thread as will be subsequently described primarily with respect to FIG. 7, FIG. 13, FIG. 15, and FIG. 17. The results of the analysis is used to control the floor controls and/or set of mixing parameters used by the audio mixer 301.

The first digital audio source and tagger 307 through the $n^{th}$ digital audio source and tagger 309 and the ID and time stamp portion of the audio digitizer and tagger 313 are used to identify the input source of the digitized data and can mark the data with the time it was received.

One skilled in the art will understand that other embodiments of the invention can use hybrid digital/analog circuitry for the audio mixer 301. In such an embodiment, the floor analysis module 303 could provide its own audio digitizers. Such a one will also understand that the first digital audio source and tagger 307 through the $n^{th}$ digital audio source and tagger 309 and the analog source 311 are generally associated with the corresponding output. Each source/output is usually associated with a user who performs vocalizations that are picked up by an input device (such as a microphone) and digitized. The user also listens to the audio produced by the corresponding audio output.

The audio information from each source/output to and from the group communication server 103 can be made available over one or more ports into the group communication server 103 but generally the digitized audio information is packetized and communicated over a network. In addition, there need not be a one-to-one correspondence between the sources and the outputs (thus allowing for monitoring an output, or for an overriding source).

Figure 4:
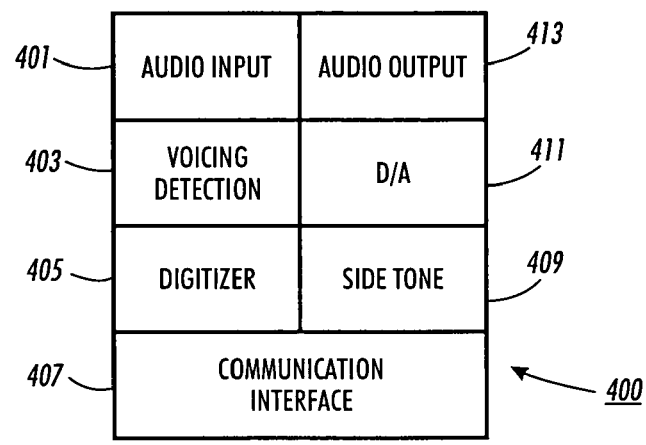
FIG. 4 illustrates a remote digital audio microphone system in accordance with an embodiment.

FIG. 4 illustrates a remote digital audio microphone system 400 that can be used to provide digitized audio data to any of the first digital audio source and tagger 307 through the $n^{th}$ digital audio source and tagger 309. The remote digital audio microphone system 400 includes an audio input 401, can include a voicing detector 403 to determine when input from the microphone should be processed, and a digitizer 405 that digitizes analog signals from the audio input 401 (possibly responsive to the voicing detector 403). In addition, the remote digital audio microphone system 400 includes a communications interface 407 that sends and receives information to the group communication server 103 over the network 101. In addition, the remote digital audio microphone system 400 can include an optional side tone generator 409 (that feeds some of the audio received by the audio input 401 to the audio output 413) and includes a D/A converter 411 for converting digital audio information received by the communications interface 407 into analog information that can be presented by an audio output 413 (such as a headphone or speaker). One skilled in the art will understand that FIG. 4 represents possible features in the remote digital audio microphone system 400 and that these features can be combined in many different ways. Furthermore, the arrangement of devices in FIG. 4 need not imply the order that signals are processed.

One skilled in the art will understand that the remote digital audio microphone system 400 need not be as fully featured as shown. It only need include the audio input 401, the audio output 413, and some means of communicating the audio information to and from the group communication server 103.

Figure 5:
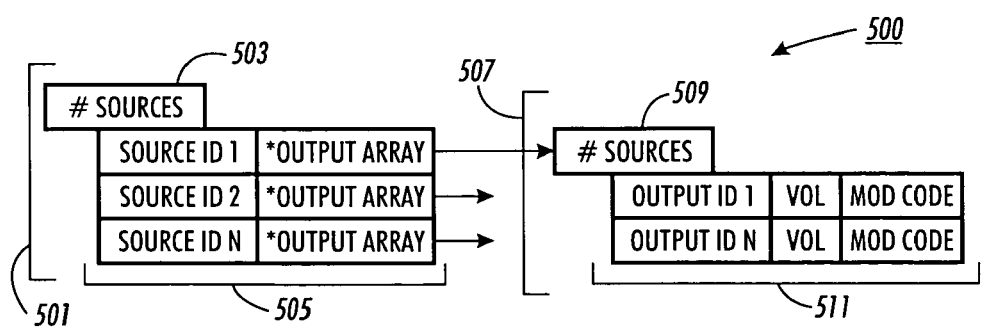
FIG. 5 illustrates an embodiment of a floor control data structure in accordance with an embodiment.

FIG. 5 illustrates a floor control data structure 500 that includes a source data structure 501 that has a number-of-sources field 503 and a source/output-structure-pointer array 505. The number-of-sources field 503 specifies the number of active sources (in some implementations this field can specify the total number of possible sources). The source/output-structure-pointer array 505 associates each source with a pointer to an output data structure 507. The output data structure 507 includes a number of outputs field 509 that specifies the number of outputs to which audio from the source is to be distributed. The contents of the number-of-sources field 503 and the output data structure 507 is generally expected to be the same (but can be different for transitional states or for special purpose applications). The output data structure 507 also includes an output control array 511 that can include an output identification field, a volume field and an audio modification field.

The source data structure 501 is used to distribute audio information from the associated source to each output as modified by the volume and audio modification fields for that output. The volume and audio modification fields are automatically adjusted by the floor analysis module 303 through the floor control path 305. Thus for each output, the audio mixer 301 can mix contributions from each source as specified by the floor control data structure 500.

The audio modification field is used to apply special effects to the mixed audio to help the user better distinguish audio originating from a different conversational floor as compared to audio originating from the user's current conversational floor. These special effects for the floor indication mechanism can include adding echo, intentional masking and/or other effects. This field can also be used to override the conversational floors for a communication (for example, for an override communication that must be heard by all). Furthermore the audio modification field (or an additional field) can include spatialization controls to change the apparent audio position of the audio source. Thus, in one embodiment, the audio from members of 'this user's' floor can always be auditorally placed in front of 'this user' while audio from other floors is placed to the side or behind 'this user'.

One skilled in the art, after reading the disclosure herein, can expand the floor control data structure 500 to support video focusing in a video conference situation. That is, as a conversational floor is established between participants of a video conferencing session, the members of the conversational floor have a different video representation than do the members of another conversational floor. These modifications can result in highlighting the views containing the 'other users' on 'this user's' conversational floor. The highlighting can be done by size, color, placement, etc. of the view. Furthermore, such a one will understand that in the textual communication environment, that the output control array 511 can contain fields that control the appearance of the text of the communication (for example, size, color, shading etc.) to indicate floor membership. Both the textual and video representations are examples of visual indications of floor membership. In addition, other visual representations of the floor configuration can be presented to the user(s) by graphical, textual, or other indicator mechanisms.

Describing now an embodiment of the group communication system architecture 300. This embodiment is described in the context of a multi-threaded procedural programming environment for use by a general-purpose computer. One skilled in the art will understand that there are many programming methodologies that can be used to program a general-purpose computer system in accordance to the group communication system architecture 300. In addition, such a one would understand that significant portions (or totality) of the group communication system architecture 300 can be implemented using special purpose circuitry.

Figure 6:
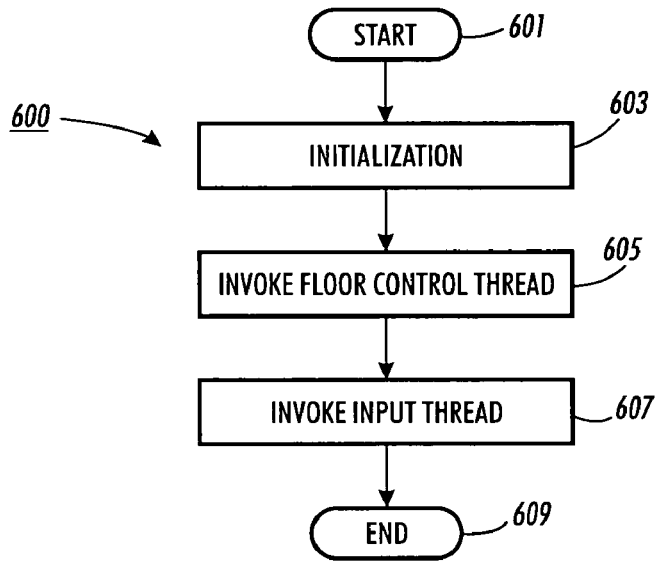
FIG. 6 illustrates a group communication server initialization thread in accordance with an embodiment.

FIG. 6 illustrates a 'group communication server initialization' thread 600 that is invoked as the group communication server 103 prepares to perform its function. The 'group communication server initialization' thread 600 initiates at a 'start' terminal 601 and continues to an 'initialization' procedure 603 that performs any required initializations (such as establishing appropriate data structures, enabling communications with the plurality of audible sources 105, and other initializations that would be apparent to one skilled in the art). After the 'initialization' procedure 603 completes, the 'group communication server initialization' thread 600 continues to an 'invoke floor configuration thread' procedure 605 that invokes the thread subsequently described with respect to FIG. 7 and an 'invoke source thread' procedure 607 that invokes the thread subsequently described with respect to FIG. 8. The 'group communication server initialization' thread 600 then completes through the 'end' terminal 609.

To automatically configure the audio mixer 301, each user's vocalizations are analyzed (as is subsequently described) and the results of the analysis are used to automatically modify the floor control data structure 500. In one embodiment, this analysis is performed by one or more threads-of-execution.

A procedure is a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs a function that is equivalent to the function performed by a computer executing the instructions.

Figure 7:
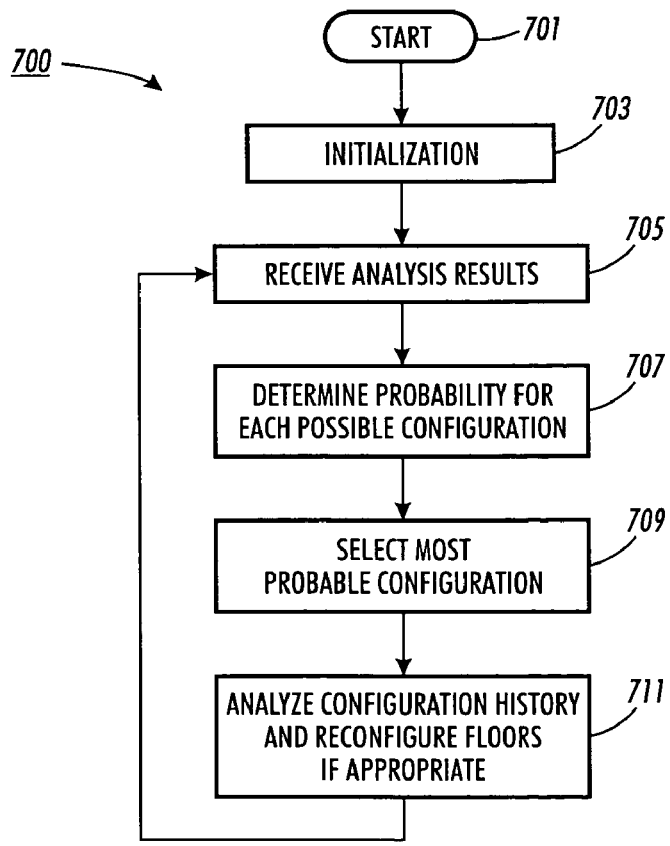
FIG. 7 illustrates a floor configuration thread in accordance with an embodiment.

FIG. 7 illustrates a 'floor configuration' thread 700 invoked by the 'invoke floor configuration thread' procedure 605 of FIG. 6 and that initiates at a 'start' terminal 701. This thread is responsible for receiving the results of the individual analysis modules, automatically determining and selecting the most likely configuration of audio sources from these results (thus determining conversational group membership), and for configuring the audio mixer 301 by adjusting values in the floor control data structure 500.

An 'initialization' procedure 703 provides any required initialization including the possible allocation and initialization of the floor control data structure 500 (if needed), initialization of the floor control path 305, the one or more mixer audio data paths 315, the one or more analysis audio data paths 317, and other initializations as would become apparent to one skilled in the art. After the 'floor configuration' thread 700 completes its initialization, it continues to a 'receive analysis results' procedure 705 that receives results from separate analysis threads such as those subsequently described with respect to FIG. 13, FIG. 15, and FIG. 17. Once a result from an analysis module is received, a 'determine configuration probabilities' procedure 707 determines the probability for at least some of the possible configurations that that configuration matches how the users are interacting in each conversational floor.

The per-configuration probabilities can be determined using a variety of methods. One method is that of maintaining a participant graph with a node for each user and with an edge between that user and each 'other user'. Each edge in the participant graph is weighted with the pair-wise probability that the two users connected by the edge are in conversation. The configuration with the highest mean weight is the most probable configuration. This example is subsequently described with respect to FIG. 18.

One skilled in the art will understand that as the number of sources increase, that the number of possible configuration combinations becomes much more numerous. While the probability for each possible configuration can be determined for small numbers of sources, as the number of sources increase the number of configurations can be managed using techniques known in the art.

Once the probabilities are determined for the relevant configurations, a 'select most probable configuration' procedure 709 selects the current most probable configuration. Then, a 'configure floors' procedure 711 analyzes the past history of the selected configurations and, if appropriate, will reconfigure the set of mixing parameters in the floor control data structure 500 (thus, changing the conversational floor configuration).

The 'configure floors' procedure 711 can also apply some hysteresis-like effects so that the conversational floor configuration does not change too rapidly (which results in a fluttering effect). Thus, it is useful to maintain a configuration for a minimum number of timeslices. A variety of methods can be used to determine this. For example, one option is to require a single configuration be maintained for a specified number of consecutive timeslices, another approach is to require a "random walk" distance of a specified number of timeslices before a change in the selected configuration is allowed (for example, if configuration A is the currently selected configuration, configurations B, C or D must be chosen a net total of 30 more timeslices relative to A before a configuration other than A can be selected). Other heuristic analysis can also be performed to help keep the conversational floors stable without interfering with the ability for the users in the conversational environment to have side conversations or otherwise switch conversational floors. The 'configure floors' procedure 711 changes the values in the floor control data structure 500 to change the conversational floor configuration. After the 'configure floors' procedure 711, the 'floor configuration' thread 700 continues back to the 'receive analysis results' procedure 705 to receive and process more analysis results.

Additional methods can be used to control the 'configure floors' procedure 711, in accordance with a state-based conversational model. For example, transitions between floor configurations can be controlled using deterministic state machines. One way to do so is to use deterministic finite state machines in which individual states represent particular floor configurations, but it is also possible for multiple states to correspond to particular floor configurations and vice versa. Alternatively, transitions between floor configurations can be controlled using probabilistic state machines, such as those based on Markov models or Hidden Markov Models (HMMs).

It should also be apparent that the 'configure floors' procedure 711, need not perform all types of analysis at the same temporal granularity used in the rest of the system. For example, even if audio samples are processed using a fixed 30 ms time granularity, the selection process for floor configuration can use features corresponding to variable-sized time units. One such approach uses so-called "segment-based" analysis, in which features are combined with an explicit time label indicating the duration for which the feature value is valid (segment length).

Users can be provided with tools to specify parameters that influence the operation of the 'floor configuration' thread 700. For example, particular preferences can be provided to specified users such that they are members of all conversational floors. In addition, vocalizations from some designated members (override members) may be given an override characteristic such that vocalizations from the override member cause other member's vocalizations to be silenced for the duration of the override member's communication. Another example is the provision of a "hold" mechanism that allows the user to require the 'floor configuration' thread 700 to maintain its current floor configuration with respect to that user. This "hold" mechanism and other useful mechanisms to override the automatic floor control can be invoked by traditional explicit user commands either vocal or by explicit user action. Further, in some embodiments, the system can be forced into a manual mode where the floor membership is explicitly controlled by the users.

Figure 8:
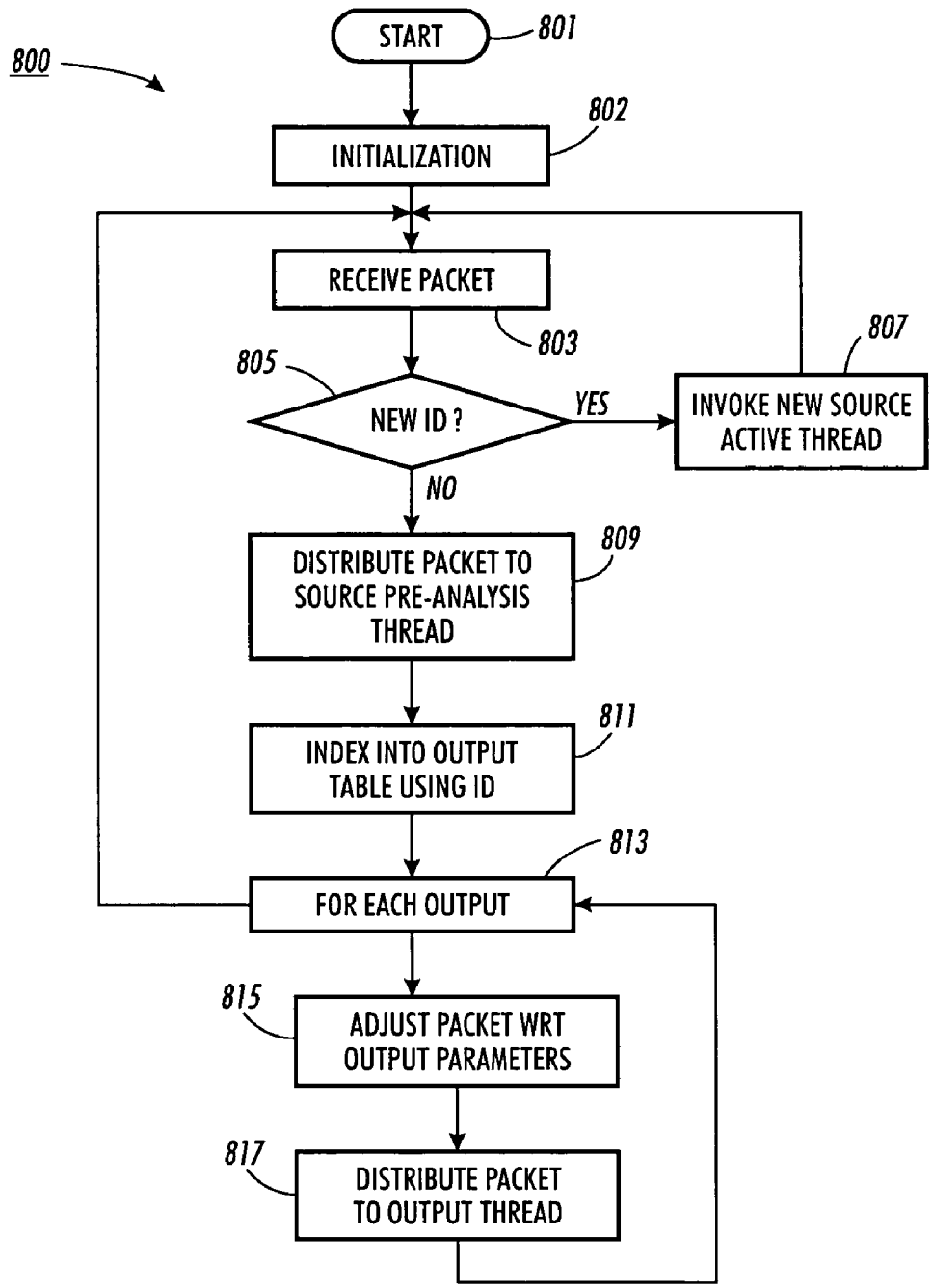
FIG. 8 illustrates an audio source handler thread in accordance with an embodiment.

FIG. 8 illustrates an 'audio source handler' thread 800 invoked by the 'invoke source thread' procedure 607 of FIG. 6 and that initiates at a 'start' terminal 801 and continues to an 'initialization' procedure 802 that performs any one-time initialization for the thread. Then the 'audio source handler' thread 800 continues to a 'receive packet' procedure 803 that receives a packet of digitized audio information from any of the one or more mixer audio data paths 315. A 'new identification' decision procedure 805 determines whether the packet was from a new source (by examining the packet identification information inserted in the packet by the ID and time stamp portion of the source input). If a new source is detected, the 'audio source handler' thread 800 continues to an 'invoke new active source thread' procedure 807 that starts a thread (as is subsequently described with respect to FIG. 9) for the newly activated source.

Figure 10:
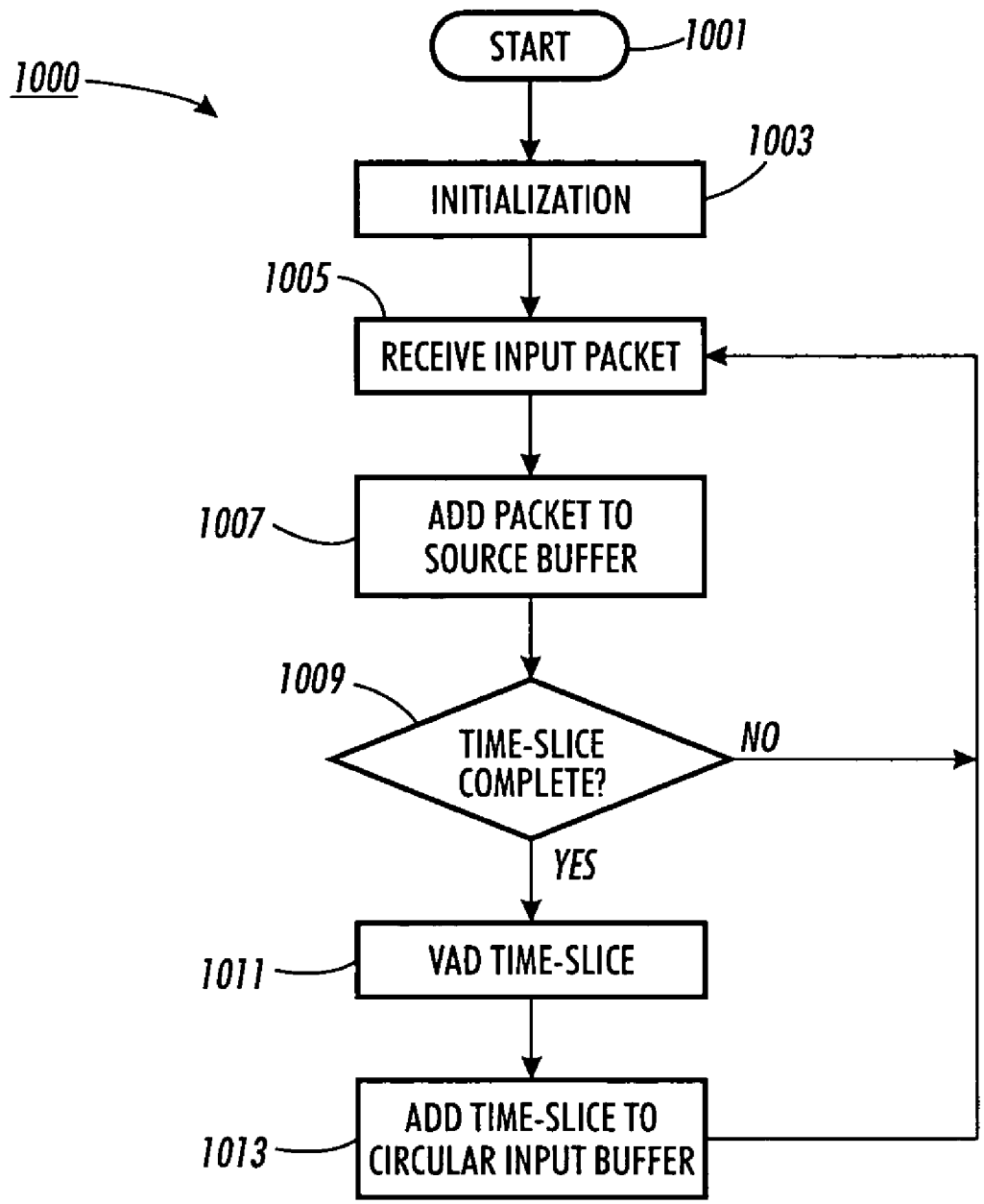
FIG. 10 illustrates a pre-analysis thread in accordance with an embodiment.

Otherwise, if the packet identifies its source as one that has been previously active, the 'audio source handler' thread 800 continues to a 'distribute packet to source pre-analysis thread' procedure 809 that sends a copy of the packet to the pre-analysis thread that is described with respect to FIG. 10. An 'index into output table' procedure 811 accesses the floor control data structure 500 to access the output control array 511 for audio information from the identified source. An 'iterate each output' procedure 813 then iterates each output in the output control array 511.

For each iterated output, an 'adjust packet WRT output parameters' procedure 815 creates a copy of the packet as adjusted with respect to the contents of the volume field and the modification code field. Next, a 'distribute packet to output thread' procedure 817 distributes the adjusted packet to the appropriate output thread. The output thread is subsequently described with respect to FIG. 11. After adjusted copies of the source packet have been distributed to the appropriate output threads (generally all of the output threads, but if the volume field indicates that the output is to have no contribution from this particular source, the packet need not be distributed to that output), the source packet can be released.

One skilled in the art will understand that the packet adjustment can be done by the output thread instead of by the 'audio source handler' thread 800.

Once the 'iterate each output' procedure 813 completes the iteration, the 'audio source handler' thread 800 continues back to the 'receive packet' procedure 803 to receive the next audio packet.

One skilled in the art will understand that in another embodiment copies of the source packet can be first distributed to the output queues, and then the original packet can be sent to the 'distribute packet to source pre-analysis thread' procedure 809. Both approaches provide the equivalent functionality, but one may be more conducive to parallelization.

It should be noted that the described implementation will drop the first audio packet from a newly activated source. This is a one-time occurrence. One skilled in the art after having read this description could re-flow the initial packet back onto the queue because the packet is already time-stamped.

Figure 9:
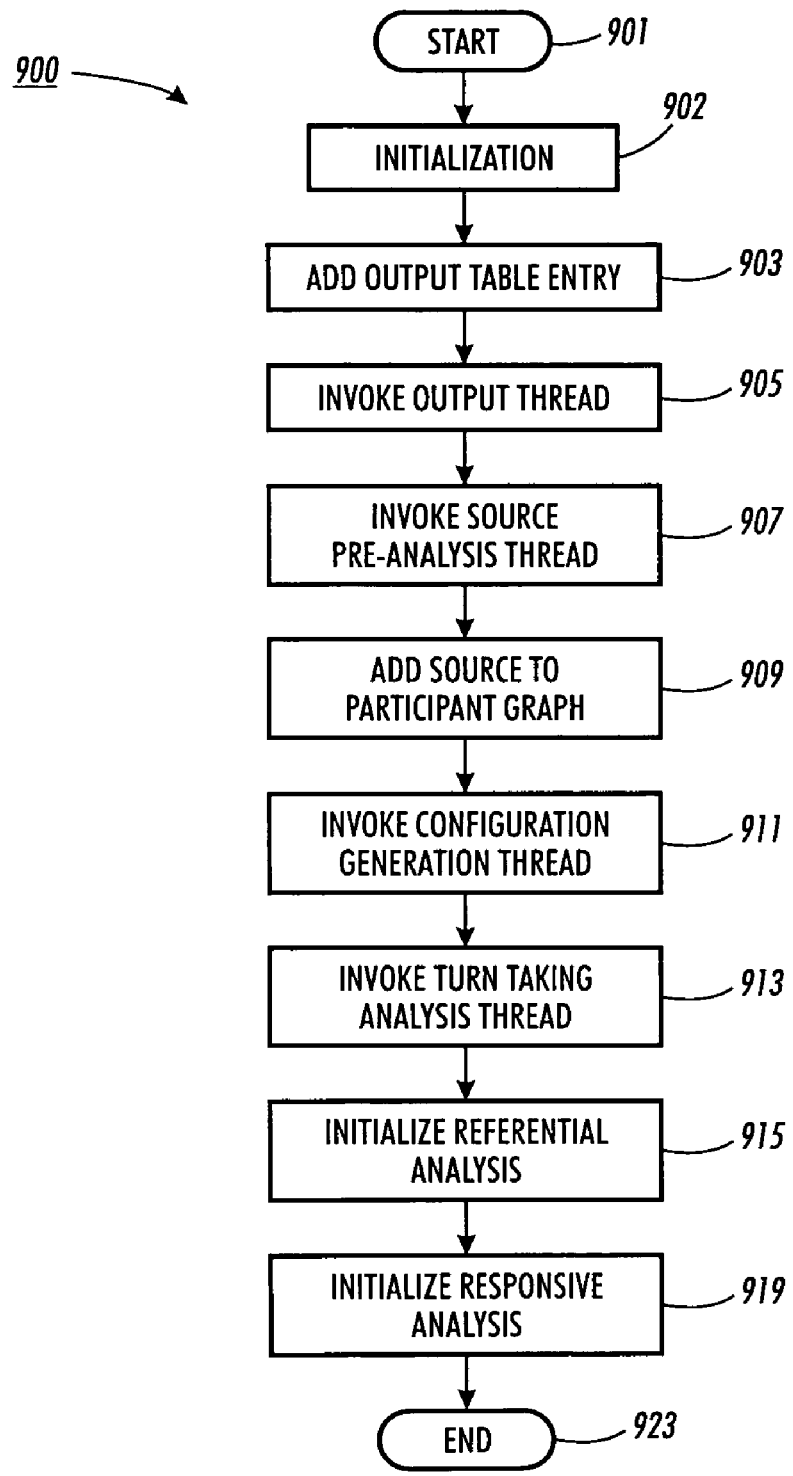
FIG. 9 illustrates a new active source active thread in accordance with an embodiment.

FIG. 9 illustrates a 'new active source' thread 900 that is invoked by the 'invoke new active source thread' procedure 807 of FIG. 8. The 'new active source' thread 900 is used to initialize the threads for handling a new user, for modifying the participant graph, and for initializing the analysis thread needed for the new user.

The 'new active source' thread 900 initiates at a 'start' terminal 901. An 'initialization' procedure 902 performs any required initialization. An 'add output table entry' procedure 903 updates the floor control data structure 500 to reflect the existence of the newly active source. Once the floor control data structure 500 is updated, the 'new active source' thread 900 can invoke the user output thread (that is subsequently described with respect to FIG. 11) through an 'invoke output thread' procedure 905. Once the user output thread starts execution, the new user will start to hear audio responsive to the initialization performed when the 'add output table entry' procedure 903 initialized the new entry in the floor control data structure 500.

An 'invoke source pre-analysis thread' procedure 907 invokes the pre-analysis thread that is subsequently described with respect to FIG. 10.

An 'add source to participant graph' procedure 909 adds the newly activated source to the participant graph (as a new user) and an 'invoke configuration generation thread' procedure 911 invokes the configuration generation thread that is subsequently described with respect to FIG. 12.

Figure 13:
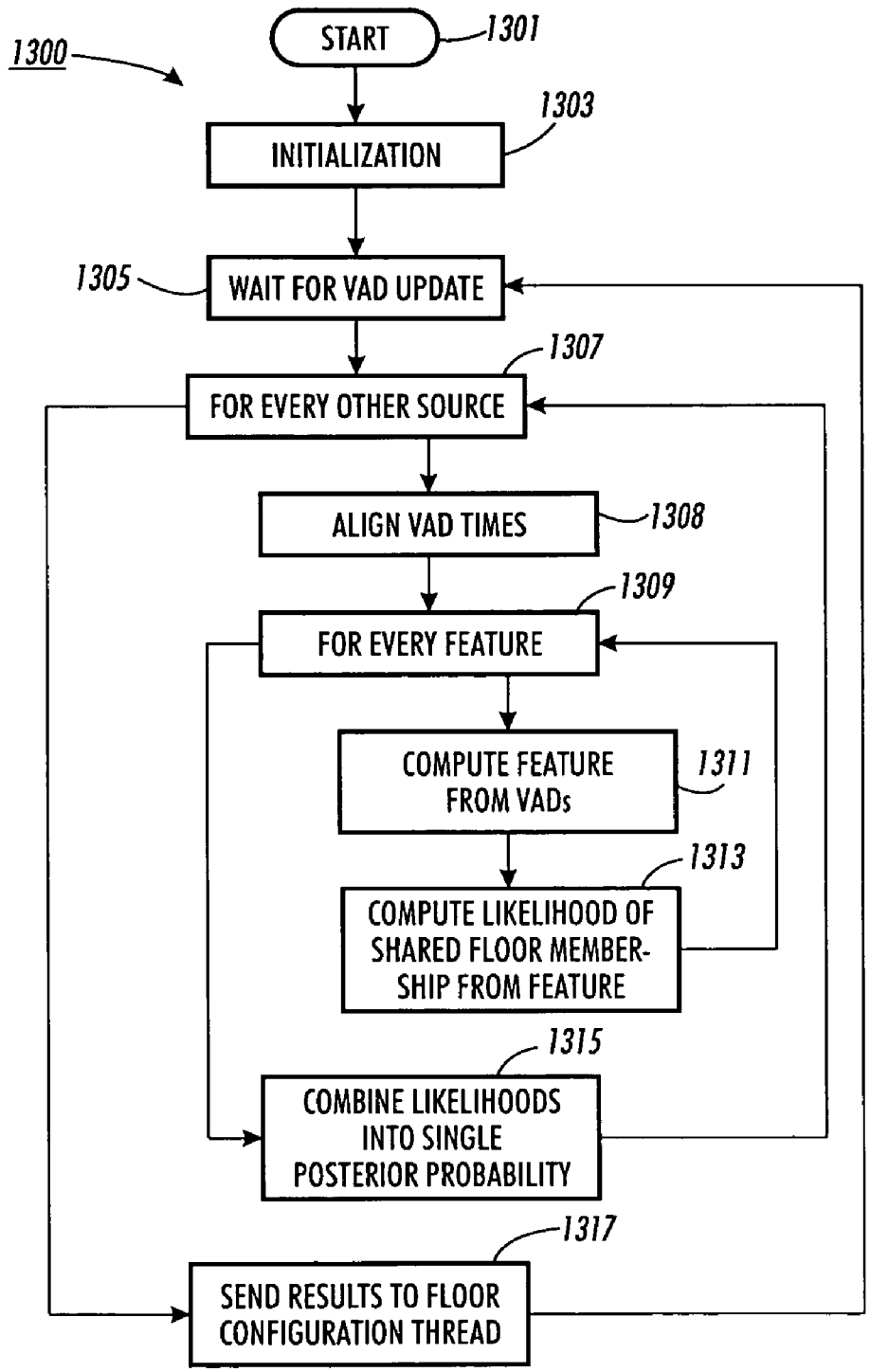
FIG. 13 illustrates a turn-taking analysis thread in accordance with an embodiment.

An 'invoke turn-taking analysis thread' procedure 913 then starts the turn-taking analysis thread that is subsequently described with respect to FIG. 13.

An 'initialize referential analysis' procedure 915 and an 'initialize responsive analysis' procedure 919 then invoke threads for initializing the referential analysis and responsive analysis threads as are subsequently described with respect to FIG. 14 and FIG. 16 respectively.

One skilled in the art will understand that other analysis threads, configuration threads, or capability threads can also be invoked for the new user at this time.

Finally, the 'new active source' thread 900 completes through an 'end' terminal 923. At this point, the audio mixer 301 is conditioned to add the audio received by the newly enabled source to the mix generated for each of the outputs. Thus, the user associated with the audio source will be able to hear the audio corresponding to the default mix. The configuration generation thread has been activated, and once the configurations that incorporate the new source are generated, and the analysis modules initialized, the floor analysis module 303 will be able to adjust the mix for the new user.

FIG. 10 illustrates a 'pre-analysis' thread 1000 that can be used to accumulate a timeslice of the received audio data and to perform an analysis of when the audio data represents a vocalization. To summarize, digital audio packets are received (sent by the 'distribute packet to source pre-analysis thread' procedure 809 of FIG. 8) and accumulated in a source-specific buffer until a timeslice of about 30 milliseconds of audio is captured. Once the timeslice is captured, it is analyzed to detect periods of vocalization (by a voice activity detector (VAD)). The VAD analysis generates a bit vector that represents whether vocalization is detected for the millisecond corresponding to the bit position in the vector. Each VAD vector is added to a VAD buffer for use by the analysis routines.

The 'pre-analysis' thread 1000 is invoked by the 'invoke source pre-analysis thread' procedure 907 of FIG. 9, initiates at a 'start' terminal 1001, and continues to an 'initialization' procedure 1003 to perform any required initialization. A 'receive source packet' procedure 1005 receives the audio packet from the 'distribute packet to source pre-analysis thread' procedure 809. Next, an 'add packet to source buffer' procedure 1007 adds the received audio packet to the timeslice data. A 'timeslice complete' decision procedure 1009 determines whether the timeslice buffer is full, and if the timeslice buffer is not full, the 'pre-analysis' thread 1000 continues back to the 'receive source packet' procedure 1005 to accept the next packet.

However, if the 'timeslice complete' decision procedure 1009 determines that the timeslice is complete, the 'pre-analysis' thread 1000 continues to a 'VAD timeslice' procedure 1011 that applies a voice activity detector (VAD) to the data in the timeslice to determine what portions of the timeslice correspond to vocalization. The 'VAD timeslice' procedure 1011 can also use information from a vocalization detection mechanism (for example, using a signal derived from a throat microphone). Once the VAD analysis completes for the timeslice, the results of the analysis are added to a VAD buffer. An 'add timeslice to circular source buffer' procedure 1013 then adds the timeslice audio data to a circular buffer (or other limited-size buffer mechanism) so that the audio information from the timeslice data is available to the other analysis threads. Finally, the 'pre-analysis' thread 1000 returns to the 'receive source packet' procedure 1005 to receive the next audio packet from its source.

The VAD is tuned to use one-millisecond frames to achieve the required temporal resolution. Other means, such as the use of multiple partially-overlapping frames at lower resolution, can be used to produce the required temporal resolution. The use of the VAD buffer is subsequently described with respect to FIG. 13. The VAD data is one example of a stream of feature data that results from analysis of the conversational communication. Other feature data can be generated by other analysis of VAD data, the audio, or other conversational characteristics. The feature data can be analyzed over a communicative interval.

Figure 11:
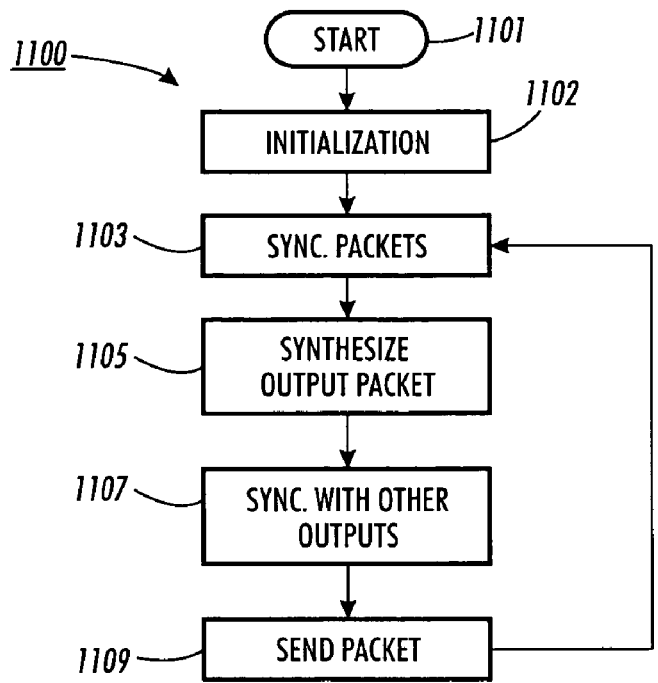
FIG. 11 illustrates a user output thread in accordance with an embodiment.

FIG. 11 illustrates a 'user output' thread 1100 that is invoked by the 'invoke output thread' procedure 905 and that initiates at a 'start' terminal 1101. The purpose of the 'user output' thread 1100 is to receive modified packets (modified as described with respect to the 'adjust packet WRT output parameters' procedure 815) from the 'distribute packet to output thread' procedure 817 from each of the sources. The packets from each source are synchronized and mixed to generate the audio output for the user. The audio output for one user can be synchronized with the other outputs (so that each output sends the corresponding information at substantially the same time) and then the packet is sent to the output for presentation to the user.

After initiation, the 'user output' thread 1100 continues to the 'initialization' procedure 1102 to perform any required one time initialization. A 'synchronize packets' procedure 1103 receives the modified audio packets from the 'distribute packet to output thread' procedure 817 and synchronizes them prior to mixing. Once the packets are synchronized, a 'mix output packet' procedure 1105 combines each of the adjusted source packets to generate an output packet. Once generated, a 'synchronize with other outputs' procedure 1107 can synchronize the output packet with the packets for the other outputs. Then a 'send output packet' procedure 1109 sends the output packet for presentation to a user (possibly after synchronization with the other outputs).

Figure 12:
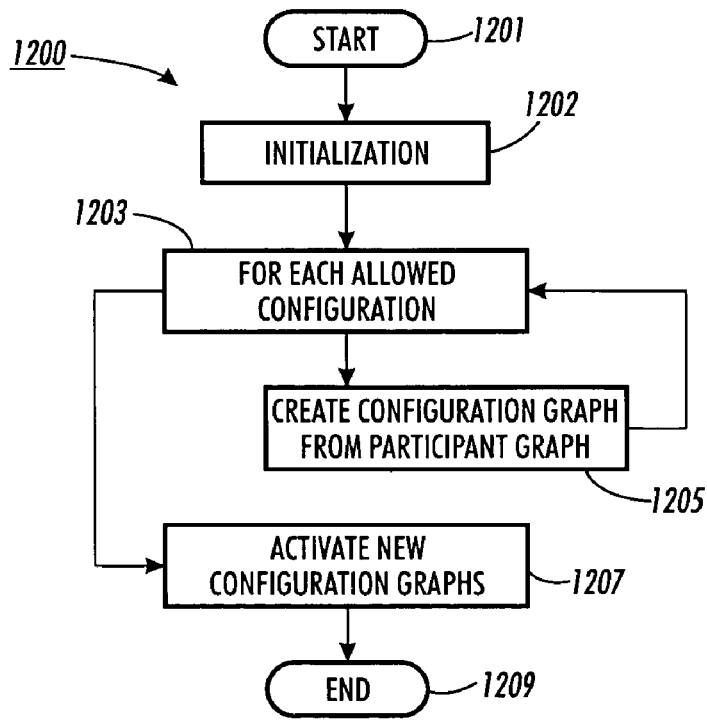
FIG. 12 illustrates a configuration generation thread in accordance with an embodiment.

FIG. 12 illustrates a 'configuration generation' thread 1200 that is invoked by the 'invoke configuration generation thread' procedure 911, that initiates at a 'start' terminal 1201 and continues to an 'initialization' procedure 1202. Next, an 'iteration' procedure 1203 iterates each allowed configuration.

As each allowed configuration is iterated, a 'create configuration graph' procedure 1205 creates a graph in memory representing the allowed configuration. This can include pre-weighting the edges of the configuration based on the weighting of the corresponding edges of the existing participant graph. Once the graphs from all the allowed configurations are created, an 'activate new configuration graphs' procedure 1207, classifies any new user(s) as a lurker (a user who has not sufficiently interacted with the other users to determine a conversational floor), renormalizes the probabilities to account for the new user(s), then conditions the analysis threads to use the new configurations, and releases the previous graphs. The 'configuration generation' thread 1200 then completes through an 'end' terminal 1209.

One skilled in the art will understand that as the number of participants increases, the number of possible combinations grows very rapidly. The 'iteration' procedure 1203 in some embodiments can provide a limitation in the number of possible configurations that are actually iterated.

The 'initialization' procedure 1202 in some configurations will only allow one copy of the 'configuration generation' thread 1200 to execute at a time because the generation of the configuration graphs can take considerable computing resources. In such an embodiment, the 'initialization' procedure 1202 remembers that a subsequent request has been made while a prior request is being serviced and will condition the 'configuration generation' thread 1200 to execute again after the configuration graphs from the prior request are activated.

The following is directed to the analysis performed on the audio information to determine the configuration probabilities used to establish conversational group membership and to set the floor control data structure 500.

One skilled in the art will understand that there can be considerable latency between the time one user makes a vocalization and the time that other users hear the vocalization. This delay is contributed to (for example) by the processing times required to digitize the vocalization, to send the digitized vocalization to the group communication server 103, the time required for the group communication server 103 to process the vocalization, and to send it to the other users. This delay needs to compensated for by many of the subsequently described analysis procedures. It also means that the analysis of two users is generally not symmetrical (the analysis of whether user A is responding to user B is different from the analysis of whether user B is responding to user A as in each case, the response is to what the user heard and the timeframe of that hearing).

One aspect of the invention is that of establishment of conversational group membership. "Establishment" may be expressed in a variety of ways based on known reasoning techniques. For example, membership may imply a binary classification ("users X and Y are in conversational floor A"), or a belief such as "user X is in conversation with user Y with probability P."

To determine a conversational group membership, one aspect of the invention monitors each user's vocalizations. Thus, when 'this user' mentions another user's name at the beginning of 'this user's' vocalization, the probability is increased that 'this user' and the named 'other user' are in a conversation. This is referential analysis. Furthermore, if 'this user' is making backchannel vocalizations (vocalizing "words" such as, but without limitation, "uh-huh", "OK", "yep" etc.) with respect to the vocalization of the 'other user', it is more probable that 'this user' and the 'other user' are in communication. This is responsive analysis. Finally, if 'this user' and the 'other user' are exhibiting turn-taking behavior, it is much more probable that 'this user' and the 'other user' are in communication.

One aspect of the invention analyzes data for conversational characteristics. These characteristics include those that can be determined from analysis of the audio information from a subset of the audible sources or from physiological responses to the conversation (for example—but without limitation, responses measured by a biometric device and/or information from an eye-tracker device).

Some aspects of the invention require audio phrase-recognition capability (that is, the ability to recognize a user's name from an audio stream or to recognize specific short vocalizations from a user). Thus, these aspects of the invention do not require "deep" language understanding but instead use word/phrase recognition technology (however, the use of "deep" language understanding could be used to improve the analysis).

Each of the analysis modules determines quantitative measures corresponding to the measurement of a particular "feature." For example, one feature used by the turn-taking analysis is the amount of overlapping speech produced by speakers A and B over a specified time window.

The results of the analysis of user vocalizations or other conversational characteristics are combined on an ongoing basis using reasoning techniques known in the art. For example, raw quantitative features can be used to compute likelihoods that are combined to compute a posterior probability that speakers are or are not participating in the same conversational floor.

The quantitative features can be computed in a pair-wise fashion; once the pair-wise probabilities are computed, they can then be used to compute a conversational floor configuration that is most consistent with all of the evidence developed from the features. One way to do this is to divide a set of speaking users (speakers) into disjoint sets (for example, each disjoint set containing two or more speakers). Users who have not yet (or not recently) provided enough vocalization to be placed in a conversational floor (lurkers) can receive all communications, can be placed in a particular conversational floor, or otherwise handled in a default manner.

One algorithm to create the sets is to enumerate all possible configurations of such sets where each configuration is represented as a completely connected weighted graph in which the nodes are users and the edge weights are the posterior probabilities that the connected users are communicating; the configuration with the highest mean edge weight is the most likely configuration for the speakers.

Once the most probable configuration is determined (and in some embodiments after considering a lagging or smoothing effect to the change of configuration) the set of mixing parameters for the audio mixer 301 characteristics are changed (for example, by changing the values in the floor control data structure 500) to enhance the output for each user dependent on the user's conversational floor (as has been previously described with respect to FIG. 7). In one embodiment, these changes enhance the contribution from each of the users in the same conversational floor as the listener while degrading the contribution from each of the users that are not in the same conversational floor as the listener (other changes can be envisioned). These enhancements and derogations are specified by the values in the "mod code" field of the output data structure 507 and can include:

(a) Increasing the volume of the vocalizations corresponding to members of the group and decreasing the volume of non-member vocalizations.
 (b) Applying conventional audio effects to "highlight" members' vocalizations or "muddy" nonmembers' vocalizations.
 (c) Obfuscating (partially or completely) the vocalizations corresponding to non-members. For example, using the block-scrambling algorithm of Smith & Hudson, *Low Disturbance Audio For Awareness and Privacy in Media Space Applications*, ACM Multimedia 95—Electronic Proceedings, Nov. 5-9, 1995.
 (d) Suppressing all conversations except for an override communication.
 (e) Adding additional audio cues indicating floor membership.

One skilled in the art will understand that additional fields can be added to the output data structure 507 to enable other types of indications of floor membership. For textual communication, for example, the floors can be distinguished by changing the typeface, the color, the size, shading or changing any other textual parameter. For video indications of floor membership, the presentation of the video representing the user can be adjusted such as by grouping the video of members on the floor together, by changing the image size, brightness, contrast, rotation, outline, framing, frame rate, and/or by having some other graphical connections between the members of each floor (for example, lines).

Turning now to the further discussion of some of the analysis aspects of the invention. FIG. 13 illustrates a 'turn taking analysis' thread 1300 that determines when users are taking turns talking with each other.

The 'turn taking analysis' thread 1300 is invoked by the 'invoke turn-taking analysis thread' procedure 913, initiates at a 'start' terminal 1301 and continues to an 'initialization' procedure 1303 that performs any required initialization. Then the 'turn taking analysis' thread 1300 continues to a 'wait for VAD update' procedure 1305 that delays until at least one new entry is added to the VAD buffer by the 'add timeslice to circular source buffer' procedure 1013. Once the new VAD entry is added, the 'turn taking analysis' thread 1300 continues to an 'iterate every other source' procedure 1307 that iterates over every source other than the source associated with the 'turn taking analysis' thread 1300. For each other source, an 'align VAD times' procedure 1308 temporally aligns 'this user's' VAD and the 'other user's' VAD so that the subsequent feature determination uses the same time base (thus synchronizing portions of the two audio streams). Next, an 'iterate every feature' procedure 1309 invokes every module that computes a quantitative value related to 'this user' and the 'other user'.

For each iterated feature, a 'determine feature from VADs' procedure 1311 examines the VADs to determine quantitative measurements of turn-taking characteristics. Each feature can analyze an arbitrary portion of the two users' VAD buffers.

Example features include those that: (1) indicate that two speakers are in the same conversational floor (for example, but without limitation, by detecting when one speaker starts vocalizing at a transition relevance place (TRP) of another speaker, and by detecting when one speaker has anticipated a TRP of another speaker, etc.); and (2) indicate that two speakers are not in the same conversational floor (for example, but without limitation, by detecting sustained periods of overlapping speech with the two speakers, and by detecting a lack of correlation between the speakers with respect to starting their speech at TRPs, etc.)

One skilled in the art will understand that temporally aligning the VADs can be as simple as specifying a starting bit location in the VAD buffer for each of the VADs.

A 'determine likelihood of shared floor' procedure 1313 then determines the likelihood from the quantitative values returned from the feature that 'this user' and the 'other user' share a conversational floor. The likelihoods for a feature can be determined in various ways. One such way is by comparing the measured feature value with a distribution of likelihoods for that feature.

After all the features are iterated, the 'turn taking analysis' thread 1300 continues to a 'determine single posterior probability' procedure 1315 that evaluates and combines the likelihoods and generates a single posterior probability that 'this user' and the 'other user' are in the same conversational floor. This can be done using a variety of methods (such as multiplying the likelihoods from statistically independent features, and/or other ways known in the art to generate a posterior probability).

When all the 'other users' have been iterated, the 'turn taking analysis' thread 1300 continues to a 'send result to floor configuration thread' procedure 1317 that sends the results of the analysis to the 'floor configuration' thread 700 and the 'turn taking analysis' thread 1300 returns to the 'wait for VAD update' procedure 1305 for the next analysis iteration.

The VAD buffer is large enough to account for the maximum time interval examined by any of the feature modules iterated by the 'iterate every feature' procedure 1309 as well as the amount of relative time adjustment required to temporally align the 'this user's' VAD buffer with the 'other user's' VAD buffer by the 'align VAD times' procedure 1308. In some embodiments, the VAD buffer is large enough to store on the order of 30 seconds of VAD information.

The amount of time required for alignment of 'this user's' and the 'other user's' VAD buffer is variable, but is of the order of 350 milliseconds.

Note that the pair-wise probabilities for the two users need not be symmetric. The feature computation from user 1 to user 2 is generally different from the feature computation from user 2 to user 1 because user 1 and user 2 VAD buffers are temporally aligned differently.

Another way to make probabilistic inferences of conversational group membership (that is whether two users are in the same conversational floor) is when one user vocalizes an identifier of another user or identifiable group of users (for example, a proper name, nickname, call sign, group name etc.). Some of these inferences include the use of audible identifiers when addressing a vocalization (for example, "Jim, I need . . ."), change in vocalization volume and/or other techniques. In this case, the principle is that a speaker tends to address certain conversational turns to specific recipients by using the recipients' proper names early in the turn. This happens frequently during the first turn of a given schism (the schism-inducing turn). That is, when a speaker is initiating a schism and wishes to involve another user, it is common for the initiating speaker to name the initial listening user. Word-spotting technology provides a sufficient capability to recognize these names. However, full speech recognition will improve reliability. Note that the system need not know what names actually correspond to what speakers—instead, it is sufficient to recognize that names are being used, since it is the use of names at the start of a vocalization that marks a potential schism. A wordspotting tool or a limited-vocabulary speech recognition engine can therefore be trained using lists of known proper names instead of the proper names of the actual speakers.

This mechanism is particularly important if one wishes to identify the first turn of such schisms before the schism-inducing turn ends.

Furthermore, the initial vocalization in a given sequence of turns of talk usually has greater speech energy amplitude (volume level) than the immediately preceding turns in the previous sequence. This can be a means of gaining a new addressee's attention, or a way of asserting one's right to take the turn. In either case, the act of raising one's volume is directed toward a recipient or recipients to bring the schisming act to their attention. Like the use of proper names, this is a means of identifying possible schism-inducing turns—schism-inducing turns will begin new turn sequences, though not all new turn sequences involve schisms. Features are used to compute conversational floor configurations as described for the turn taking analysis previously described with respect to FIG. 7 and FIG. 13.

Figure 14:
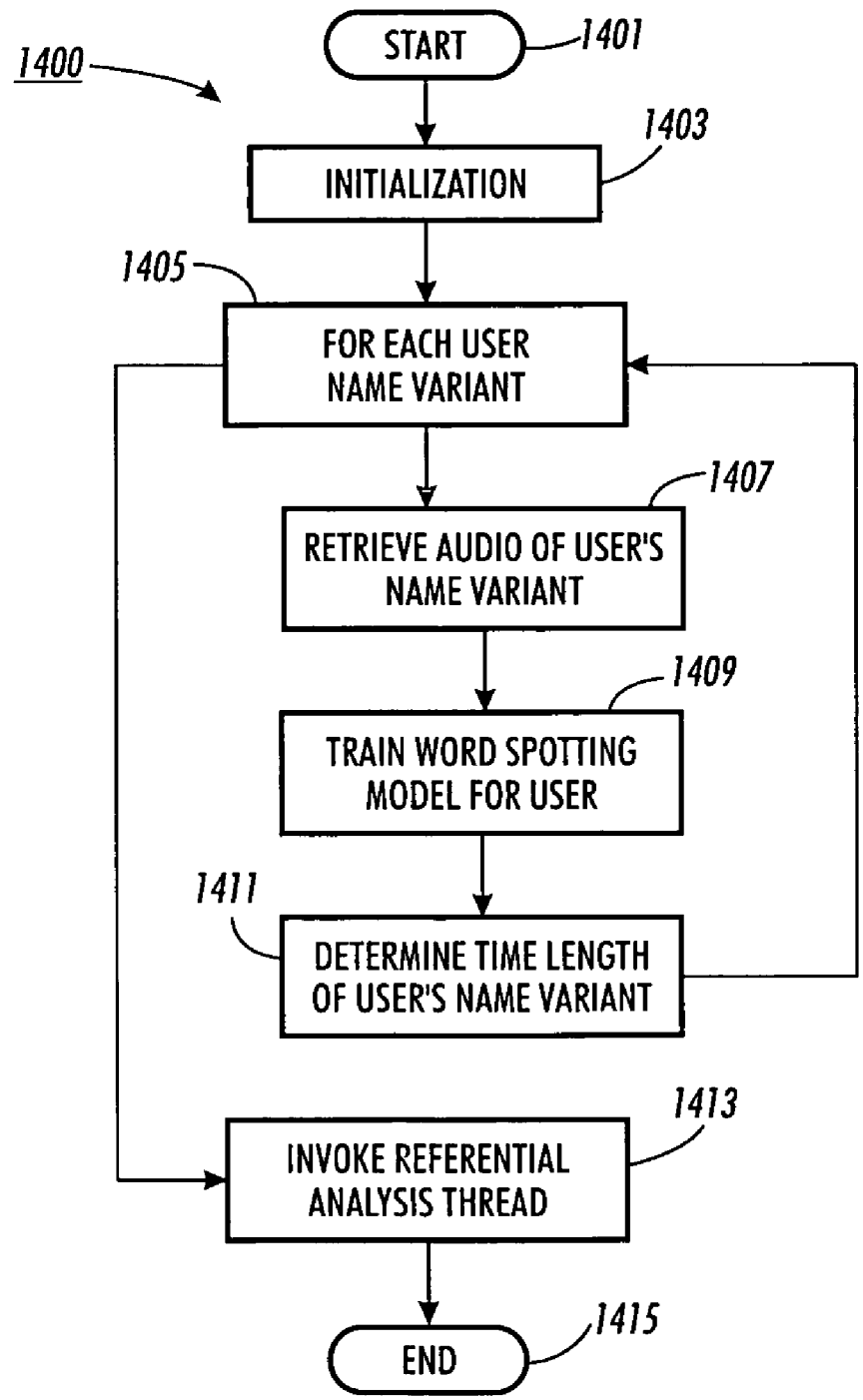
FIG. 14 illustrates a referential-action analysis initialization thread in accordance with an embodiment.

FIG. 14 illustrates a 'referential action analysis initialization' thread 1400 that is invoked by the 'initialize referential analysis' procedure 915 and initiates at the 'start' terminal 1401. The 'referential action analysis initialization' thread 1400 then continues to an 'initialization' procedure 1403 that performs any required initialization. Then an 'iterate user name variants' procedure 1405 iterates over each variant of 'this user's' name.

For each variant of the user's name, a 'retrieve audio of user name variant' procedure 1407 retrieves audio information from storage that is that of one variant of the user's name. This can include the given name of the user, an identifier of a group of users, a nickname and/or a handle.

Once the audio of the user's name variant is retrieved, a 'train wordspotting model for user name variant' procedure 1409 processes the audio data and trains the model to recognize the name variant. Depending on the model being used, every 'other user' may need to provide their own sample of 'this user's' name variant. Other models can be used that will use the name variant as spoken by 'this user' and allow 'other user's' use of the name to be recognized. In some embodiments, the wordspotting model is previously trained to recognize common names.

After the wordspotting model is trained, a 'determine time-length of user name variant' procedure 1411 determines the time required to vocalize the user's name variant.

After all the user's name variants have been processed, the 'referential action analysis initialization' thread 1400 continues to an 'invoke referential analysis thread' procedure 1413 that actually performs the referential analysis and that is subsequently described with respect to FIG. 15. Finally, the 'referential action analysis initialization' thread 1400 completes through an 'end' terminal 1415. One skilled in the art will understand that some embodiments need not train the wordspotting model as each new input is activated, but can instead (or in conjunction with) use an initially trained wordspotting model.

The 'train wordspotting model for user name variant' procedure 1409 trains a wordspotting model for one or more forms of the 'other user's' proper name. This can be done using techniques that apply, for example, Hidden Markov Models (HMM), and in particular HMM techniques that can train models dynamically. Wordspotting differs from full speech recognition in that it only involves detecting the presence of a limited number of specific words (sounds) in an audio stream as opposed to recognizing all words and building a linguistic model of what is being said. One skilled in the art will understand that to separate desired words from background sounds (those other than the desired words), some reasonably large amount of each user's speech may be required to statistically characterize the speech, for example, to create a "background HMM". Some algorithms require that the recording of 'this user's' name must be spoken by each 'other user' which is not unreasonable if the users use the system frequently and use it repetitively with each other, for example, groups of friends who often speak to each other. In any case, more recent advances in speaker-independent speech recognition technologies can be applied here since the word in question is known in advance.

Figure 15:
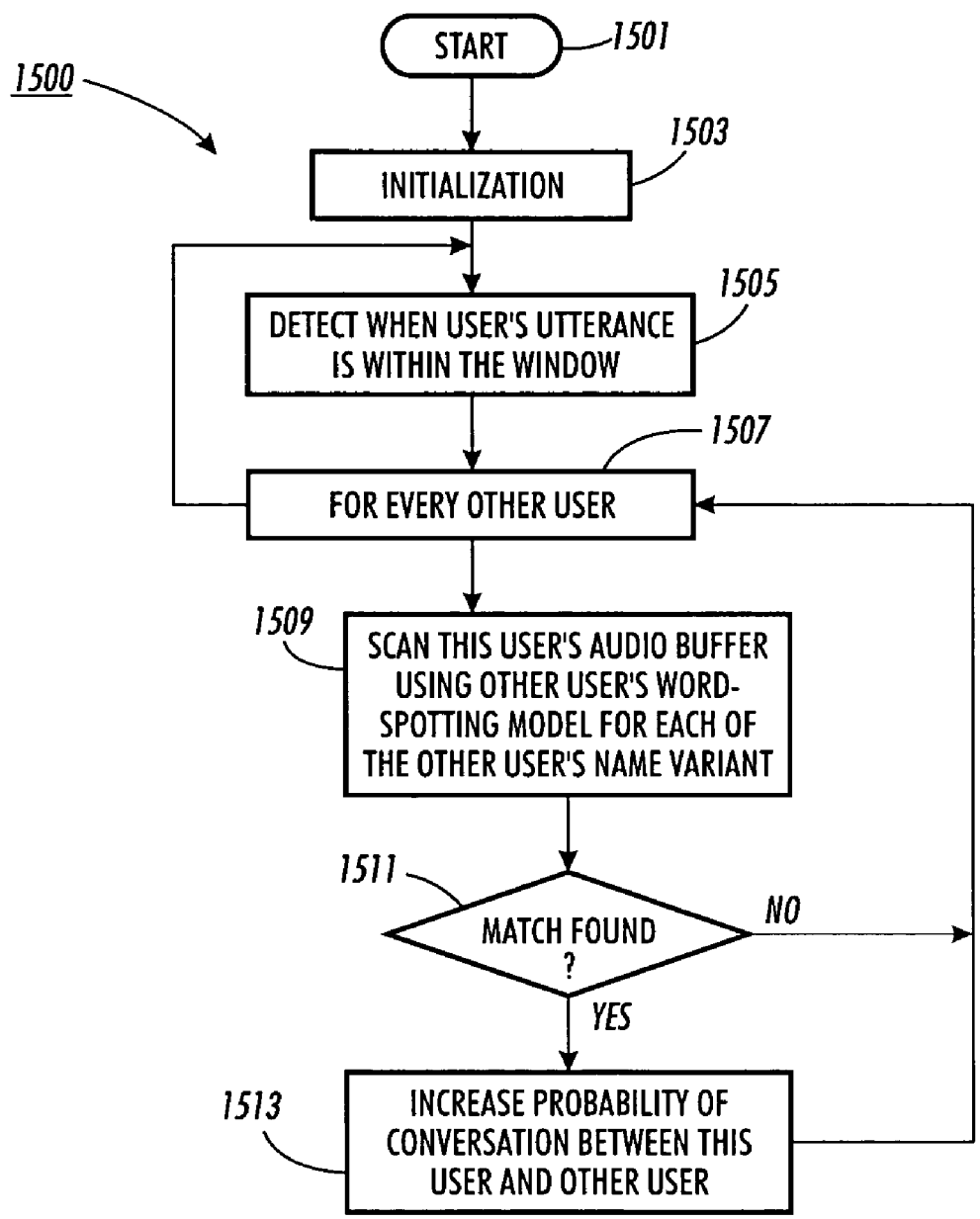
FIG. 15 illustrates one embodiment of a referential-action analysis thread in accordance with an embodiment.

FIG. 15 illustrates a 'referential action analysis' thread 1500 that is invoked by the 'invoke referential analysis thread' procedure 1413, initiates at a 'start' terminal 1501 and that is initialized by an 'initialization' procedure 1503. The 'referential action analysis' thread 1500 then continues to a 'detect user vocalization within window' procedure 1505 that determines whether the user's vocalization is early in the turn (thus, the vocalization occurring where a referential word is more likely to be used). When the user's vocalization is within the window, the 'referential action analysis' thread 1500 continues to an 'iterate every 'other user'' procedure 1507.

For each iterated 'other user', a 'scan for 'other user's' name' procedure 1509 scans 'this user's' audio buffer using the 'other user's' wordspotting model to determine whether 'this user' has vocalized a name variant of the 'other user'. A 'name found' decision procedure 1511 then determines whether one or more matching name variants were found. If no matching name variant was found, the 'referential action analysis' thread 1500 continues back to the 'iterate every 'other user'' procedure 1507 to check another user's name variants.

However, if a name was found at the 'name found' decision procedure 1511, the 'referential action analysis' thread 1500 continues to an 'increase conversation probability' procedure 1513 that increases the probability that 'this user' is in a conversation and increases the probability of a conversation between 'this user' and the 'other user' (by adjusting the probability associated with the corresponding edge between 'this user' and the 'other user' in the participant graph). Then, the 'referential action analysis' thread 1500 continues to the 'iterate every 'other user'' procedure 1507 to continue examining the 'other user' name variants.

At the completion of the 'iterate every 'other user'' procedure 1507, the 'referential action analysis' thread 1500 continues back to the 'detect user vocalization within window' procedure 1505.

To summarize the above, we want to know whether 'this user' has used 'other user's' name at the beginning of 'this user's' vocalization because this is evidence that 'this user' is trying to get 'other user's' attention. The effect is expressed as a higher probability rather than a binary decision because it is possible that 'other user's' name is not actually being used (wordspotting returns a probability of match) or that 'other user's' name is being used in some context other than a "hail". Note that we limit how "far into" the vocalization we look, not so much because wordspotting algorithms are expensive to compute (it can be done in real-time), but rather because the farther the word ('other user's' name) lies in the vocalization, the less likely it is to be used to "hail" the 'other user'. Furthermore, multiple name variants can be found each with its own probability. The 'increase conversation probability' procedure 1513 can pick the highest probability match, or use some combination of matches to increase the probability of conversation between the users.

Another way to help determine whether two users are in the same conversational floor is to make probabilistic inferences of conversational group membership based on one or more of 'this user's' conversational characteristics that are responsive to acts of 'other users'. In this aspect of the invention, temporal vocalization adjacency is also relevant to the analysis. Potentially relevant user actions include: Backchannel/continuers, Common content, and Prosody.

Backchannel/continuers. If the communication system provides audio content, then users usually produce speech ("uh huh," "hmm," "yeah") that is intended primarily to affirm the current speaker's right to hold their turn and continue speaking. Such backchannel vocalizations, or continuers, can be heuristically distinguished from regular turns by their short length and simple intonation structure. (These measures do not require speech recognition per se. Of course, speech recognition will improve the ability to distinguish backchannel responses by identifying certain vocalizations explicitly. However, heuristic "wordspotting" techniques, trained on corpora of the sounds that are known to make up most backchannel communication, are also effective.) If the communication system uses a non-synchronous medium, such backchannel information will be less frequent but will likely still be present.

Common content. Use of similar phrasing from one turn to another provides evidence that the speakers are in conversation. One way to determine this is to compare the temporal energy profiles of vocalizations (as in echo cancellation algorithms). Another way is to break vocalizations into smaller units (such as phonemes) and compare the distributions of various n-grams of these units. Another way is to use speech recognition. For example, speech can be converted to text using known speech recognition techniques. The text can then be compared using textual similarity algorithms drawn from, for example, the information retrieval art, with high content similarity scores being used to increase the probability that the speakers share a conversational floor. Since turns may constitute multiple statements, it may be useful to compare content similarity (using any of the above approaches, not just speech recognition) at a sub-turn granularity.

Prosody. Prosody refers to variation in pitch, loudness, tempo, and rhythm. If the communication system provides audio content, then speakers who are sharing a conversational floor tend to produce vocalizations following patterns corresponding to specific prosodic profiles. For example, speakers in a shared conversational floor exhibit similarities in the rhythm of their speech. That is, near-isochronous patterns of stress and emphasis can be identified for each vocalization and the rates of these patterns can be compared across vocalizations.

The existence of strong correlations between adjacent vocalizations by different speakers is evidence of participation in the same conversational floor. The potentially relevant user actions may be concurrent, for example, audible backchannel to a speaker while listening, or sequential, for example, use of rhythm or common phrasing in subsequent speech, relative to the others' acts. Features are used to compute conversational floor configurations such as described for the turn taking analysis previously described with respect to FIG. 7 and FIG. 13.

One skilled in the art will understand that the analysis described herein can also be applied to textual communication between more than two people. For example, chat, instant messaging and UNIX talk systems enabled for more than two people. For normal chat and instant messaging systems, where characters are not individually sent to the receiving individuals (in contrast to multiple-party versions of UNIX talk that individually transmit and display each character typed) some of the temporal window-related aspects of the analysis need not be done. However, the referential analysis directly applies as does common content analysis. Furthermore, there are communication characteristics common to those who use chat and instant messaging system. These characteristics can be analyzed accordingly.

Figure 16:
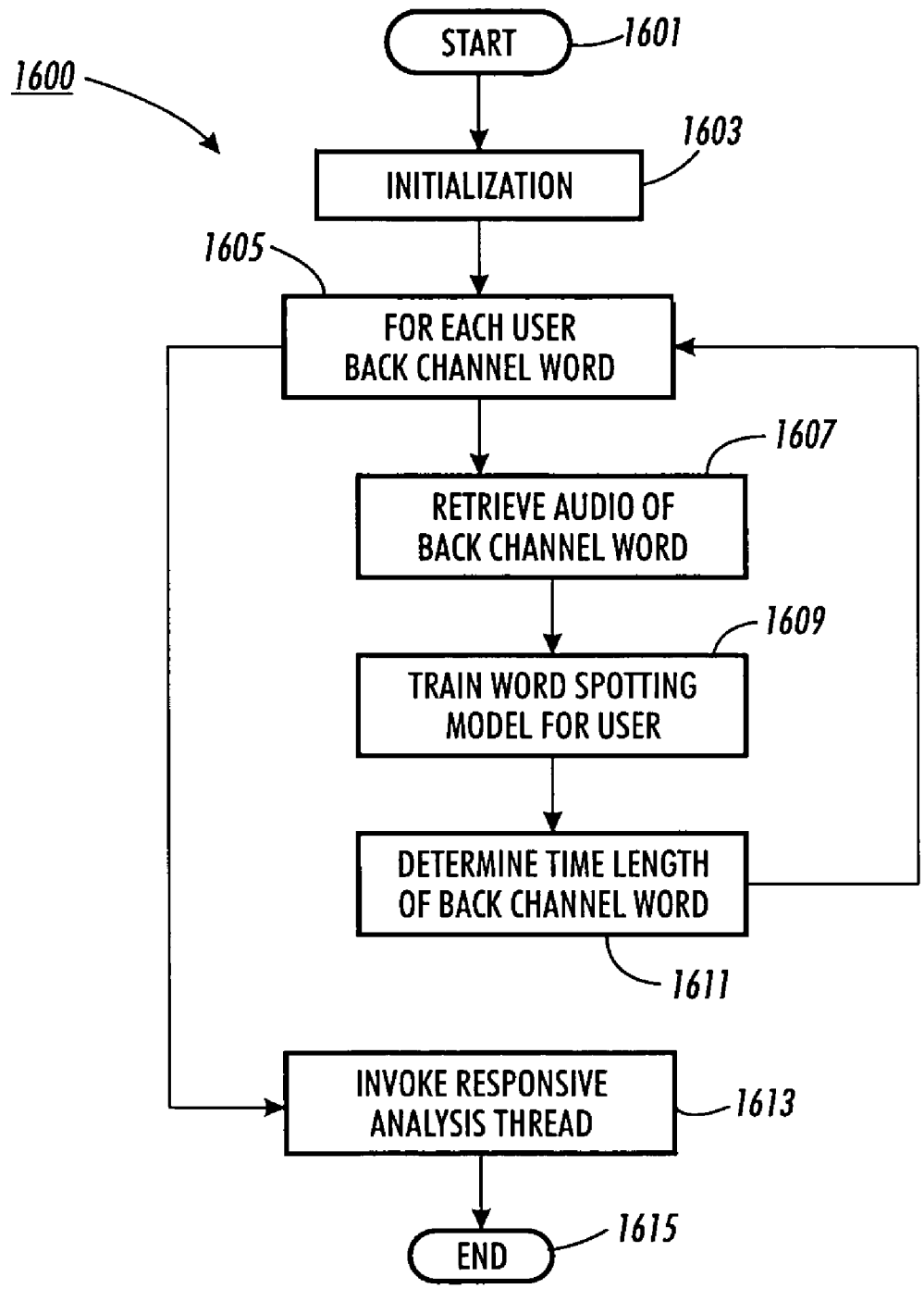
FIG. 16 illustrates one embodiment of a responsive-action analysis initialization process in accordance with an embodiment.

FIG. 16 illustrates a 'responsive action analysis initialization' thread 1600 that is invoked by the 'initialize responsive analysis' procedure 919, initiates at a 'start' terminal 1601, and continues to an 'initialization' procedure 1603 that performs any necessary initialization. The 'responsive action analysis initialization' thread 1600 then continues to an 'iterate each backchannel word' procedure 1605. For each iteration, a 'retrieve backchannel word audio' procedure 1607 retrieves the audio of the backchannel vocalization, and subjects this audio to a 'train wordspotting model for backchannel word' procedure 1609 that trains the user's wordspotting model to recognize the backchannel vocalization. A 'determine time length of backchannel word' procedure 1611 then determines the length of time required to make the vocalization to assist the wordspotting model. After all the backchannel words are processed, the 'responsive action analysis initialization' thread 1600 continues to an 'invoke analysis thread' procedure 1613 that invokes the analysis thread that is subsequently described with respect to FIG. 17. Finally, the 'responsive action analysis initialization' thread 1600 completes through an 'end' terminal 1615. One skilled in the art will understand that some embodiments need not train the wordspotting model as each new input is activated, but can instead (or in conjunction with) use an initially trained wordspotting model.

Figure 17:
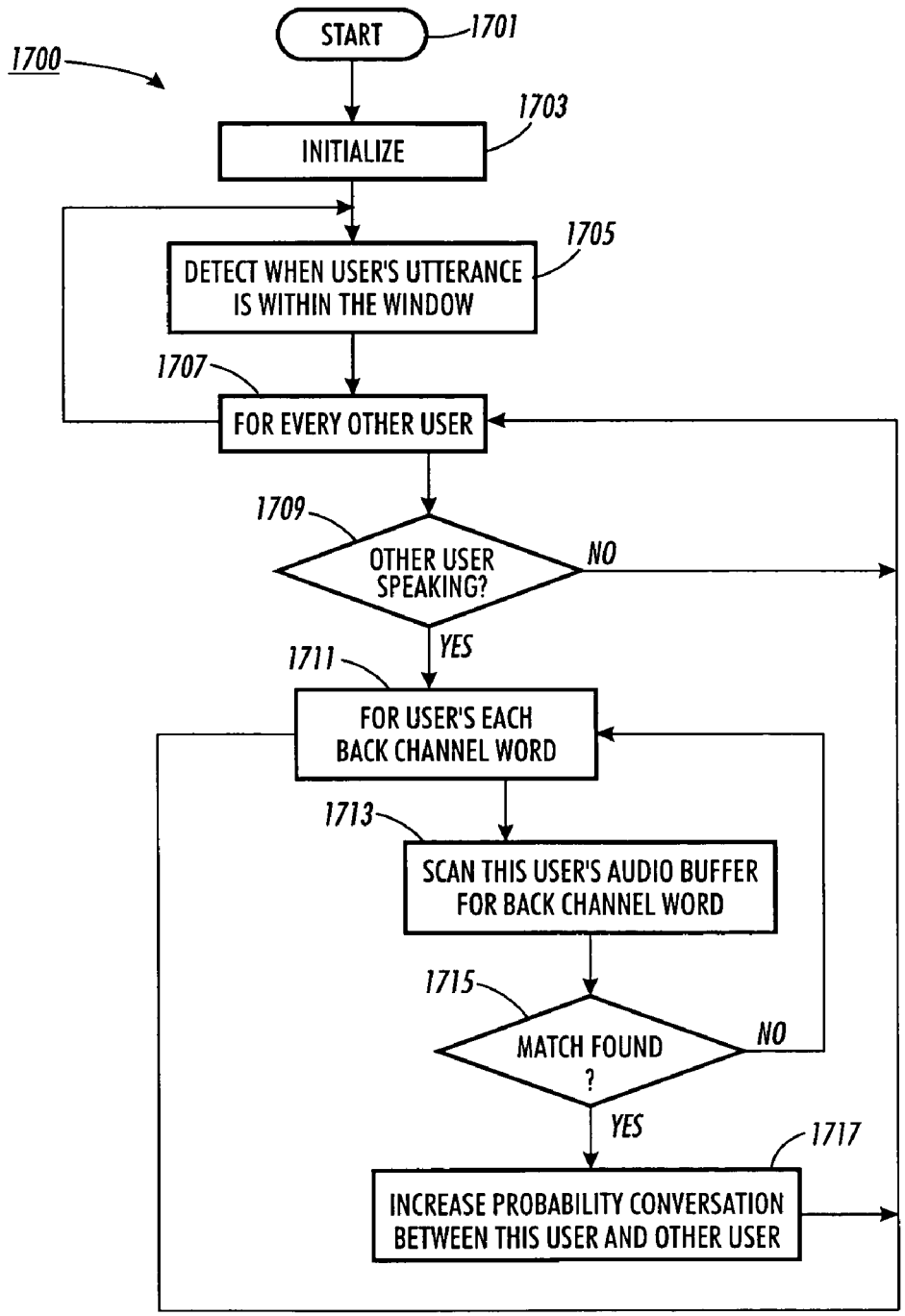
FIG. 17 illustrates one embodiment of a responsive-action analysis thread in accordance with an embodiment.

FIG. 17 illustrates a 'responsive action analysis' thread 1700 that is invoked by the 'invoke analysis thread' procedure 1613, initiates at a 'start' terminal 1701, and initializes at an 'initialization' procedure 1703. A 'detect user vocalization in window' procedure 1705 detects when 'this user' makes a vocalization within a minimum-length window. For this analysis, the window is such that 'this user' has continuously vocalized for a period at least as long as the shortest time length computed by a 'determine time length of backchannel word' procedure 1611. (If the user has not vocalized for at least this much time, none of the wordspotting models can possibly match the current vocalization.) Further, the continuous vocalization should not contain audio samples that have been previously matched by a backchannel wordspotting model. Once 'this user' makes a vocalization within the window, the 'responsive action analysis' thread 1700 continues to an 'iterate every other user' procedure 1707.

For each iterated user, an 'other user speaking' decision procedure 1709 determines whether the iterated user is vocalizing within a vocalization window. A user is vocalizing within the vocalization window when the user is currently speaking (or had been recently speaking, for a definition of "recently" that corresponds to a specified maximum period). If not, the 'responsive action analysis' thread 1700 goes back to the 'iterate every other user' procedure 1707.

Otherwise, the 'responsive action analysis' thread 1700 continues to an 'iterate user's backchannel words' procedure 1711 that iterates each of 'this user's' backchannel words. For each iterated backchannel word, a 'scan 'this user's' audio for backchannel word' procedure 1713 scans 'this user's' audio buffer to determine whether 'this user's' vocalization included the backchannel word. If no match was found for the iterated word, a 'word found' decision procedure 1715 causes the 'responsive action analysis' thread 1700 to go back to the 'iterate user's backchannel words' procedure 1711 to iterate the next backchannel word. However, if a match was found, the 'responsive action analysis' thread 1700 continues to an 'increase conversation probability' procedure 1717 that adjusts the probability in the participant graph that 'this user' and the 'other user' are in conversation. Then the 'responsive action analysis' thread 1700 continues to the 'iterate every other user' procedure 1707 to iterate the next 'other user'. Other embodiments can scan all of the backchannel words and appropriately combine the probabilities of the found words instead of (as is done in this implementation) advancing to the next user after the first backchannel word is found.

Once all the 'other users' have been iterated, the 'responsive action analysis' thread 1700 continues back to the 'detect user vocalization in window' procedure 1705 to detect another vocalization by 'this user' within the minimum-length window.

Figure 18:
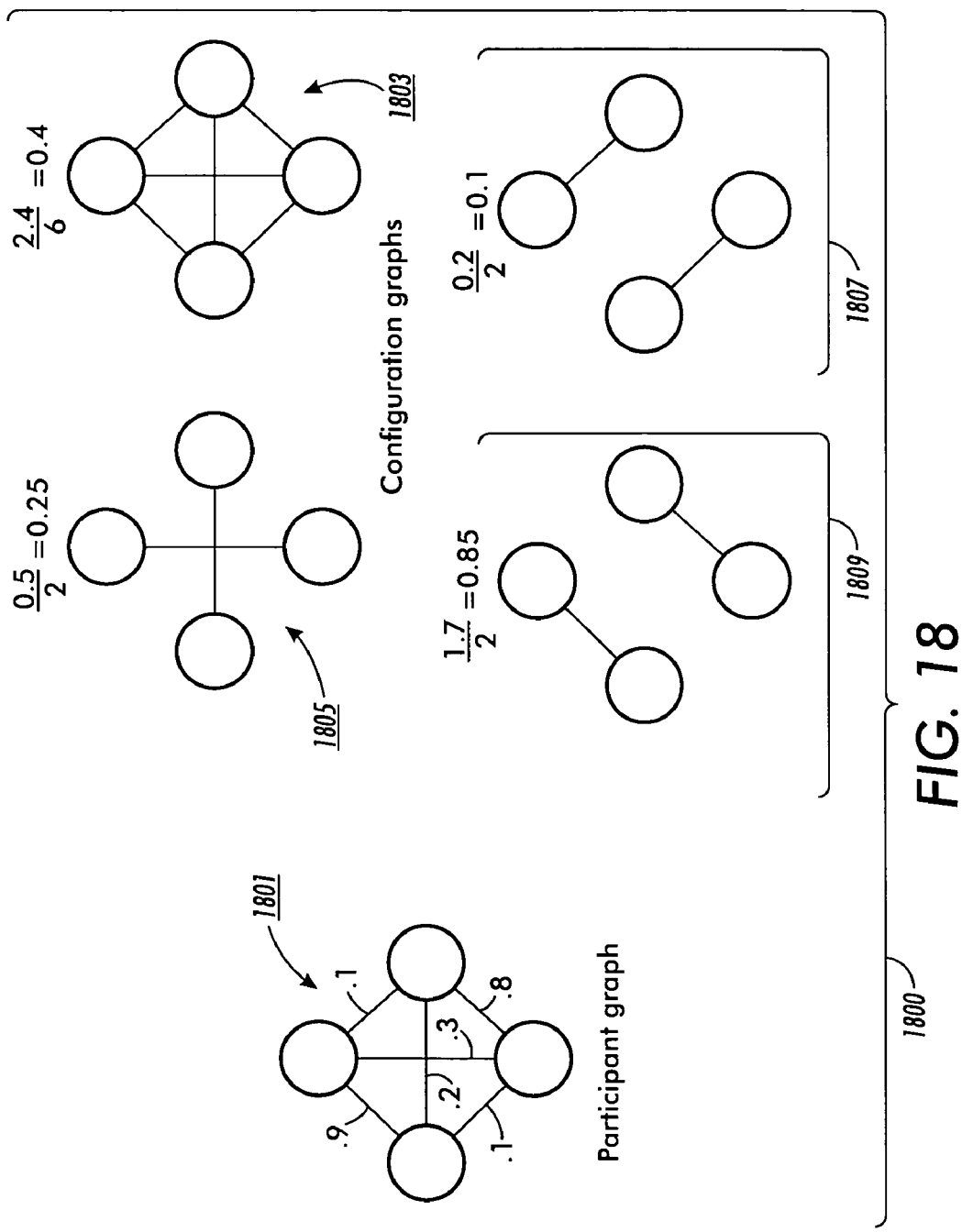
FIG. 18 illustrates example graphs that can be useful in understanding the threads of FIG. 7 and FIG. 12.

FIG. 18 illustrates a set of graphs for illustration 1800. One of the illustrated graphs is a participant graph 1801 that has nodes for the users, and weighted edges for the probability that users represented by the nodes are in conversation. Also shown are a number of configuration graphs that represent possible conversational configurations. These include a four-way configuration graph 1803, a first two-way configuration graph 1805, a second two-way configuration graph 1807, and a third two-way configuration graph 1809.

One way to determine the most likely conversational floor configuration is to find the average of all the weights for each of the configurations. Thus, the four-way configuration graph 1803 has an average weight of 0.4, the first two-way configuration graph 1805 has an average weight of 0.25, the second two-way configuration graph 1807 has an average weight of 0.1, and the third two-way configuration graph 1809 has an average weight of 0.85 making it the most likely conversational floor configuration.

One skilled in the art will understand that the inventive techniques disclosed at least in FIG. 15 and FIG. 17 can be used with other communication besides audio communications. Thus, referential and responsive analysis can also be applied to textual communication (such as chat, instant messaging, or UNIX talk as well as to other types of communication).

One skilled in the art will understand other implementation details that are not germane to any particular embodiment. These details include, but are not limited to, detection of activation and deactivation of a source, any cleanup after a source is deactivated, etc.

In addition, one skilled in the art will understand that there are many ways the invention can be implemented using different architectures as well as different embodiments of any given architecture. The contemplated architecture includes the range from complete hardware implementations through complete software implementations using any programming methodology or combinations of programming methodologies and include the possibility of having the processing capability distributed between the several devices (for example, where the mixing for each output is done on the device that receives the output).

Further, one skilled in the art will understand that the invention can be augmented with additional known types of inferential analysis that use input data other than those directly affected by conversation, that is, those employed by the present invention. For example, so-called context-awareness systems combine many kinds of physical sensor data and computer application data to make assessments of user activity. A context-aware system that is capable of tracking users' physical locations within a building can compute which users are co-present in a room; such a system might assess co-present users' vocalizations as having a high probability of being directed at each other as opposed to being directed at remote users (who are present in the computer-mediated communication system but not present in the room). These other types of inferential analysis can be integrated with the present invention in a variety of ways. For example, they can be loosely integrated in a way that provides parameters that influence the operation of the 'floor configuration' thread 700 as previously described for manual user inputs. Alternatively, they can be tightly integrated, perhaps being incorporated directly into a state machine that controls the operation of the present invention.

One skilled in the art will also understand that the invention allows multiple users of a shared communication environment to automatically establish conversational floors that allow different groups of users to converse while still having the capability of being aware of other conversations. Automatically here means that there is no explicit command, control action or control word that is used to establish the conversational floor. Instead, conversational characteristics are analyzed and used to establish the conversational floors. The invention can be applied to any shared environment having independently controlled output. Examples of such environments include audio-based Internet chat groups, emergency response communications, telephonic conference connections or other virtual telephonic party lines, teleconferencing systems, etc.

One skilled in the art will understand that known techniques can be used to extend the invention to shared communication environments in which not all users are necessarily in remote locations and associated with a personal input device (such as a microphone) and a personal output device (such as headphones). For example, rather than having users wear individual microphones, the physical environment (such as the rooms within a home or an office building) can be augmented with sensors that track individual users as well as directional beam-forming arrays consisting of multiple microphones. In this case, the vocalizations of each tracked user can be captured as a separate audio stream without using individually worn microphones and the invention operates as described previously. As another example, a single microphone can be used to capture an audio stream corresponding to multiple users. Known speaker-identification techniques can be used to detect conversational characteristics (such as speech activity) of multiple users even when captured as a single audio stream. Thus, substreams can be distinguished from the single audio stream and these substreams can be mixed and analyzed as previously described. Known audio processing algorithms can be used to reduce the salience of particular users' vocalizations, for example, using subtractive "signal cancellation" techniques, in response to the system's floor controls. In one embodiment, the invention can be used as a form of conversationally-selective hearing aid, being applied using a single open microphone worn by a specific user; in this case, all speech vocalizations except for those corresponding to speakers who are identified as being in conversation with the user wearing the open microphone could be reduced in salience.

From the foregoing, it will be appreciated that the invention has (without limitation) the following advantages:
  (a) Provides automatic self-configuration of electronically facilitated group communications.
  (b) Relative to computer mediated communication systems with manual floor control: facilitates: remote group communication in which conversational floors (subgroups) can schism and merge (form and coalesce) automatically. This is more lightweight, that is, requires less effort to use, than manual systems and therefore more appealing to users.
  (c) Relative to computer mediated communication systems with manual floor control: facilitates: remote group communication in which conversational floors can schism and merge spontaneously. This is more natural than manual systems, in which user interface gestures (such as mouse-clicks, button-pushes, or voice commands directed at the computer) must be planned and executed prior to a change in floor membership (unlike normal conversation where it happens without prior gestures directed at the computer), and therefore more appealing to users.
  (d) Relative to spatial audio systems: enables the user to distinguish audio from a primary audio conversation while retaining the ability to attend to multiple audio conversations, without the need to apply spatial audio effects. This obviates the need of spatial audio systems for delivery of binaural audio, which require (1) normal binaural hearing on the part of the user and (2) the use of stereo speakers or headphones.
  (e) Relative to spatial audio systems: enables straightforward audio separation by the user of dynamic groups of multiple speakers. Spatial audio enables separation of single speakers (since each is mapped to a spatial location), but to support dynamic groups of multiple speakers, spatial audio must change the location of some speakers, for example, by combining the speakers into one spatial location, or moving the spatial location of the speakers to bring them close together. If the multiple speakers are left in their original places as conversational groups change, the user must keep track of the various locations to which they must attend.

(f) Provides a unified conceptual and implementation framework for multi-party conversationally-responsive systems that can be extended to different methods of determining conversational participation, such as audio timing, audio content, text content, and biometric measurements (each of which may be optionally combined with explicit user actions). This allows for sharing of code between system implementations specialized for particular subsets of such methods as well as simplifying the addition of new methods to existing implementations. Previous approaches have been limited to explicit user actions.

(g) Provides a unified conceptual and implementation framework for multi-party conversationally-responsive systems that can be applied to systems using different communication delivery media, such as audio, video and text. This allows for sharing of code between system implementations specialized for particular subsets of such media as well as simplifying the addition of new media for existing implementations. Previous approaches have been limited to products implementing a specific combination of audio and video.

Alternative methods of influencing conversational behavior are also within the scope of the present invention. These methods can best be illustrated through the following architectural description and with reference to FIGS. 19-20. The methods center on the dynamic alteration of properties associated with communication channels in a way that influences conversational behavior.

Figure 19:
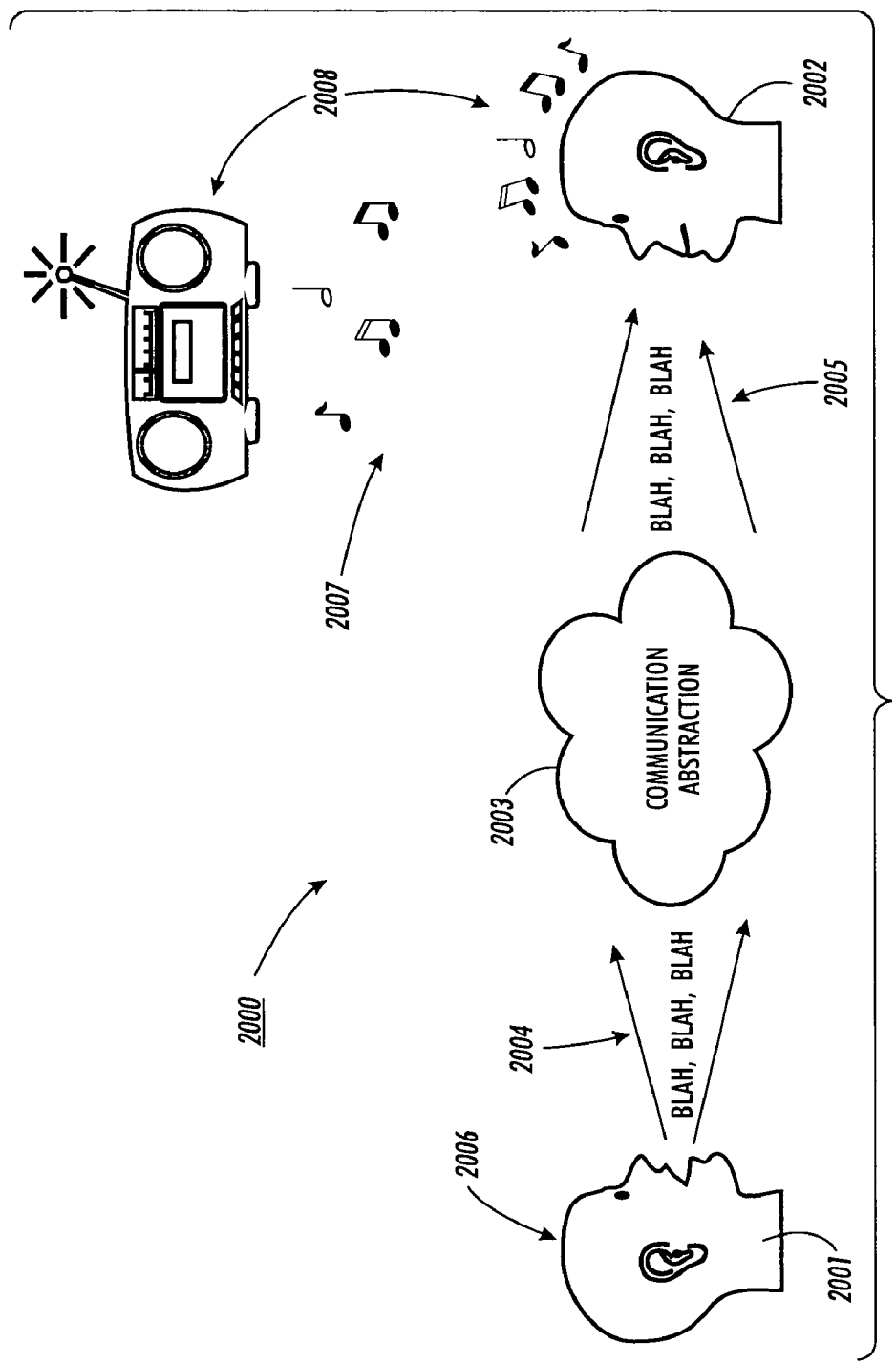
FIG. 19 illustrates a block diagram showing a communication channel established between a pair of participants.

FIG. 19 illustrates a block diagram showing a communication channel 2000 established between a pair of participants 2001, 2002. Each participant 2001, 2002 perceives the communication channel 2000 as a communication abstraction 2003 exposed at connection endpoints to facilitate the delivery of information. The implementation details relative to the physical communication devices required at each connection endpoint of the communication channel 2000 necessary to provide information delivery are hidden from each participant 2001, 2002. Instead, each participant only experiences the sending and receiving of information 2004, 2005, subject to interference and noise occurring in the communication channel 2000 and ambient environment 2006, 2008, as well as due to the participants 2001, 2002 and the information itself.

As an abstraction, information logically flows into the communication abstraction (direction 2004) from one or more of the participants 2001, moves through the communication channel, and flows out of the communication channel (direction 2005) to one or more other participants 2002. The information flow is not limited to unidirectional relay and can be provided bi- or multi-directionally from one-to-one, one-to-many, many-to-one, and many-to-many participants. In addition, the communication channel can be provided in simplex (one-way), half-duplex (one direction at a time), and full-duplex (two directions at a time) transmission modes, as is known in the art.

Figure 20:
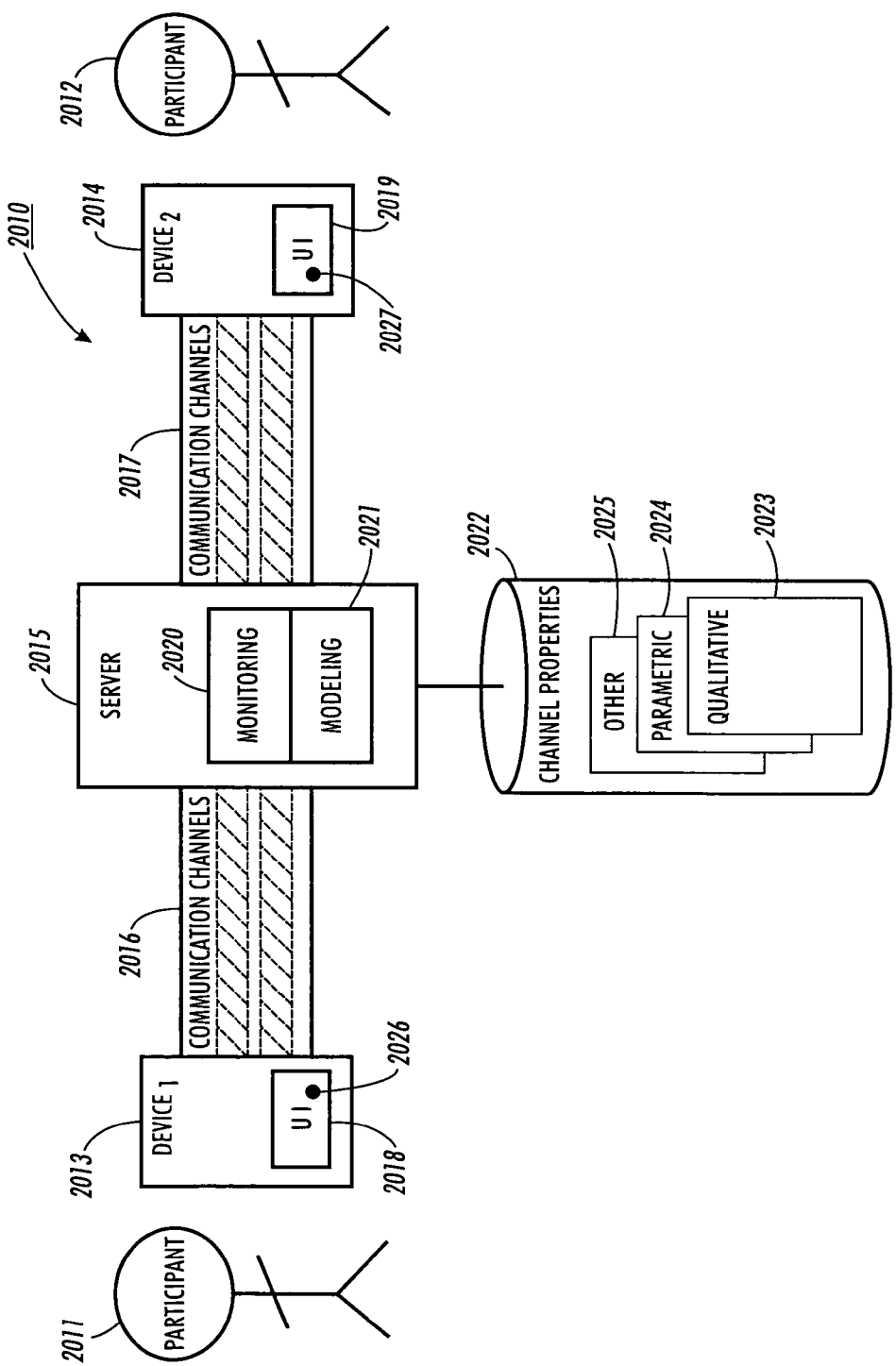
FIG. 20 illustrates a block diagram showing an architecture in accordance with an embodiment.

FIG. 20 illustrates a block diagram showing an architecture 2010 in accordance with an embodiment. By way of example, a pair of participants 2011, 2012 exchange information via a set of communication channels 2016, 2017, as further described below with reference to FIG. 25. Each participant 2011, 2012 accesses a respective communication channel 2016, 2017 through a communication device 2013, 2014, which includes a user interface (UI) 2018, 2019 and one or more monitoring devices (not shown), such as cameras, sensors, microphones, and similar data collection instruments. Note that such monitoring devices may be included in the communication device but need not be included. For example, such monitoring devices might be separate devices that convey data to the communication device via a wireless network. Data is received from the participant 2011 by the communication device 2013 via the user interface 2018. The data is delivered through the communication channels 2016, 2017 to the communication device 2014 and is provided via the user interface 2019 to the participant 2012.

A server 2015 is communicatively interposed between the communication devices 2013, 2014 and information being delivered through the communication channels 2016, 2017 flows through the server 2015. The server 2015 includes a monitoring component 2020 and a modeling component 2021, as further described below respectively with reference to FIGS. 23 and 24. Briefly, the monitoring component 2020 receives data captured by the monitoring devices for delivery to the modeling component 2021. Upon receiving the captured data, the modeling component 2021 assesses attributes regarding the participants 2011, 2012 and generates recommendations for a set of desired properties associated with the communication channel 2016, 2017 based on the attributes and information such as the history of attributes and the history of properties for the communication channel. Optionally, the modeling component 2021 also forms goals for each participant in an interaction or for some or all of the group of participants in an interaction based on the attributes. The server modifies its operation according to the desired properties. The server also sends notification to the participants' devices 2013, 2014 regarding the desired properties. The communication channels 2016, 2017 and the participants' devices 2013, 2014 are modified accordingly.

In the described embodiment, two types of communication channels 2016, 2017 are defined. Primary communication channels deliver information consisting primarily of elements of human language in either written or spoken form. Continuous communication channels deliver information without substantial interruption. Such continuous communication channels are established and then left open, such that the passing of new information need not involve (re)establishment of the channel. A communication channel can be both a primary and continuous communication channel. Other types of communication channels are possible, as would be recognized by one skilled in the art.

In addition, each communication channels 2016, 2017 has an associated set of channel properties 2022, which substantially determine the structure of the information or content being delivered. The actual settings of each channel property 2022 are separate from the actual communication channels 2016, 2017 and can be stored as dynamically updatable values by either the server 2015 or the communication devices 2013, 2014. Qualitative properties 2023 consist of binary or categorical parameter settings. Parametric properties 2024 consist of substantially continuous parameter settings. For example, controlling transmission directionality is a qualitative property and controlling volume or gain in an audio channel is a parametric property. Note that audio gain can be generalized as an audio or video mixing function, which takes a number of input media streams and allocates a fraction, including zero, of the output stream to each input stream. Further note that properties may be different from the perspective of each participant. For example, one participant may be able to transmit at any point while another participant can only transmit at points specified by the first participant or by other means. As another example, one participant may transmit text while another transmits audio. Other properties 2025 are possible, as would be recognized by one skilled in the art.

Channel properties 2022 are distinguishable from other aspects of the communication channels 2016, 2017 that might be changed, but which do not have the same kind of effect. For example, consider a multiparty video conference system that includes audio and video channels. The system could be arranged to include a sufficient number of cameras and a sufficient amount of display space to show all of the participants, if desired. The images of the participants could be provided, for instance, in an n×m array shown on each display. The system could also incorporate indicators 2026, 2027 that assisted participants, but did not alter the channel properties 2022. For instance, the system could incorporate a circuit that first identified the current speaker and then drew a circle around the speaker's image. Use of the circuit could assist the other participants in readily determining the identify of the current speaker, but would not alter the fundamental properties of the audio or video channels. In contrast, the system could alternatively incorporate a circuit that first identified the current speaker and then showed only the image of the current speaker to the other participants. Visual communicative information from the other participants would be blocked. Use of the circuit would provide, for instance, voice-activated video switching, and would alter the fundamental properties of the video channel.

In a further embodiment, the functions performed by the server 2015 are distributed to one or more of the individual communication devices 2013, 2014. Each communication device 2013, 2014 includes monitoring and modeling components.

The system architecture described with reference to FIGS. 19-20 is explained in additional detail described with reference to FIGS. 21-25. An exemplary embodiment and simple variations demonstrate the application of the present invention concretely, but should be clearly understood to be illustrative in nature, rather than an exhaustive description.

Figure 21:
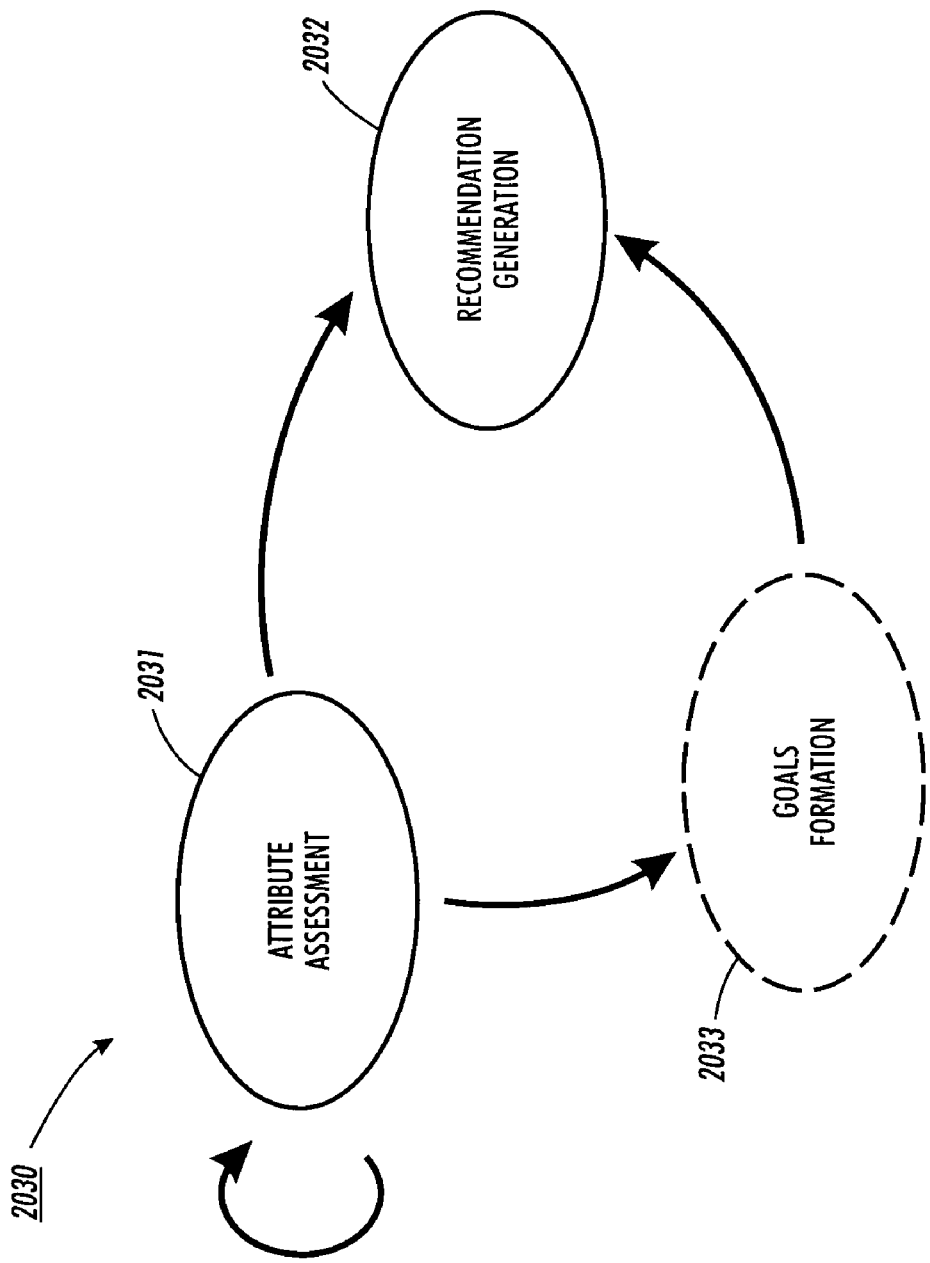
FIG. 21 illustrates a block diagram 2030 showing generally the phases of modeling as executed on the architecture of FIG. 20.

FIG. 21 illustrates a block diagram 2030 showing generally the phases of modeling as executed on the architecture of FIG. 20. Modeling is based on the data captured by the monitoring devices and is performed in three phases: attribute assessment 2031, recommendation generation 2032 and, optionally, goals formation 2033. In the described embodiment, modeling is preferably performed on a continuous basis as the interaction between the participants evolves, but could alternatively be performed sporadically or on demand, as would be recognized by one skilled in the art. During the attribute assessment phase 2031, computations are executed on the captured data to determine attributes about the participants engaged in an interaction. Additionally, attributes could be used as inputs to further attribute assessments. During the recommendation generation phase 2032, the attributes are evaluated along with the histories of the communication channel properties and attributes, as well as any optional goals, to determine desired channel properties. The desired channel properties can include new settings or the status quo. During the optional goals formation phase 2033, the attributes are evaluated vis-à-vis each participant to posit goals for individual participants. Alternatively or in addition, goals may be posited for some or all of the participants as a group.

Figure 22:
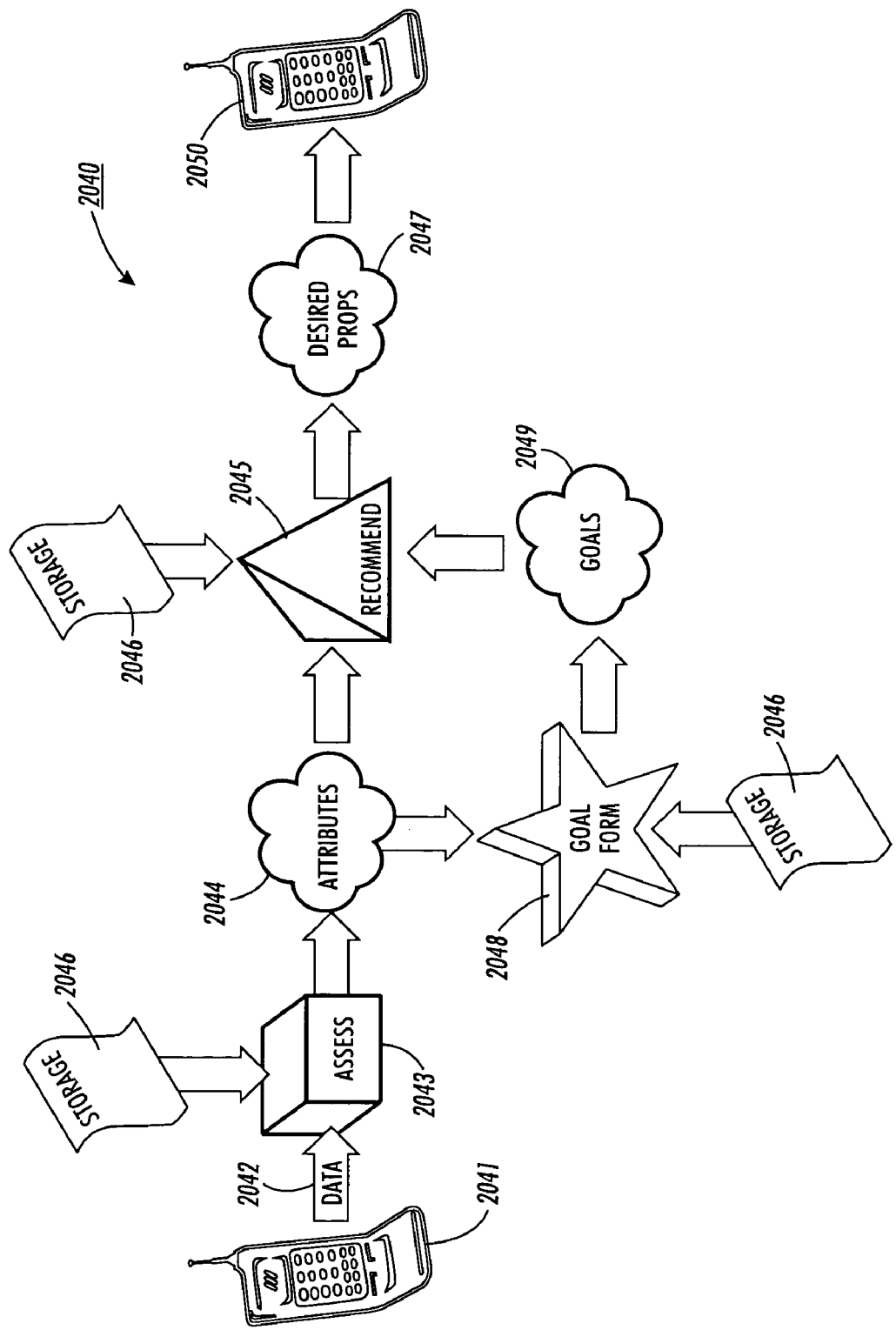
FIG. 22 illustrates a process flow diagram showing, by way of example, modeling as executed on the architecture of FIG. 20.

FIG. 22 illustrates a process flow diagram 2040 showing, by way of example, modeling as executed on the architecture of FIG. 20. Two participants (not shown) each use a mobile communication device 2041, 2050. The mobile communication devices 2041, 2050 include a microphone, external speaker ("speakerphone") and earphone. The communication channel formed during an interaction between the two participants includes the binary qualitative properties of push-to-talk (half-duplex audio) and standard telephony (full-duplex audio). The push-to-talk property configures the communication channel for half-duplex (non-simultaneous) audio played through an external speaker (thereby making the audio conversation observable by non-participants who are physically co-present with any of the participants). The standard telephony property configures the communication channel for full-duplex (simultaneous) audio played through the earphone (thereby making the audio conversation non-observable by co-present non-participants). Alternatively, since exactly one of these binary properties is true at a given time, the binary properties can be modeled using a single categorical property, that is, a property that takes a value corresponding to either of the two modes. Note that the properties could be defined differently so that push-to-talk and standard telephony would represent only the half-duplex and full-duplex nature of the audio without specifying the delivery of the audio as either external speakerphone or earphone. The communication channel includes other properties, which are omitted for clarity, but would be recognized by one skilled in the art.

Initially, the communication channel is set to push-to-talk mode. During the interaction, audio data 2042 is monitored on the communication channel through the microphone. The audio data is received by the monitoring component (not shown) and is forwarded to the modeling component as an input.

Within the modeling component, the input audio data 2042 and storage 2046 are received by the attribute assessment component 2043 and are computationally assessed into attributes 2044. For instance, turn-taking analysis methods, similar to those described with reference to FIG. 13 can be applied to assess the conversational engagement attribute from conversational characteristics. In one embodiment, the attribute assessment component 2043 can run a voice activity detector against the input audio data 2042 over, say, the last 30 seconds, to compute attributes concerning the amount of simultaneous speech between the two participants and the degree of utterance alignment. Simultaneous speech refers to sustained periods of overlapping speech between participants. Utterance alignment reflects the amount of time that has elapsed between the end of one participant's utterance and the beginning of another participant's utterance. The attribute assessment component 2043 evaluates the values for the amounts of simultaneous speech and utterance alignment (which requires temporal alignment of the data from which the values are computed), along with a history of the interaction and whether the interaction is increasing or decreasing, to determine an attribute 2044 representing the degree of conversational engagement of the two participants. (In push-to-talk mode, no simultaneous speech occurs and the amount of simultaneous speech will accordingly be zero.) In the described embodiment, the computed attribute 2044 representing the degree of conversational engagement is determined by applying a Naïve Bayes classifier, although other approaches to attribute assessment could be applied, as would be recognized by one skilled in the art.

An alternative, or supplementary, approach is to assess the conversational engagement attribute by applying content analysis methods similar to those described with reference to FIG. 16, for example, by detecting audible cues of engagement relating to backchannel speech, common speech content, or prosody. In one embodiment, the attribute assessment component 2043 can periodically extract vectors of statistical features representing acoustic voice characteristics from the stream of input audio data 2042, applying a first set of classifiers to assess the type and degree of affect (emotion) in the prosodic elements of each participant's speech and then applying a second set of classifiers to the affective attribute values to assess the degree of conversational engagement of the participants. A discussion of the first classification problem, that is, assessment of human affect from recorded speech, can be found in a variety of sources such as R. Cowie et al., "Emotion Recognition in Human-Computer Interaction," *IEEE Signal Processing*, January 2001, 32-80. One embodiment uses raw acoustic features that include voice pitch (measurement of the fundamental frequency f0 of a human voice, often termed "pitch tracking") and voice energy (measured in one or more frequency bands, for example, <200 Hz, 200-300 Hz, 300-500 Hz, 500 Hz-1 kHz, 1 kHz-2 kHz, and >2 kHz). The raw acoustic features are aggregated into statistical features that include the ratio of voiced to unvoiced audio frames; the mean, minimum, maximum, range and standard deviation of instantaneous voice pitch; and the minimum, maximum and range of the slope (rate of change) of instantaneous voice pitch. The statistical features are then used as the input to a classifier, such as one based on Support Vector Machine (SVM) techniques, which was previously trained on manually labeled feature sets. The output of the SVM classifier can be the assessment of an attribute measuring the emotional state represented by the acoustic characteristics of the speech. The attribute is preferably based on a limited number of attributes, for example, a vector of values representing the strength of one or more of three known emotional characteristics from the psychological literature, known as "arousal" (or "activation"), "valence" (or "evaluation"), and "control" (or "power"), though other codings are known which are typically based on selected common-sense emotion labels such as "cold anger" and "sadness." The second classification problem provides assessment of conversational engagement from affect-based attribute values. The affective attribute values output by the SVM classifier are used as input to an HMM classifier. As a state machine, the HMM classifier implicitly models temporal aspects of the stream of affective attribute values. If, as in another embodiment, techniques such as those based on coupled-HMMs (CHMMs) are used, then the HMMs modeling the individual participants can influence each other. This approach is preferable as the approach captures the joint behavior of the participants, for example, the likelihood that if one participant becomes highly engaged, the other participant will also be highly engaged. whereas using separate HMMs for each participant does not capture the participants' joint behavior. In yet another embodiment, natural language analysis techniques such as speech recognition or wordspotting can be used to generate evidence of conversational engagement in a manner similar to the semantic content analysis methods for detecting responsive behavior, such as described with reference to FIGS. 16 and 17, for example, detection of backchannel speech or common content.

In the example, the modeling component also includes a goals formation component 2048, which receives storage 2046 representing data, such as the history of properties and the history of attributes and the computed attribute 2044 representing the degree of conversational engagement of the two participants. The computed attribute 2044 is combined with previously determined attributes representing the degree of conversational engagement to evaluate whether the degree of engagement is increasing or decreasing for each participant. Based on the degree of engagement, the goals formation component 2048 formulates goals 2049 indicating whether the participants wish to maintain their current level of engagement, increase their engagement level, or decrease their engagement level. In the described embodiment, the goals formation component 2048 uses a lookup table to determine the goals 2049, although other approaches to goals formation could be applied, as would be recognized by one skilled in the art.

The computed attribute 2044 representing the degree of conversational engagement of the two participants and the goals 2049, plus storage 2046, are received by the recommendation generation component 2045 and are analyzed for changes to the communication channel properties. For instance, if the communication channel remains set in push-to-talk mode and the participants have not been speaking recently, a sudden burst of discussion could indicate that the participants are becoming conversationally engaged and that the degree of conversational engagement is increasing, as reflected by the computed attribute 2044 assessed by the attributed assessment component 2043. Additionally, the goals formation component 2048 could formulate the goal 2049 that the participants wish to increase their engagement level. Accordingly, the recommendation generation component 2045 would determine that the push-to-talk and standard telephone properties should both be modified according to the desired properties 2047. In the described embodiment, the recommendation generation component 2045 uses a lookup table to determine the desired properties 2047, although other approaches to recommendation formation could be applied, as would be recognized by one skilled in the art.

The desired properties 2047 are received by each communication device 2041, 2050, which enable standard telephony mode and disable push-to-talk mode with a switch from speaker to earphone audio. In a further embodiment, the user interface implemented on each communication device 2041, 2050 can be automatically modified to disable the push-to-talk button, thereby effecting a dynamic, yet non-intrusive media property change. The server and the communication channels are also modified to support standard telephony and to disable push-to-talk mode.

By way of further example, if the communication channel is now set in standard telephony mode, yet the conversation slows, the degree of conversational engagement is decreasing, as reflected by the computed attribute 2044 assessed by the attributed assessment-component 2043. Additionally, the goals formation component 2048 could formulate the goal 2049 that the participants wish to decrease their engagement level. Accordingly, the recommendation generation component 2045 would determine that the push-to-talk and standard telephone properties should again both be modified according to the desired properties 2047, such that push-to-talk mode is enabled and standard telephony mode is disabled with a switch from earphone to speaker audio.

Figure 23:
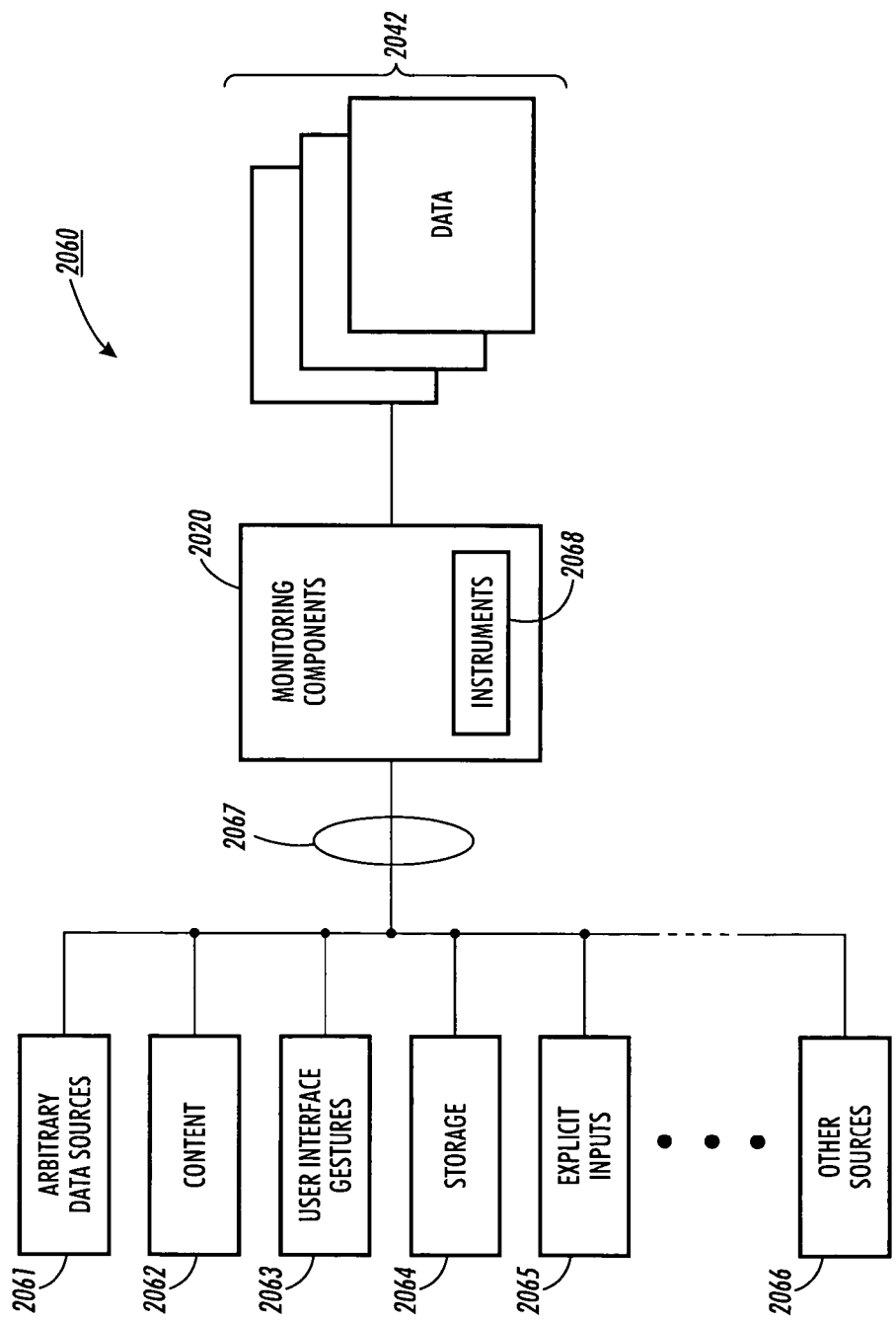
FIG. 23 illustrates a functional block diagram showing the monitoring component of the architecture of FIG. 20.

FIG. 23 illustrates a functional block diagram showing the monitoring component 2020 of the architecture of FIG. 20. The monitoring component 2020 collects raw input data 2067 received from a plurality of sources via instruments 2068. The data sources include arbitrary data sources 2061, content 2062 being delivered through the communication channel, user interface gestures 2063, a storage 2064 including information, such as the history of attributes and history of channel properties, and explicit user inputs 2065, as well as other sources 2066, as would be recognized by one skilled in the art. The monitoring component 2020 gathers and processes the raw input data 2067 into processed output data. The processing of the raw input data 2067 is dependent upon the type of data received from the instruments 2068 and the format required by the modeling component. For example, raw audio data may need to be converted into a standardized format recognized by the modeling component. Similarly, the monitoring component 2020 could compress or encrypt the input data prior to sending. After any required processing, the monitoring component 2020 forwards the processed output data 2042 to the modeling component (not shown), as further described below with reference to FIG. 24.

The instruments 2068 are deployed at various points effecting the communication channel, including within the communication device, throughout the participant's environment, and within the communication channel itself. Other instrumentation points are feasible, as would be recognized by one skilled in the art. More particularly, audio or video communication instruments could be employed to collect data transmitted through the communication channel. Biofeedback instruments, gesture trackers and location sensors could be deployed to collect data about the physical properties or movements of the participants. Microphones and sensors or other instruments could be used to collect data about the participant's environment, including audio and physical environments. Finally, instruments could collect data explicitly entered by the participants as input to the modeling component (not shown). For instance, a participant could store a set of personal preferences to indicate desired interaction lengths and media properties. Similarly, a participant could manually indicate interest in a simultaneous conversation mode by making a gesture in the user interface which is passed to the monitoring component. Other types and forms of instruments, and various configurations and combinations thereof, are possible, as would be recognized by one skilled in the art.

Figure 24:
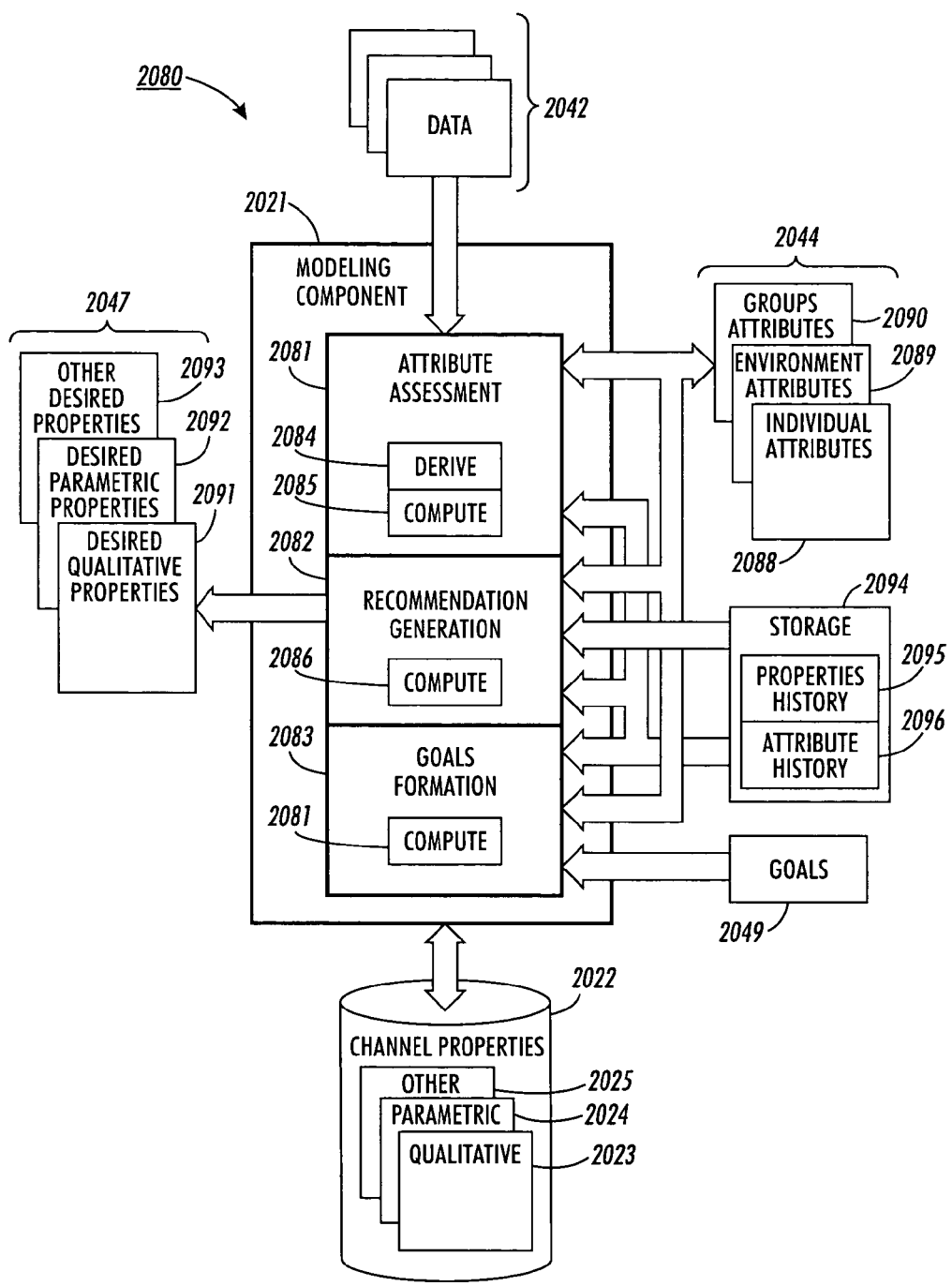
FIG. 24 illustrates a functional block diagram showing the modeling component of the architecture of FIG. 20.

FIG. 24 illustrates a functional block diagram showing the modeling component 2021 of the architecture of FIG. 20. The modeling component 2021 operates on processed data 2042 received from the monitoring component (not shown) and outputs a set of desired properties 2047. The modeling component 2021 consists of three subcomponents: attribute assessment 2081, recommendation generation 2082, and, optionally, goals formation 2083. Briefly, the attribute assessment subcomponent 2081 determines a set of attributes 2044 about the participants in a social interaction. The recommendation generation subcomponent 2082 creates the set of desired properties 2047 based on the set of attributes 2044 and storage 2094. Storage 2094 contains data such as the history of properties 2095, the history of attributes 2096, and the history of goals 2097. The goals formation subcomponent 2083 is optional and generates a set of goals 2049, which are based on the set of attributes 2044 and storage 2094 and are used by the recommendation generation subcomponent 2082.

In particular, the attribute assessment subcomponent 2081 consists of a derive module 2084 and a compute module 2085. The derive module 2084 operates on the processed data 2042 and the storage 2094 to determine derivative input data through data reduction and analysis methodologies. The monitoring component (not shown) only processes raw input data for efficient delivery to the modeling component 2021 and does not perform the more specialized processing required in determining participant-specific attributes. For example, the derive module 2084 could execute voice activity detectors against an input audio data stream to determine the amount of simultaneous speech and utterance alignment, which can be useful in evaluating transmission modes used in a multi-party conversation. Other types of data derivations and processing means are feasible, as would be recognized by one skilled in the art.

The compute module 2085 determines the set of attributes 2044 by applying analytic computations on and drawing inferences from the data 2042 and the storage 2094. As well, attributes can also be received as input data. The types of computations and inferences depend on the nature of the attribute determined and span the range of computations, including statistics and machine learning non-exclusively through Naïve Bayes or HMM classifiers.

Attributes are generated from three possible groups: attributes about individual participants 2088, attributes about the environments of individual participants 2089, and attributes about groups of participants 2090. Additional groups or combinations of attributes are feasible, as would be recognized by one skilled in the art. Individual participant attributes 2088 include, by way of non-exclusive example, speech content, prosody, volume, physical movements, physical state, mental state, and any communications with non-participants. Environment attributes 2089 include, by way of non-exclusive example, location, background noise, physical changes, and traffic conditions. Finally, group attributes 2090 include, by way of non-exclusive example, overlapping talk, aligned utterances, use of backchannel, use of conversational repair, degree of conversational engagement, signs of discord, signs of misunderstanding, signs of unwanted interaction dominance, signs of change conversation state, amount of participant interaction time, attitude shown toward what another participant is communicating, general attitude towards another participant, alignment of participants' activities or attitudes, similarity of participants, and how media properties affect particular individuals or pairs of individuals. Additional types and variations of attributes, as well as other groups or combinations of attributes are feasible, as would be recognized by one skilled in the art.

The value of each attribute falls along a continuum of certainty depending upon the type of computations performed and inferences drawn. For example, determining the amount of overlapping discussion between two participants in a conversation has a high degree of certainty since the percentage of time that both participants are talking can be directly computed from raw data. Conversely, determining whether a participant is in agreement with another participant may have a low degree of certainty because language understanding techniques are subject to error and alternative conclusions. The degree of certainty is also affected by the robustness of the technique used to assess the attribute value. For instance, one form of speech recognition requires training for a specific user, and accuracy can suffer when applied to other users. Finally, the correctness of an attribute can be related to or, alternatively, be independent from, the amount of complexity or inferencing required to compute the attribute value. Accordingly, subsequent use of each attribute can require consideration of the degree of certainty. Note, however, that the degree of certainty for any given attribute value need not be known nor be determinable.

The recommendation generation subcomponent 2082 consists of a compute module 2086. The compute module 2086 evaluates the set of attributes 2044 and storage 2094, as well as any computed goals 2049 to form the set of desired properties 2047. Three groups of desired properties 2047 are generated: desired qualitative properties 2091, desired parametric properties 2092, and other desired properties 2093. The desired properties 2047 represent changes from a previous state to a new state for one or more communication channel properties. Alternatively, the desired properties 2047 could represent no changes and maintaining the status quo. As with the set of attributes 2044, the groups of desired properties 2047 are generated along a continuum of certainty.

Individual channel properties are inherent to each communication channel. However, the states of each channel property can be stored in a database 2022 for qualitative 2023, parametric 2024 and other 2025 channel properties. By way of example, a Backus-Naur Form (BNF) grammar describing possible properties is as follows:

```
<Channel> ::= [<Medium>] {<Turns>} {<Transforms>} [<Address>]
    {<Summons>} {<Reviewable>} {<Revisable>} {<Observable by
    Co-present Parties>}
<Medium> ::= <Direct-Communication-Content> | <Status-Content>
<Direct-Communication-Content> ::= Audio | Video | Text | Other
<Status-Content >::= PresenceInformation | SpeakerID | Other
<Turns> ::= Simultaneous | Cotemporaneous | Continuous
<Transforms> ::= VolumeAdjustment | FidelityChanges | Greeking |
    Delay | Other
<Address> ::= In-Channel-Address | Out-Of-Channel-Address
<Summons> ::= In-Channel-Summons | Out-Of-Channel-Summons
``` where the following definitions apply. (Several of the definitions are adapted from H. H. Clark and S. E. Brennan, "Grounding in Communication," in *Perspectives on Socially Shared Cognition*, L. B Resmck, R. M. Levine, and S. D. Teasley (eds.), APA, Washington, D.C., 127-149.) Reviewable means persistent, whereby the communicative content can be reviewed by a recipient at a later time, for example, an electronic mail message is reviewable because the message persists in the recipient's mail-reading program after being read, whereas a telephone conversation is non-reviewable unless additional recording apparatus is used. Revisable means that a sender can revise a message before the message is received by the intended recipient. Simultaneous means that more than one participant can send and receive a communication simultaneously, for example, full-duplex audio is simultaneous, whereas half-duplex audio is non-simultaneous. Cotemporaneous means that a participant receives a message at substantially the same time that the sender sends the message, for example, telephony is usually cotemporaneous, whereas postal mail is non-cotemporaneous. As previously, mentioned, continuous means that the communication channel delivers information without substantial interruption, for example, a single teleconference is continuous, whereas electronic mail is non-continuous. Many types of content transformations (transforms) are possible, including volume adjustments; fidelity changes, for example, resampling an audio stream at a different rate; greeking, that is, scrambling linguistic content or otherwise distorting it so that the semantic meaning is unclear but its other aspects, such as its presence in a communication channel or its emotional tone, can still be determined by the recipient; and the addition or removal of temporal delay within linguistic content so as to change the rate or pacing of its delivery. Address means a specification provided by a sender of one or more intended recipients. Finally, summons means a notification of a communication. The in-channel addressing and summons properties indicate that the corresponding functions are performed within the communication channel, for example, a user addressing an audible utterance to a specific recipient by calling "Hey, Joe," into an audio communication channel, or the system notifying a recipient of an impending audible utterance using an audible beep, respectively. The out-of-channel addressing and summons properties indicate that the corresponding functions are not performed by a single given communication channel alone, for example, through the coordination of a given communication channel and an additional communication channel or the coordination of a given communication channel and a user interface. Other types and forms of properties 2022 are feasible, as would be recognized by one skilled in the art.

In the preceding BNF, the non-terminal symbol <Direct-Communication-Content> corresponds to the set of communication media in which participants produce communicative content directly, such as audio, video and text. The non-terminal symbol <Status-Content> corresponds to the set of communication media in which participants do not produce communicative content directly, such as an abstract visual representation in a graphical user interface that indicates whether or not a participant is idle. While a communication channel can take on property values that cause it to transmit data over a medium other than a direct communication medium, an embodiment of a communication channel must be capable of transmitting data over a direct communication medium, even if this capability is selective or intermittent. For example, a mechanism that is only capable of transmitting abstract presence information between handsets would be defined as an indicator rather than a communication channel. Also, as previously mentioned, the addition of supplementary status indicators to a communication channel does not substantially determine the structure of the information or content being delivered through the communication channel.

The optional goals formation subcomponent 2083 consists of a compute module 2087. The goals 2049 are computed for each participant in an interaction based on the set of attributes 2044 and storage 2094. Each goal preferably reflects a computationally inferred theory concerning an outcome associated with a particular participant. Individual goals are independent and can thus be in harmony, agreement, or divergent. For example, a goal assigned to a participant indicating a desire to continue a conversation could be in conflict with a different goal assigned to another participant who desires to terminate the conversation as soon as possible. Accordingly, instead of or in addition to forming goals for individual participants, the goals formation subcomponent 2083 may form goals that represent a group of some or all participants. For example, the goals formation subcomponent 2083 may take a simple majority position, so that if the majority of participants wish to increase interaction, it forms the goal of increasing interaction. Alternatively, the goals formation may use more complex methods, such as considering the strength of individual positions or aggregating across all participants the expected benefits and costs associated with a given goal from the perspective of each participant. As with the set of attributes 2044, the goals 2049 are generated along a continuum of certainty.

Figure 25:
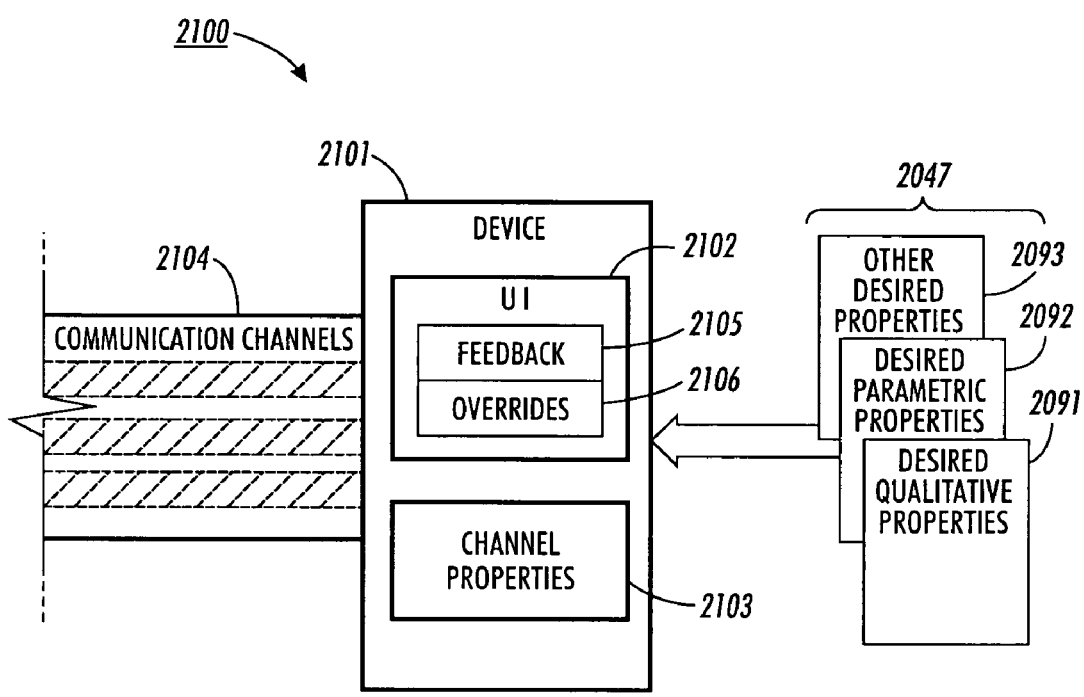
FIG. 25 illustrates a functional block diagram showing a communication channel of the architecture of FIG. 20.

FIG. 25 illustrates a functional block diagram showing a communication channel 2100 of the architecture of FIG. 20. The communication channel 2100 is an abstraction consisting of the physical communication channels 2104 and an associated communication device 2101, which facilitates the delivery of information over the communication channels 2104. The communication device 2101 includes a user interface 2102, which can include, optionally, controls for providing feedback 2105 and overrides 2106. The user interface 2102 may also provide a participant information about the current status of the channel properties or the content of the channel relative to any or all participants. For example, the user interface 2102 may show the current emotional state of participants in an interaction. Importantly, the user interface 2102 can itself be changeable through the channel properties 2103, such as disabling a push-to-talk button when switching to a conventional telephony transmission mode. Additional user interface controls and features are feasible, as would be recognized by one skilled in the art.

The communication channel 2100, through the communication device 2101 or server (not shown), modifies the state of the channel properties 2103 based on the set of desired properties 2047 received from the modeling component (not shown). Changes are affected either automatically, semi automatically, or manually. For example, changes to the properties can be effected by the user interface 2102 via the feedback 2105 or override 2106 controls. A semiautomatic change allows a user to override or force a property change, while maintaining an automatic component to the change. Feedback can be provided regarding the state of the communication channel 2100 or data detected by the modeling component. For example, feedback can be provided about the channel properties from the perspective of all participants or about the level of discord in the social interaction. Feedback can include levels of specificity.

FIG. 25 illustrates an additional aspect of the present invention. In the conventional communications systems discussed previously, manual user interfaces were provided for controlling media streams with respect to parametric properties. In these systems, initiating the channel property change required end-user user interface actions that were either unilateral (the property change resulted from a unilateral action, for example, one participant pushed a button and the change occurred) or sequentially-negotiated (the property change followed after a sequence of steps involving more than one participant, equivalent to setting up a telephone call). In the latter case, while essentially any two actions taken by more than one participant had some kind of temporal ordering, the sequence of steps constituted a specific request/reply negotiation, which also implied a strong causal dependence. Referring to FIG. 25, the present invention enables a communication method in which independent gestures are made by a plurality of participants in the user interface 2102 of their respective communication devices 2101 which lead to changes in channel properties 2103 of the communication channel 2100, that is, systems in which there may be (and likely will be) some temporal ordering between the user interface gestures of the participants, but not a direct causal dependence (meaning that the participant whose gesture is temporally first does not "force" a response from subsequent participants). Another way to characterize this distinction is that user interface gestures by more than one party are required, but that no explicit sequential negotiation is required.

By way of example, consider a first and a second participant in a remote conversation. In an embodiment of the present invention, each participant operates their respective communication device 2101. For clarity of explanation, assume that the communication device hardware resembles that of known mobile telephones, such as the Motorola i90c cellular telephone. Each communication device has a conventional "clamshell" design and supports audio communication, either with the clamshell closed (in which case, an external amplified speaker is used by default, instead of the earphone speaker) or with the clamshell open (in which case, the earphone speaker is used by default, instead of the external amplified speaker). Each communication device supports push-to-talk half-duplex operation (using a hardware pushbutton) as well as conventional full-duplex telephony. Each communication device further includes a sensor enabling the device software to receive notification when the clamshell has been opened or closed. Unlike known mobile telephones, such as the Motorola i90c cellular telephone, however, the communication device 2101 includes hardware/software means by which channel properties 2103 of the communication channel 2100 can be changed in response to user interface gestures made independently by the participants. In one embodiment, the state of each device's clamshell open/closed sensor is transmitted to a monitoring component on a server 2015, such as shown with reference to the architecture diagram of FIG. 20. A modeling component on the server 2015 computes the logical-AND of the "clamshell open" values and adjusts the value of the push-to-talk/telephony channel property of the communication channel accordingly, that is, when both telephones are open, the channel is full-duplex telephony, and when either telephone is closed, the channel is half-duplex push-to-talk. (The architecture diagram described with reference to FIG. 20 is not intended to represent all possible ways of structuring such a system, and there are many other ways of implementing this scheme, for example, the sensor information can be shared directly between monitoring components on the communication devices.) Referring back to FIG. 25, at a first point in the conversation, suppose both participants are using their communication devices with the clamshells closed, that is, in push-to-talk mode, essentially operating the communication device as "walkie-talkie" radios. At a second point in the conversation, the first participant flips open his communication device. This action places his device in earphone mode, but does not affect the push-to-talk/telephony channel property. At a third point in the conversation, the second participant also decides to flip open her communication device. Now, both participants are using their respective devices in earphone mode, but in response to their independent gestures the server changes the channel properties such that the channel becomes full-duplex instead of push-to-talk. As will be appreciated by those skilled in the art, a wide range of possible channel properties and independent gestures can be substituted for those described. Indicators can be used without causing the participants' user interface actions to be a forced sequential negotiation as in, for example, a telephone call (ring—answer). For example, an indicator light could be shown on the second participant's communication device to notify her that the first participant has opened his communication device. Finally, the computation of when and how to change the channel properties can be performed by an arbitrarily complex modeling component and is not limited to the logical-AND used in the example.

Figure 26:
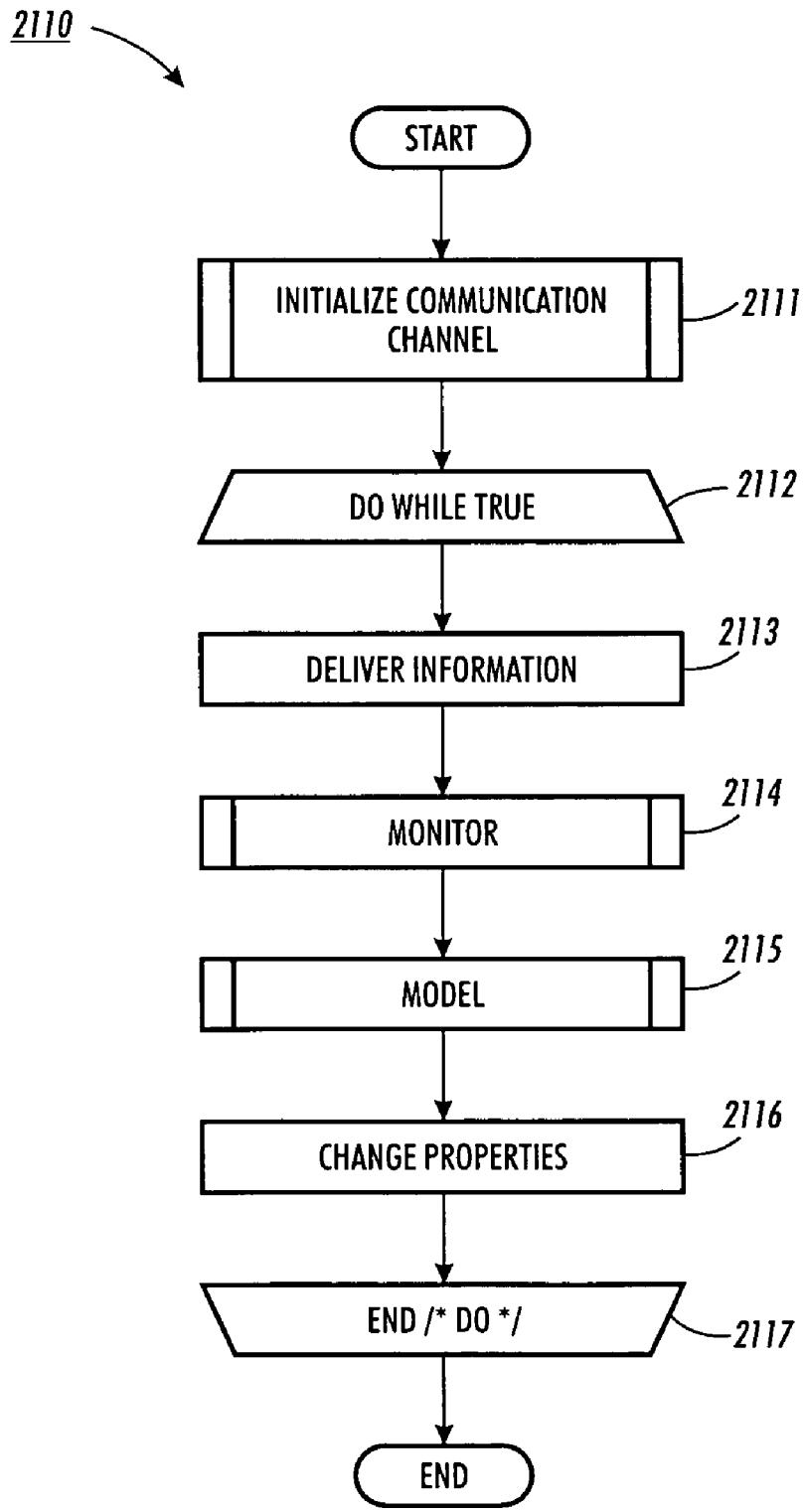
FIG. 26 illustrates a process flow diagram showing a method in accordance with an embodiment.

FIG. 26 illustrates a process flow diagram showing a method 2110 in accordance with an embodiment. The method provides a logical framework within which a social interaction can occur over a communication channel having one or more dynamically changeable properties.

Initially, the communication channel is initialized (block 2111) as further described below with reference to FIG. 27, such as occurs when two participants establish a dialogue through a set of communication devices. Subsequently, the ensuing social interaction is iteratively processed (block 2112-2117), as follows. Information is delivered over the communication channel (block 2113) between two or more of the participants in at least one direction. Through instruments, the monitoring component monitors the communication channel (block 2114) and provides data to the modeling component for modeling the communication channel (block 2115), as further respectively described below with reference to FIGS. 28 and 29. If specified, that is, assuming the desired properties do not recommend maintaining the state of the communication channel in status quo, the properties of the communication channel are changed per the desired set of properties (block 2116). The sequence of information delivery, monitoring, modeling, and change continues, until the social interaction ends, after which the method terminates.

Figure 27:
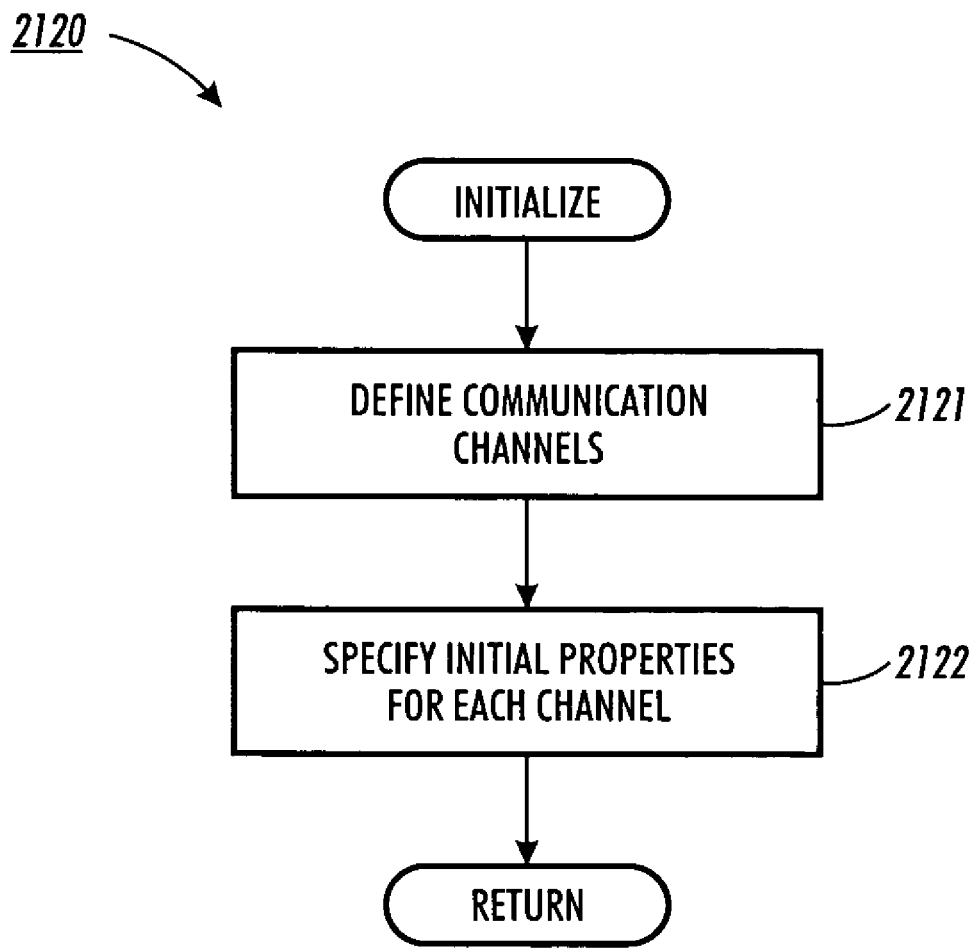
FIG. 27 illustrates a process flow diagram showing an initialization routine used by the method of FIG. 26.

FIG. 27 illustrates a process flow diagram showing an initialization routine 2120 used by the method of FIG. 26. The initialization routine 2120 defines each individual communication channel (block 2121) and specifies the set of initial properties assigned to each channel (block 2122). The routine then returns.

Figure 28:
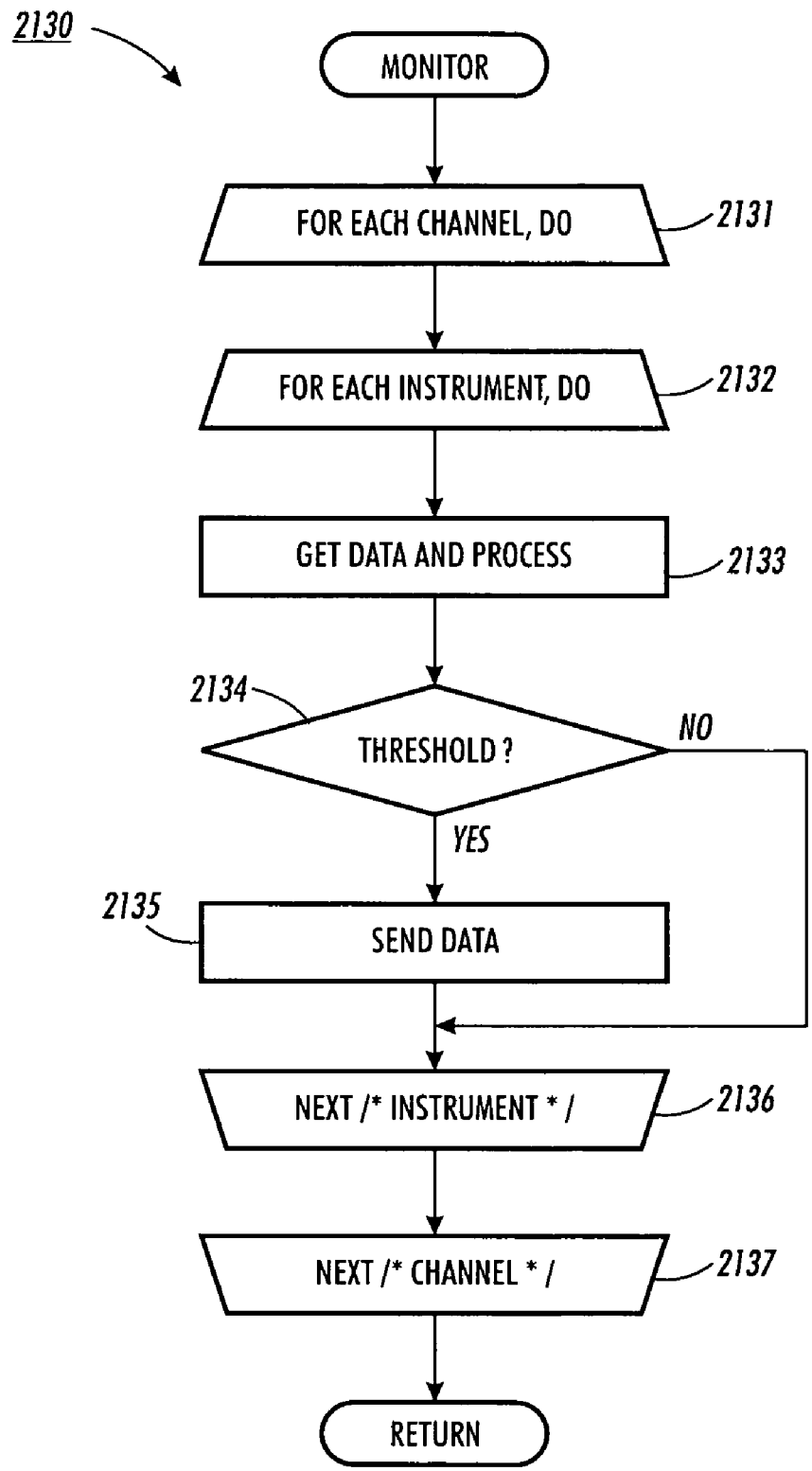
FIG. 28 illustrates a process flow diagram showing a monitoring routine used by the method of FIG. 26.

FIG. 28 illustrates a process flow diagram showing a monitoring routine 2130 used by the method of FIG. 26. The purpose of the routine is to monitor each channel and provide processed data to the modeling component.

Each communication channel is individually monitored (blocks 2131-2137). Alternatively, only select communication channels or a combination of full or select channels can be monitored. Similarly, each instrument is accessed to receive, process and output monitored data (blocks 2133-2136). Alternatively, only select instruments or a combination of the full set of or select instruments can be monitored. Data is received from the instrument and processed (block 2133), as described above with reference to FIG. 23. Optionally, the data can be filtered, such as by applying a threshold (block 2134), prior to being sent to the modeling component (block 2135). Monitoring continues throughout the social interaction, after which the routine returns.

Figure 29:
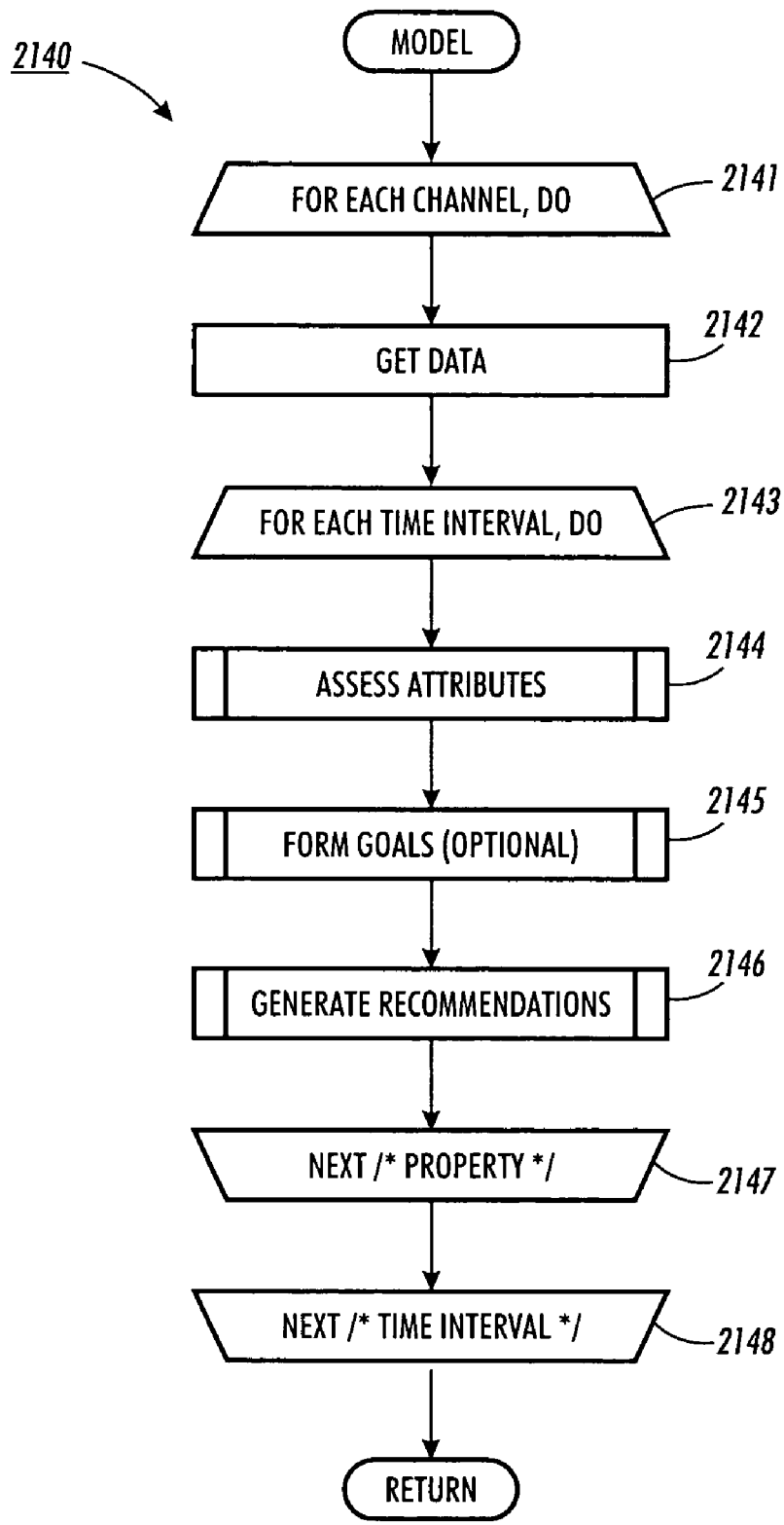
FIG. 29 illustrates a process flow diagram showing a modeling routine used by the method of FIG. 26.

FIG. 29 illustrates a process flow diagram showing a modeling routine used by the method of FIG. 26. The purpose of the routine is to model each communication channel and provide a set of desired properties effecting potential state changes to the individual channels.

Each communication channel is individually modeled (blocks 2141-2148). Alternatively, only select communication channels or a combination of full or select channels can be modeled. Processed input data is received from the monitoring component for each modeled channel (block 2142). Similarly, the modeling component executes over a period of predefined time intervals to assess attributes, optionally form goals and generate recommendations of desired properties (blocks 2143-2147). Alternatively, only select properties or a combination of the full set of or select properties can be recommended. For each time interval during which modeling occurs, attributes are assessed (block 2144), goals are optionally formed (block 2145) and recommendations are generated (block 2146), as further respectively described below with reference to FIGS. 30-32. Modeling continues throughout the social interaction, after which the routine returns.

Figure 30:
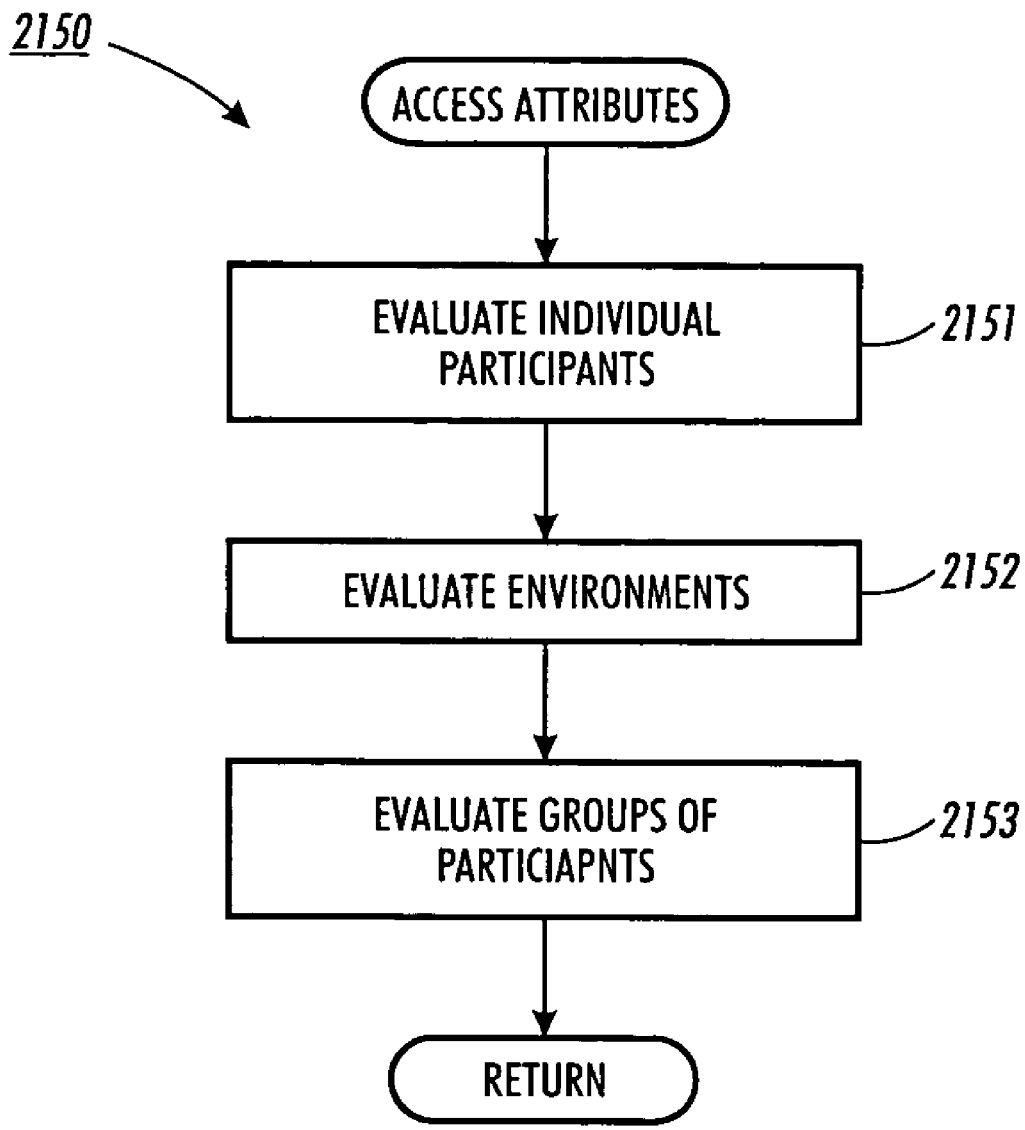
FIG. 30 illustrates a process flow diagram showing an attribute assessment routine used by the routine of FIG. 29.

FIG. 30 illustrates a process flow diagram showing an attribute assessment routine used by the routine of FIG. 29. The attribute assessment routine 2150 evaluates attributes for individual participants (block 2151), the environments of the participants (block 2152) and groups of participants (block 2153), as described above with reference to FIG. 24. The routine then returns.

Figure 31:
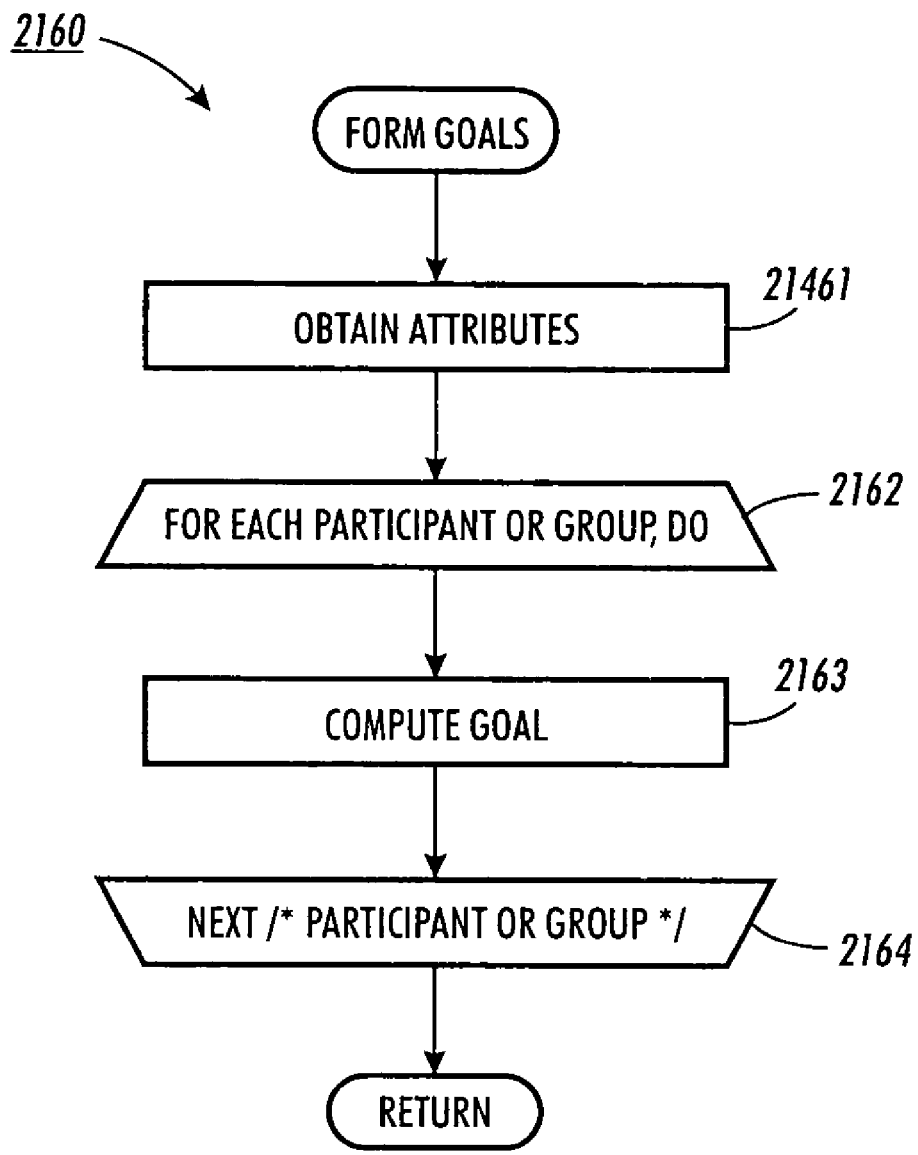
FIG. 31 illustrates a process flow diagram showing a goal formation routine used by the routine of FIG. 29.

FIG. 31 illustrates a process flow diagram showing a goal formation routine used by the routine of FIG. 29. The goal formation routine 2160 obtains attributes about the participants from the attribute assessment subcomponent and the storage (block 2161) and optionally computes goals (block 2163) for each participant or group of participants (blocks 2162-2164), as described above with reference to FIG. 24. The routine then returns.

Figure 32:
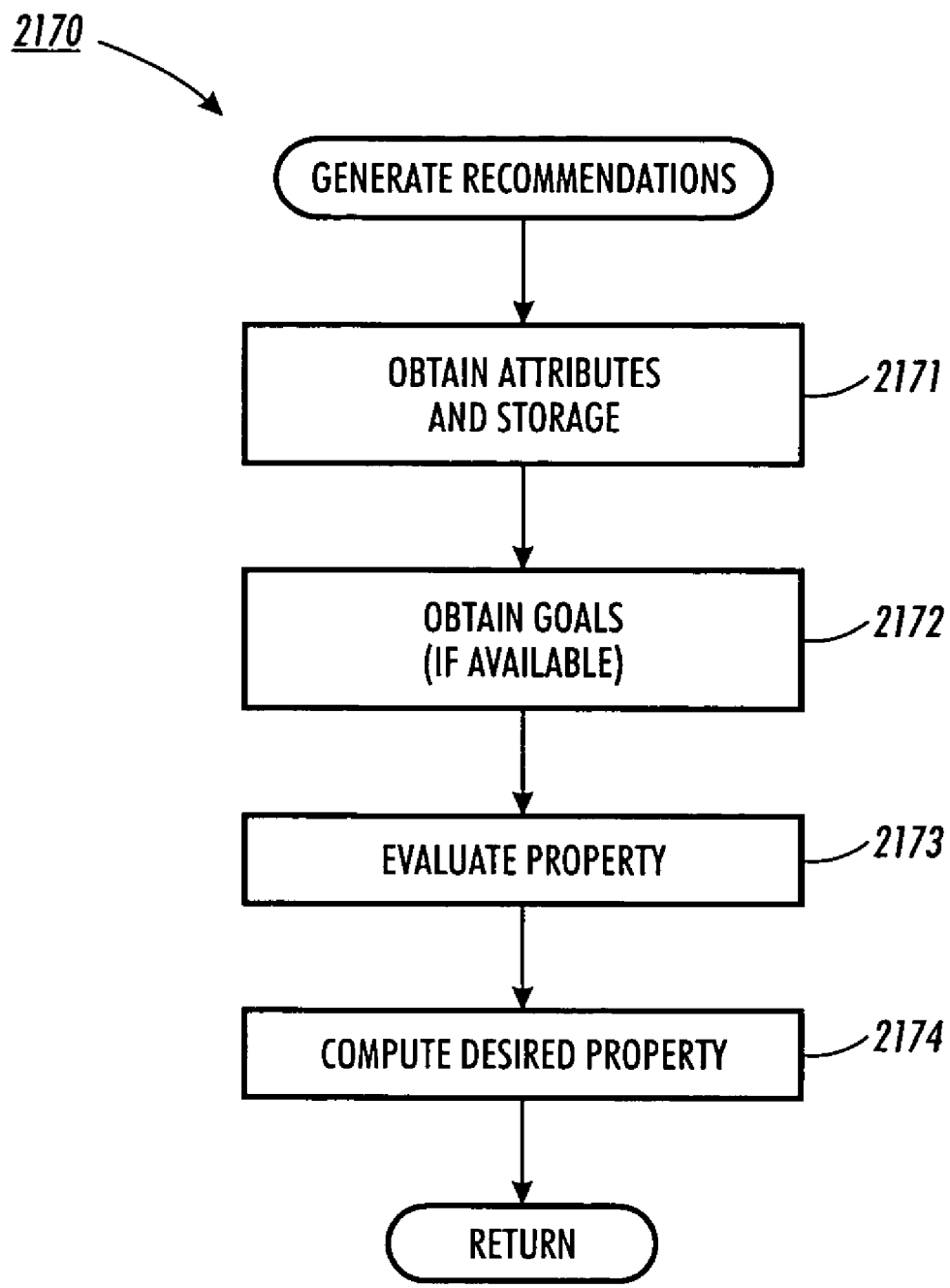
FIG. 32 illustrates a process flow diagram showing a recommendation generation routine used by the routine of FIG. 29.

FIG. 32 illustrates a process flow diagram showing a recommendation generation routine used by the routine of FIG. 29. The recommendation generation routine 2170 also obtains attributes about the participants from the attribute assessment subcomponent and the storage (block 2171) and goals, if available, from the goal formation subcomponent (block 2172). The channel properties are evaluated, in part based on the storage (block 2173) and desired properties are computed (block 2174), as described above with reference to FIG. 24. The routine then returns.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A method for providing a communication channel that comprises at least one property dynamically changeable during social interactions, comprising:
   defining a communication channel comprising a set of properties that are dynamically changeable to determine structure for content delivery;
   delivering content through the communication channel between at least two participants while monitoring at least one arbitrary data source;
   monitoring out-of-channel context, wherein the out-of-channel context originates from at least one of ambient environment sensors and contact sensors;
   modeling at least one desired qualitative property for the communication channel based on the monitoring of the at least one arbitrary data source and out-of-channel context, wherein the desired qualitative property comprises at least one of binary settings, categorical settings, and a parametric property; and
   dynamically changing a portion of the set of properties for the communication channel in accordance with the at least one desired qualitative property.

2. A method according to claim 1, further comprising:
   altering the communication channel as a primary communication channel.

3. A method according to claim 2, wherein the content delivered over the primary communication channel substantially comprises elements of human language.

4. A method according to claim 1, further comprising:
   altering the communication channel as a continuous communication channel.

5. A method according to claim 1, further comprising:
   monitoring content delivered over a primary communication channel.

6. A method according to claim 5, wherein the content delivered over the primary communication channel substantially comprises elements of analyzed human language.

7. A method according to claim 6, further comprising:
   performing speech recognition to the content delivered over the primary channel in determining the analyzed human language elements.

8. A method according to claim 5, wherein the content delivered over the primary communication channel substantially comprises elements of prosodic content.

9. A method according to claim 8, wherein the prosodic content elements comprise prosodic evidence of emotional state.

10. A method according to claim 8, wherein the prosodic content elements comprise prosodic evidence of conversational engagement.

11. A method according to claim 5, wherein the content delivered over the primary communication channel substantially comprises elements of audio content.

12. A method according to claim 5, wherein the content delivered over the primary communication channel substantially comprises elements of text.

13. A method according to claim 1, further comprising:

monitoring content delivered over a secondary communication channel.

14. A method according to claim 13, wherein the content delivered over the secondary communication channel substantially comprises elements of video content.

15. A method according to claim 1, further comprising:
monitoring content delivered over the communication channel comprising conversational characteristics.

16. A method according to claim 15, further comprising:
providing temporal alignment of features identified in the conversational characteristics.

17. A method according to claim 1, further comprising:
drawing an inference based on the modeling.

18. A method according to claim 17, wherein the inference comprises assessing attributes of individuals.

19. A method according to claim 17, wherein the inference comprises assessing attributes of environment.

20. A method according to claim 17, wherein the inference comprises assessing attributes of groups.

21. A method according to claim 17, wherein the inference comprises modeling goals of individuals.

22. A method according to claim 21, wherein the inference further comprises modeling the goals of the individuals as a group.

23. A method according to claim 1, further comprising:
drawing an inference based on historical information.

24. A method according to claim 23, wherein the inference is based on a history of monitored data.

25. A method according to claim 23, wherein the inference is based on a history of modeled attributes.

26. A method according to claim 23, wherein the inference is based on a history of channel properties.

27. A method according to claim 1, further comprising:
drawing an inference based on joint behaviors of the at least two participants.

28. A method according to claim 27, wherein the inference comprises drawing the inference on common actions.

29. A method according to claim 27, wherein the inference comprises drawing the inference on a temporal correlation of actions.

30. A method according to claim 1, further comprising:
receiving additional manual input; and
dynamically changing the set of properties for the communication channel further based on the additional manual input.

31. A system for providing a communication channel that comprises at least one property dynamically changeable during social interactions, comprising:
a communication channel comprising a set of properties that are dynamically changeable to determine structure for content delivery and to deliver content between at least two participants while monitoring at least one arbitrary data source;
a monitoring module to monitor out-of-channel context, wherein the out-of-channel context originates from at least one of ambient environment sensors and contact sensors;
a modeling component to model at least one desired qualitative property for the communication channel based on the monitoring of the at least one arbitrary data source and out-of-channel context, wherein the desired qualitative property comprises at least one of binary settings, categorical settings, and a parametric property; and
a switch to dynamically change a portion of the set of properties for the communication channel in accordance with the at least one desired qualitative property.

32. A method for providing a communication channel that comprises at least one property dynamically changeable during social interactions, comprising:
defining a communication channel comprising a set of properties that are dynamically changeable to determine structure for content delivery;
delivering content through the communication channel between at least two participants while monitoring at least one arbitrary data source;
monitoring the content delivered over the communication channel comprising conversational characteristics and providing temporal alignment of features identified in the conversational characteristics;
modeling at least one desired qualitative property for the communication channel based on the monitoring of the at least one arbitrary data source and the content, wherein the desired qualitative property comprises at least one of binary settings, categorical settings, and a parametric property; and
dynamically changing a portion of the set of properties for the communication channel in accordance with the at least one desired qualitative property.

33. A method according to claim 32, further comprising:
altering the communication channel as one of a primary communication channel and a continuous communication channel.

34. A method according to claim 33, wherein the content delivered over the primary communication channel substantially comprises elements of human language.

35. A method according to claim 32, further comprising:
drawing an inference based on the modeling, wherein the inference comprises at least one of assessing attributes of individuals, assessing attributes of environment, assessing attributes of groups, modeling goals of individuals, and modeling the goals of the individuals as a group.

36. A method according to claim 32, further comprising:
drawing an inference based on historical information, wherein the inference is based on at least one of a history of monitored data, a history of modeled attributes, and a history of channel properties.

37. A method according to claim 32, further comprising:
drawing an inference based on joint behaviors of the at least two participants, wherein the inference comprises at least one of drawing the inference on common actions and drawing the inference on a temporal correlation of actions.

38. A method according to claim 32, further comprising:
receiving additional manual input; and
dynamically changing the set of properties for the communication channel further based on the additional manual input.

39. A method for providing a communication channel that comprises at least one property dynamically changeable during social interactions, comprising:
defining a primary communication channel comprising a set of properties that are dynamically changeable to determine structure for content delivery;
delivering content through the primary communication channel between at least two participants while monitoring at least one arbitrary data source;
monitoring the content delivered over the primary communication channel, wherein the content delivered over the primary communication channel substantially comprises elements of prosodic content comprising one of prosodic evidence of emotional state and prosodic evidence of conversational engagement;

modeling at least one desired qualitative property for the communication channel based on the monitoring of the at least one arbitrary data source, wherein the desired qualitative property comprises at least one of binary settings, categorical settings, and a parametric property; and dynamically changing a portion of the set of properties for the communication channel in accordance with the at least one desired qualitative property.

40. A method according to claim 39, further comprising: altering the communication channel as one of a primary communication channel and a continuous communication channel.

41. A method according to claim 40, wherein the content delivered over the primary communication channel substantially comprises elements of human language.

42. A method according to claim 39, further comprising: drawing an inference based on the modeling, wherein the inference comprises at least one of assessing attributes of individuals, assessing attributes of environment, assessing attributes of groups, modeling goals of individuals, modeling the goals of the individuals as a group.

43. A method according to claim 39, further comprising: drawing an inference based on historical information, wherein the inference is based on at least one of a history of monitored data, a history of modeled attributes, and a history of channel properties.

44. A method according to claim 39, further comprising: drawing an inference based on joint behaviors of the at least two participants, wherein the inference comprises at least one of drawing the inference on common actions and drawing the inference on a temporal correlation of actions.

45. A method according to claim 39, further comprising: receiving additional manual input; and dynamically changing the set of properties for the communication channel further based on the additional manual input.

46. A method for providing a communication channel that comprises at least one property dynamically changeable during social interactions, comprising:
defining a communication channel comprising a set of properties that are dynamically changeable to determine structure for content delivery;
delivering content through the communication channel between at least two participants while monitoring at least one arbitrary data source;
drawing an inference based on joint behaviors of the at least two participants, wherein the inference comprises one of drawing the inference on common actions and drawing the inference on a temporal correlation of actions;
modeling at least one desired qualitative property for the communication channel based on the monitoring of the at least one arbitrary data source, wherein the desired qualitative property comprises at least one of binary settings, categorical settings, and a parametric property; and
dynamically changing a portion of the set of properties for the communication channel in accordance with the at least one desired qualitative property.

47. A method according to claim 46, further comprising: altering the communication channel as one of a primary communication channel and a continuous communication channel.

48. A method according to claim 47, wherein the content delivered over the primary communication channel substantially comprises elements of human language.

49. A method according to claim 46, further comprising: monitoring content delivered over a primary communication channel.

50. A method according to claim 49, wherein the content delivered over the primary communication channel substantially comprises elements of analyzed human language.

51. A method according to claim 50, further comprising: performing speech recognition to the content delivered over the primary channel in determining the analyzed human language elements.

52. A method according to claim 49, wherein the content delivered over the primary communication channel substantially comprises elements of prosodic content and further wherein the prosodic content elements comprise at least one of prosodic evidence of emotional state and prosodic evidence of conversational engagement.

53. A method according to claim 49, wherein the content delivered over the primary communication channel substantially comprises at least one of elements of audio content and elements of text.

54. A method according to claim 46, further comprising: monitoring content delivered over a secondary communication channel, wherein the content delivered over the secondary communication channel substantially comprises elements of video content.

55. A method according to claim 46, further comprising: monitoring content delivered over the communication channel comprising conversational characteristics.

56. A method according to claim 55, further comprising: providing temporal alignment of features identified in the conversational characteristics.

57. A method according to claim 46, further comprising: receiving additional manual input; and dynamically changing the set of properties for the communication channel further based on the additional manual input.

* * * * *